(12) United States Patent
Parzynski, Jr. et al.

(10) Patent No.: US 11,926,989 B2
(45) Date of Patent: Mar. 12, 2024

(54) ADAPTER BOARD WITH SPLINED BUSHING

(71) Applicant: Caterpillar Inc., Peoria, IL (US)

(72) Inventors: David Bruno Parzynski, Jr., Peoria, IL (US); Thomas Marshall Congdon, Dunlap, IL (US); Tobias James Toennies, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 407 days.

(21) Appl. No.: 17/110,442

(22) Filed: Dec. 3, 2020

(65) Prior Publication Data

US 2021/0087780 A1 Mar. 25, 2021

Related U.S. Application Data

(62) Division of application No. 16/182,736, filed on Nov. 7, 2018, now Pat. No. 10,914,050.

(51) Int. Cl.
*E02F 3/815* (2006.01)
*E02F 9/28* (2006.01)

(52) U.S. Cl.
CPC .......... *E02F 3/8152* (2013.01); *E02F 9/2808* (2013.01); *E02F 9/2825* (2013.01); *E02F 9/2833* (2013.01)

(58) Field of Classification Search
CPC ..... E02F 3/8152; E02F 9/2808; E02F 9/2825; E02F 9/2833
See application file for complete search history.

(56) References Cited

U.S. PATENT DOCUMENTS

| | | |
|---|---|---|
| 1,633,057 A | 6/1927 | Wold |
| 3,652,130 A | 3/1972 | Elders |
| 4,002,209 A | 1/1977 | van der Lely |
| 4,368,789 A | 1/1983 | Orr et al. |
| 4,454,921 A | 6/1984 | Schlicker, Jr. |
| 4,753,299 A | 6/1988 | Meyers |
| 4,883,129 A | 11/1989 | Lonn et al. |
| 5,261,170 A | 11/1993 | Ward |
| 5,400,861 A | 3/1995 | Sheirer |
| 5,533,283 A | 7/1996 | Roth |
| 5,549,431 A | 8/1996 | Royle |
| 5,833,017 A | 11/1998 | Woods et al. |
| 6,202,327 B1 | 3/2001 | Fuller |
| 8,714,659 B2 | 5/2014 | Klabisch et al. |
| 9,222,353 B2 | 12/2015 | Morris et al. |

(Continued)

FOREIGN PATENT DOCUMENTS

| | | |
|---|---|---|
| CN | 206794946 | 12/2017 |
| CN | 108350676 | 7/2018 |

(Continued)

OTHER PUBLICATIONS

"Square Bits Replace Grader Cutting Edge", Machine Design, Penton Media, Cleveland, OH, US, vol. 62 No. 5 Mar. 8, 1990. p. 86. XP000123468. ISSN:0024-9114, the whole document.

*Primary Examiner* — Tara Mayo

(57) ABSTRACT

A blade assembly includes an adapter board including a lower tool bit attachment portion, terminating in a lower adapter board free end, the lower adapter board free end defining a bottom surface defining a plurality of shank receiving bores. A plurality of bushings are disposed in a corresponding one of the plurality of shank receiving bores.

20 Claims, 45 Drawing Sheets

(56) References Cited

U.S. PATENT DOCUMENTS

| | | |
|---|---|---|
| 9,387,723 B2 | 7/2016 | Beatty |
| 2008/0139061 A1 | 6/2008 | Chen |
| 2013/0248215 A1* | 9/2013 | Tutschek et al. ..... E02F 9/2833 |
| | | 172/762 |
| 2017/0136612 A1 | 5/2017 | Moore |
| 2018/0195255 A1 | 7/2018 | Congdon et al. |

FOREIGN PATENT DOCUMENTS

| | | |
|---|---|---|
| EP | 3045591 A1 | 7/2016 |
| FR | 2332381 A1 | 6/1977 |
| WO | 0068512 A1 | 11/2000 |
| WO | 2013101501 A1 | 7/2013 |

\* cited by examiner

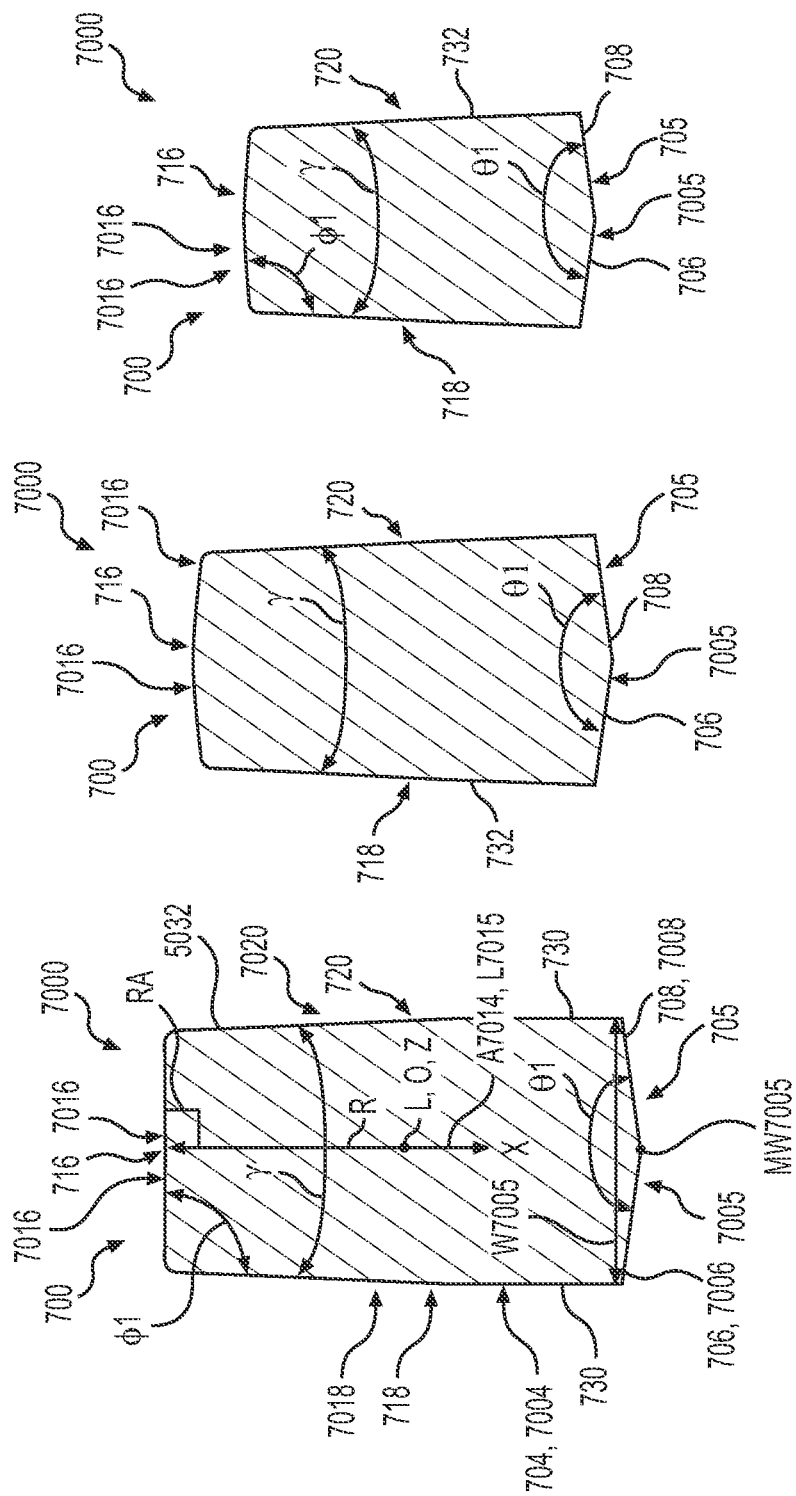

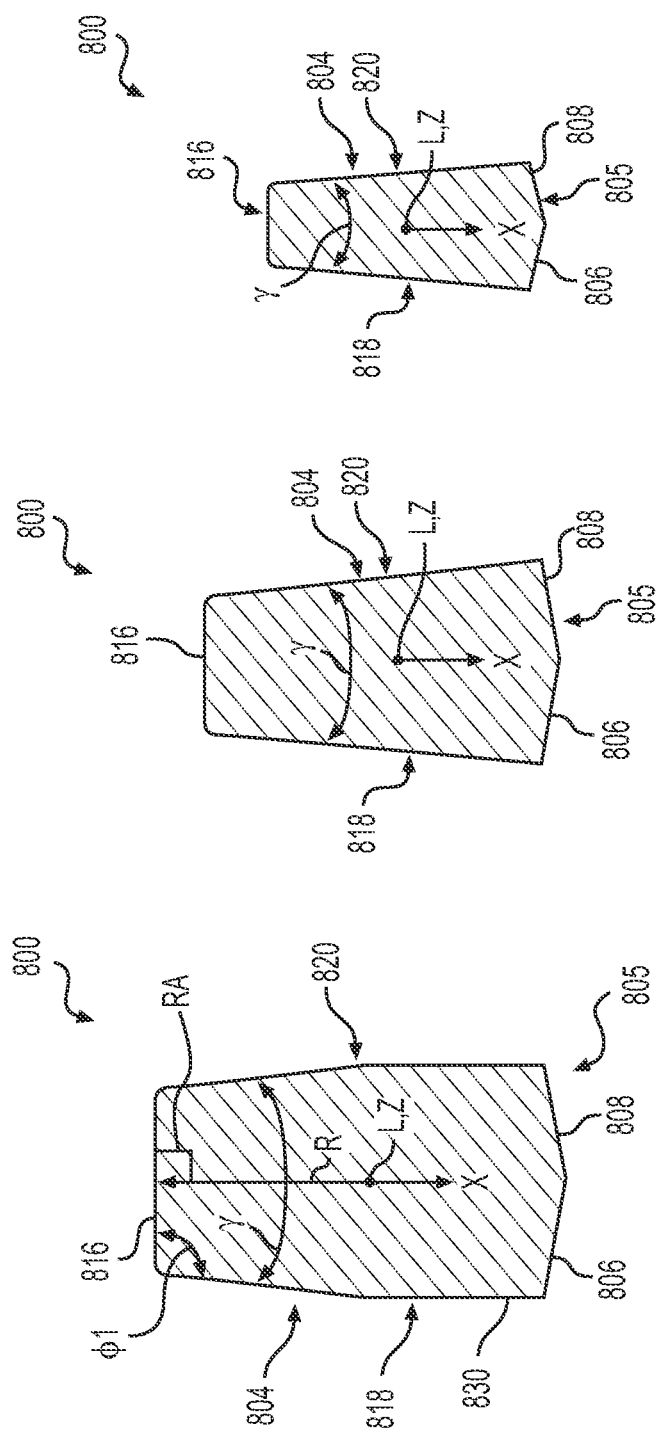

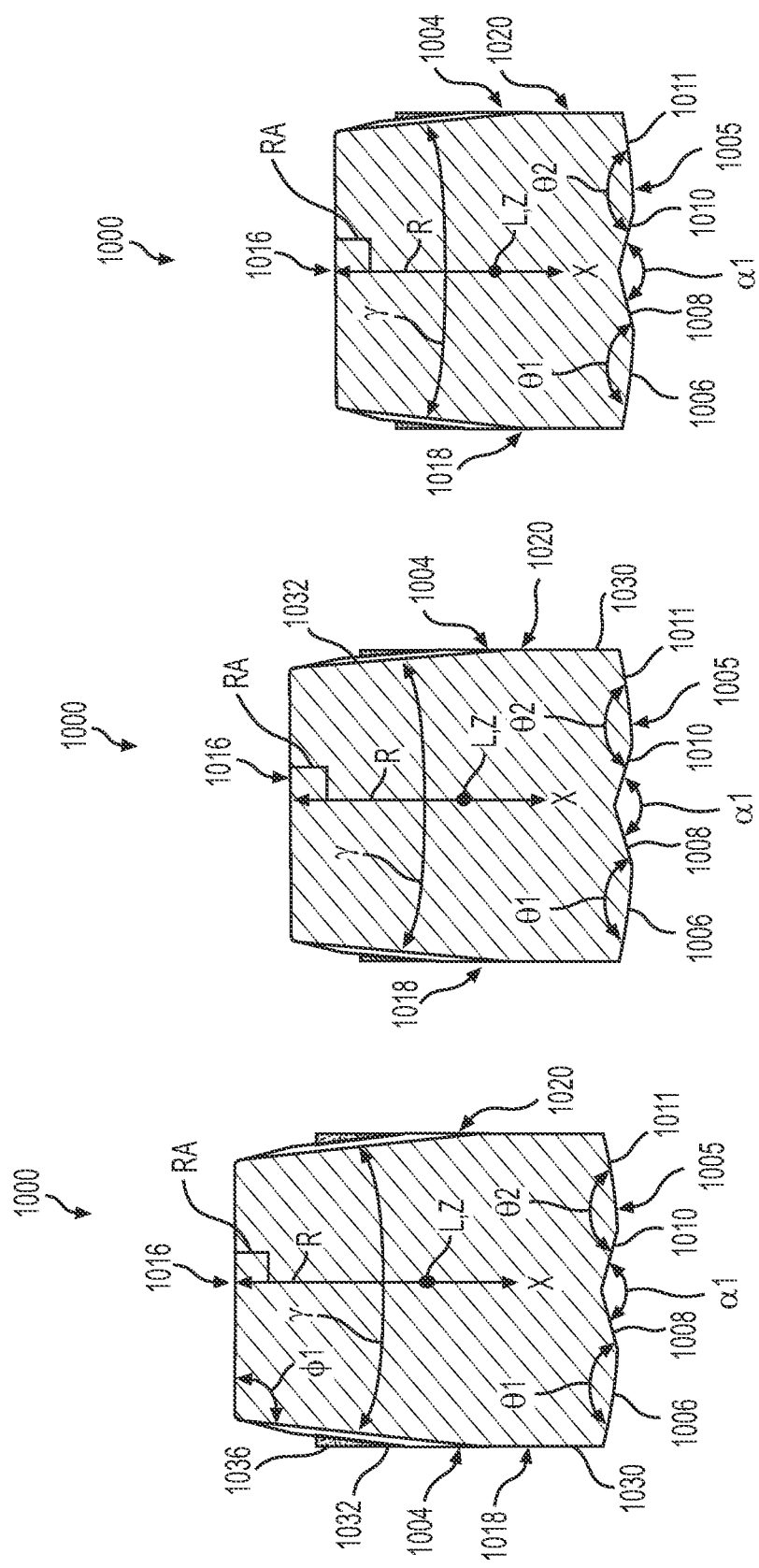

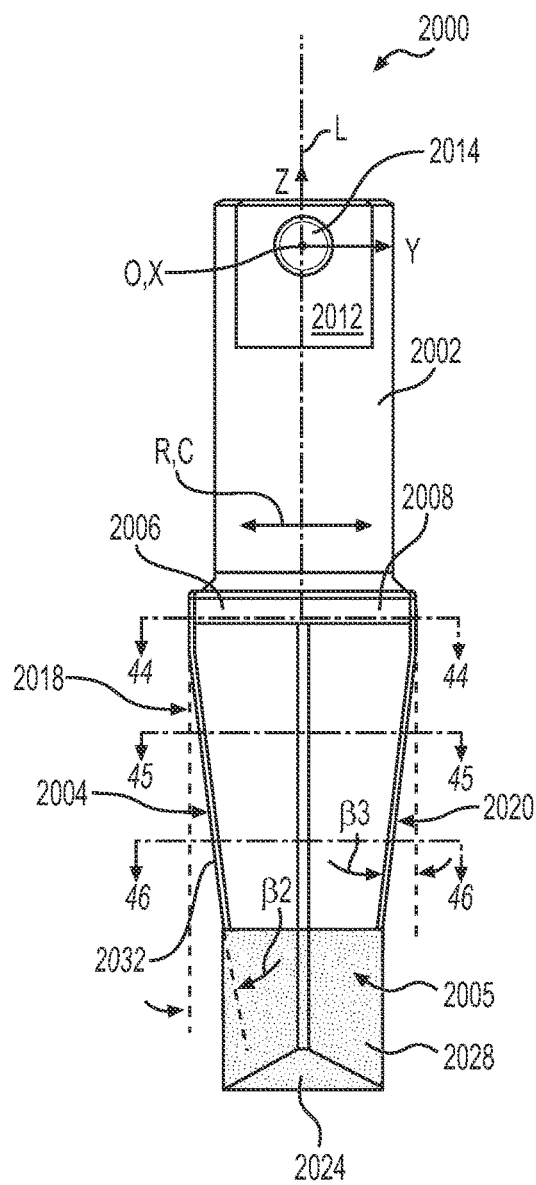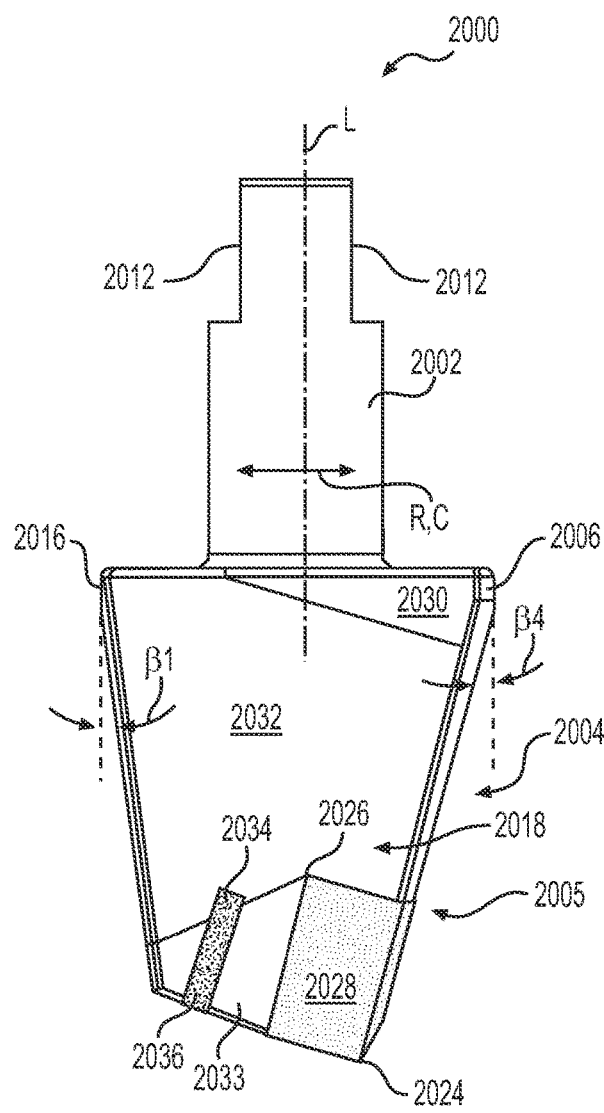
FIG. 42
FIG. 43

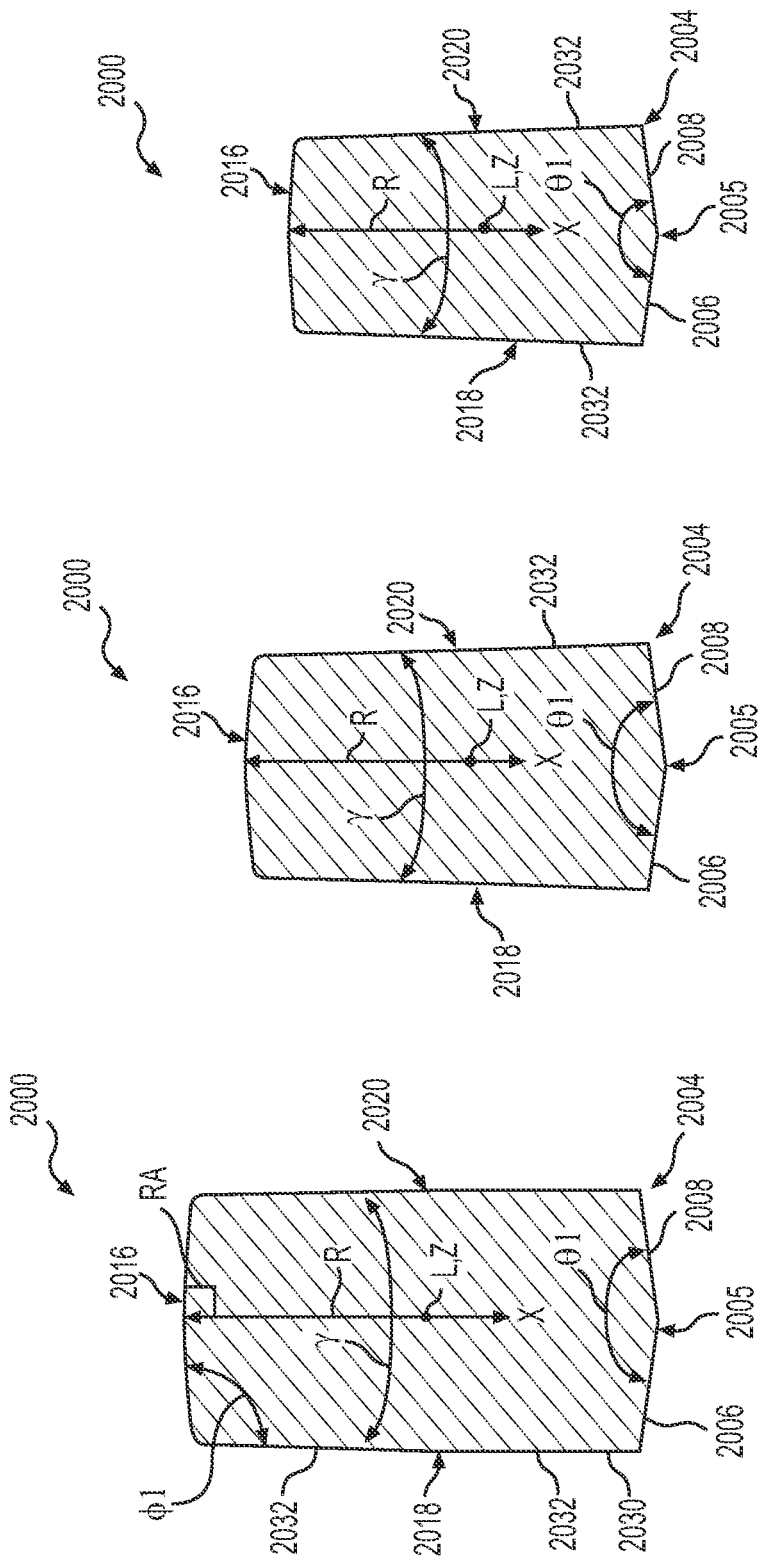

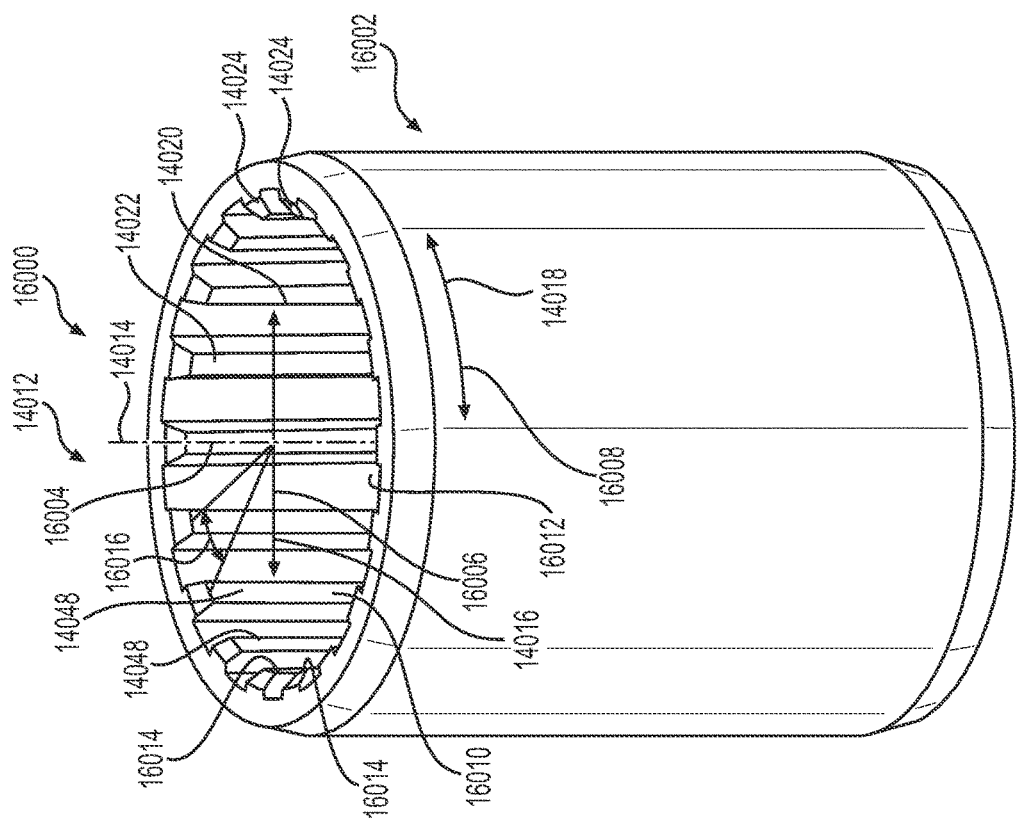
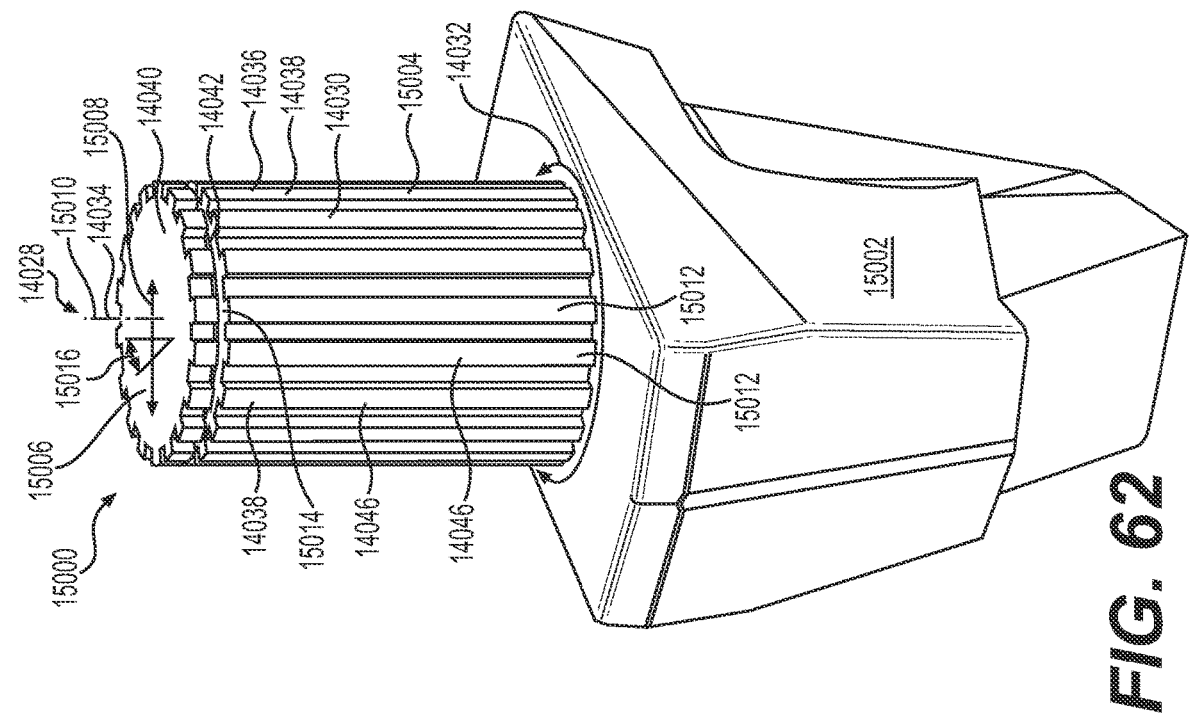

ADAPTER BOARD WITH SPLINED BUSHING

CROSS-REFERENCE TO RELATED APPLICATION

The present application is a divisional application of application Ser. No. 16/182,736, filed on Nov. 7, 2018, entitled "Adapter Board with Splined Bushing", claiming priority thereto, and incorporating its contents by reference in its entirety herein.

TECHNICAL FIELD

The present disclosure relates to blade assemblies with an adapter board having removable tool bits attached thereto. More specifically, the present disclosure relates to a blade assembly with pry point that help allow the tool bits to be removed.

BACKGROUND

Machines such as motor graders employ a long blade that is used to level work surfaces during the grading phase of a construction project or the like. These blades often encounter abrasive material such as rocks, dirt, etc. that can degrade the working edge, making such blades ineffective for their intended purpose. Some blades have a serrated cutting edge meaning that the edge is not continuously flat but undulates up and down, forming teeth. A drawback to such blades is that the teeth may be more easily worn than is desired. In harsh environments, such blades may be rendered dull, with the teeth having been essentially removed, after 100-200 hours of operation. Necessitating their replacement. Serrated cutting edges are sometimes provided to improve penetration via the use of detachable tool bits, etc.

Often, the tool bits that are attached to the adapter board of a blade assembly experience significant loads that may alter the shape of the tool bit and/or the adapter board to which the tool bit has been attached. Consequently, removing the tool bits may be difficult as a press fit or catch point is created by the deformation of the adapter board and/or the tool bit. This may necessitate pressing the tool bit out adapter board. This may be time consuming and/or may cause damage to the tool bit or adapter board.

In other situations, the bit shank hole will experience packing of material scraped by the blade assembly and this will result in the bit getting seized within the bit shank hole. Some customers will try to strike the bits with a hammer but this results in the bits mushrooming within the bit shank hole and making it harder to remove them In either case, the adapter board or the tool bit may need to be replaced, increasing the cost of using such blade assemblies.

Accordingly, there exists a need for providing a blade assembly that allows for easier removal of tool bits, especially after the tool bits have been used in a blade assembly and have been subjected to significant loads.

SUMMARY OF THE DISCLOSURE

A blade assembly according to an embodiment of the present disclosure may comprise an adapter board including a lower tool bit attachment portion, terminating in a lower adapter board free end, the lower adapter board free end defining a bottom surface defining a plurality of shank receiving bores. A plurality of bushings may be disposed in a corresponding one of the plurality of shank receiving bores.

A splined tool bit according to an embodiment of the present disclosure may comprise a working portion; and a splined shank portion extending from the working portion to a splined shank portion free end.

A splined bushing according to an embodiment of the present disclosure may comprise an annular cylindrical body defining a longitudinal axis, a radial direction, and a circumferential direction, the annular cylindrical body including an inner cylindrical surface defining a thru-hole that extends axially through the annular cylindrical body, the body further including a plurality of bushing splines. Each one of the plurality of bushing splines may extend axially and radially from the inner cylindrical surface and may be spaced circumferentially away from an adjacent one of the plurality of bushing splines.

BRIEF DESCRIPTION OF THE DRAWINGS

FIG. 20 is a cross-section of the standard grader tool bit of FIG. 18 taken along lines 20-20 thereof.

FIG. 21 is a cross-section of the standard grader tool bit of FIG. 18 taken along lines 21-21 thereof.

FIG. 22 is a cross-section of the standard grader tool bit of FIG. 18 taken along lines 22-22 thereof.

FIG. 26 is a cross-section of the sharp grader tool bit of FIG. 24 taken along lines 26-26 thereof.

FIG. 27 is a cross-section of the sharp grader tool bit of FIG. 24 taken along lines 27-27 thereof.

FIG. 28 is a cross-section of the sharp grader tool bit of FIG. 24 taken along lines 28-28 thereof.

FIG. 38 is a cross-section of the wide mining tool bit of FIG. 36 taken along lines 38-38 thereof.

FIG. 39 is a cross-section of the wide mining tool bit of FIG. 36 taken along lines 39-39 thereof.

FIG. 40 is a cross-section of the wide mining tool bit of FIG. 36 taken along lines 40-40 thereof.

FIG. 42 is a front view of the standard mining tool bit of FIG. 41.

FIG. 43 is a side view of the standard mining tool bit of FIG. 41.

FIG. 44 is a cross-section of the standard mining tool bit of FIG. 42 taken along lines 44-44 thereof.

FIG. 45 is a cross-section of the standard mining tool bit of FIG. 42 taken along lines 45-45 thereof.

FIG. 46 is a cross-section of the standard mining tool bit of FIG. 42 taken along lines 46-46 thereof.

FIG. 62 is a perspective view of the tool bit having a splined shank portion according to an embodiment of the present disclosure that may be used in the blade assembly of FIG. 61.

FIG. 63 is a perspective view of the splined bushing according to an embodiment of the present disclosure that may be used in the blade assembly of FIG. 61.

DETAILED DESCRIPTION

Figure 1:
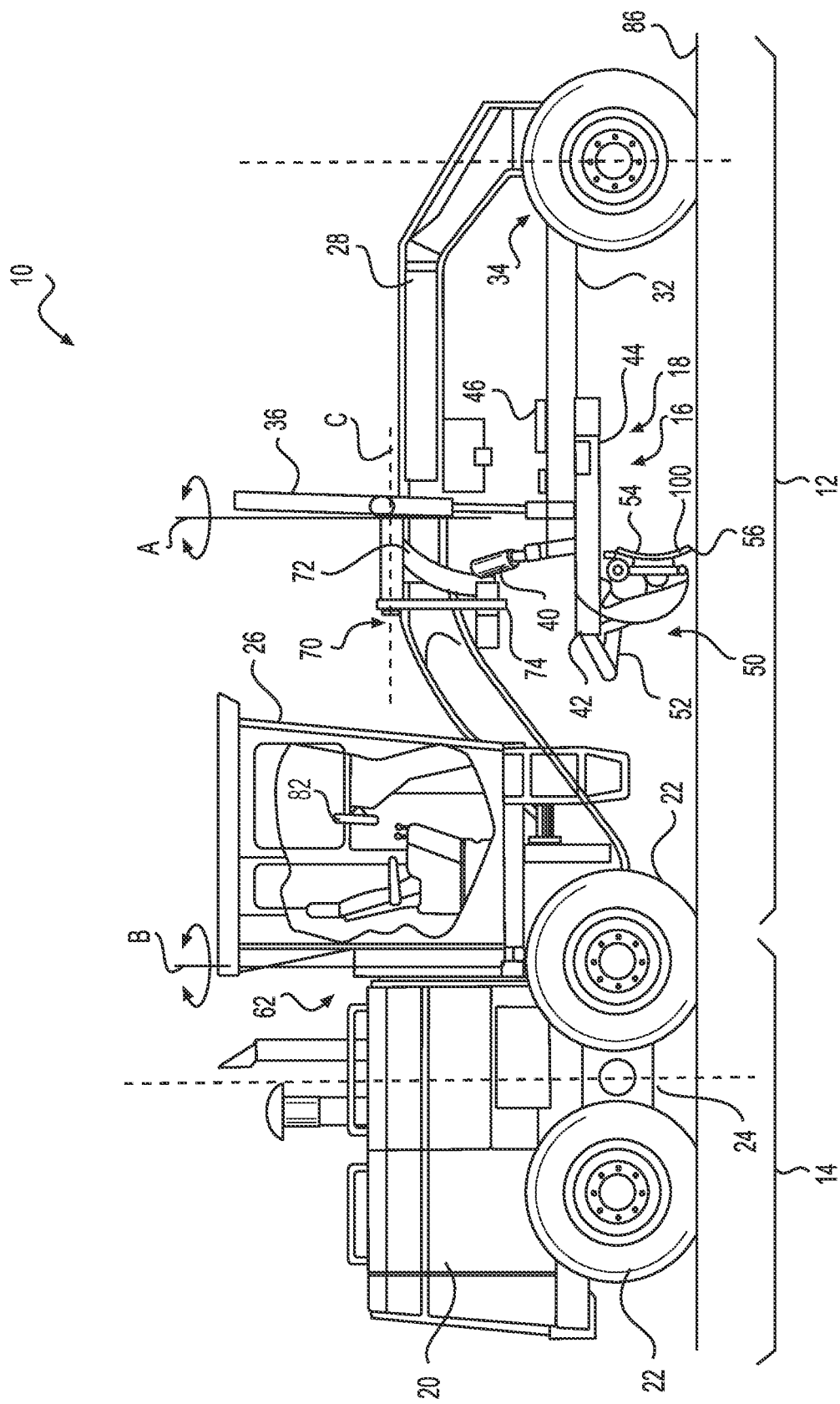
FIG. 1 is a side view of a motor grader that may employ a blade assembly and/or a tool bit according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

A blade assembly using tool bits with arcuate surfaces according to an embodiment of the present disclosure will be described. Then, a tool bit with an arcuate surface will be discussed.

First, a machine will now be described to give the reader the proper context for understanding how various embodiments of the present disclosure are used to level or grade a work surface. It is to be understood that this description is given as exemplary and not in any limiting sense. Any embodiment of an apparatus or method described herein may be used in conjunction with any suitable machine.

FIG. 1 is a side view of a motor grader in accordance with one embodiment of the present disclosure. The motor grader 10 includes a front frame 12, rear frame 14, and a work implement 16, e.g., a blade assembly 18, also referred to as a drawbar-circle-moldboard assembly (DCM). The rear frame 14 includes a power source (not shown), contained within a rear compartment 20, that is operatively coupled through a transmission (not shown) to rear traction devices or wheels 22 for primary machine propulsion.

As shown, the rear wheels 22 are operatively supported on tandems 24 which are pivotally connected to the machine between the rear wheels 22 on each side of the motor grader 10. The power source may be, for example, a diesel engine, a gasoline engine, a natural gas engine, or any other engine known in the art. The power source may also be an electric motor linked to a fuel cell, capacitive storage device, battery, or another source of power known in the art. The transmission may be a mechanical transmission, hydraulic transmission, or any other transmission type known in the art. The transmission may be operable to produce multiple output speed ratios (or a continuously variable speed ratio) between the power source and driven traction devices.

The front frame 12 supports an operator station 26 that contains operator controls 82, along with a variety of displays or indicators used to convey information to the operator, for primary operation of the motor grader 10. The front frame 12 also includes a beam 28 that supports the blade assembly 18 and which is employed to move the blade assembly 100 to a wide range of positions relative to the motor grader 10. The blade assembly 18 includes a drawbar 32 pivotally mounted to a first end 34 of the beam 28 via a ball joint (not shown). The position of the drawbar 32 is controlled by three hydraulic cylinders: a right lift cylinder 36 and left lift cylinder (not shown) that control vertical movement, and a center shift cylinder 40 that controls horizontal movement. The right and left lift cylinders are connected to a coupling 70 that includes lift arms 72 pivotally connected to the beam 28 for rotation about axis C. A bottom portion of the coupling 70 has an adjustable length horizontal member 74 that is connected to the center shift cylinder 40.

The drawbar 32 includes a large, flat plate, commonly referred to as a yoke plate 42. Beneath the yoke plate 42 is a circular gear arrangement and mount, commonly referred to as the circle 44. The circle 44 is rotated by, for example, a hydraulic motor referred to as the circle drive 46. Rotation of the circle 44 by the circle drive 46 rotates the attached blade assembly 100 about an axis A perpendicular to a plane of the drawbar yoke plate 42. The blade cutting angle is defined as the angle of the blade assembly 100 relative to a longitudinal axis of the front frame 12. For example, at a zero degree blade cutting angle, the blade assembly 100 is aligned at a right angle to the longitudinal axis of the front frame 12 and beam 28.

The blade assembly 100 is also mounted to the circle 44 via a pivot assembly 50 that allows for tilting of the blade assembly 100 relative to the circle 44. A blade tip cylinder 52 is used to tilt the blade assembly 100 forward or rearward. In other words, the blade tip cylinder 52 is used to tip or tilt a top edge 54 relative to the bottom cutting edge 56 of the blade 30, which is commonly referred to as blade tip. The blade assembly 100 is also mounted to a sliding joint associated with the circle 44 that allows the blade assembly 100 to be slid or shifted from side-to-side relative to the circle 44. The side-to-side shift is commonly referred to as blade side shift. A side shift cylinder (not shown) is used to control the blade side shift. The placement of the blade assembly 100 allows a work surface 86 such as soil, dirt, rocks, etc. to be leveled or graded as desired. The motor grader 10 includes an articulation joint 62 that pivotally connects front frame 12 and rear frame 14, allowing for complex movement of the motor grader, and the blade.

U.S. Pat. No. 8,490,711 to Polumati illustrates another motor grader with fewer axes of movement than that just described with respect to FIG. 1. It is contemplated that such a motor grader could also employ a blade according to various embodiments of the present disclosure, etc. Other machines than graders may use various embodiments of the present disclosure.

Figure 2:
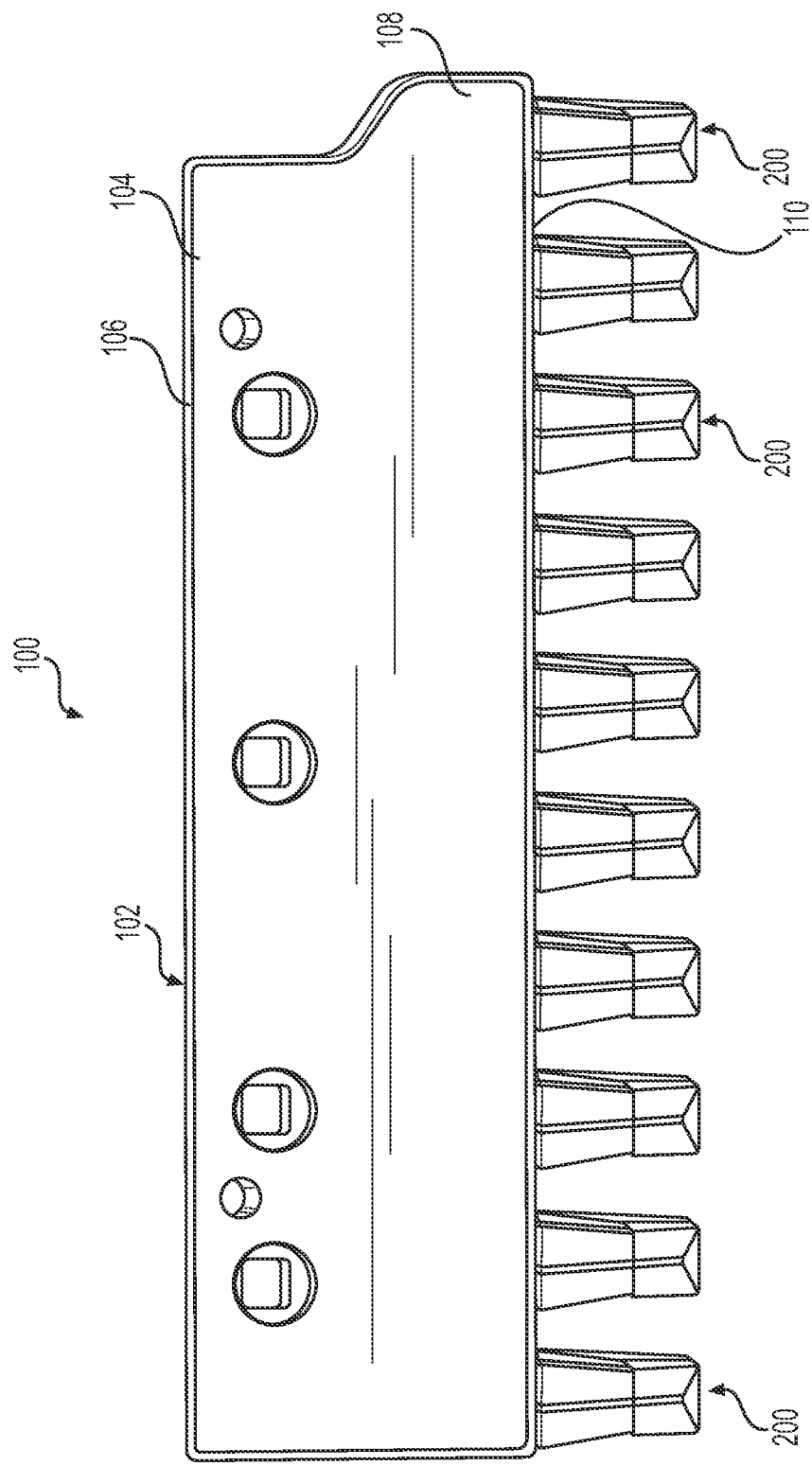
FIG. 2 is a front oriented perspective view of a blade assembly according to an embodiment of the present disclosure utilizing a tool bit with arcuate bit surfaces shown in isolation from the machine of FIG. 1.

Turning now to FIG. 2, a blade assembly 100 for use with a grading machine 10 according to an embodiment of the present disclosure will be described. The blade assembly 100 comprises an adapter board 102 defining an upper adapter board attachment portion 104, terminating in an upper adapter board free end 106. This portion 104 is used to attach to a moldboard (not shown). The adapter board 100 further comprising a lower tool bit attachment portion 108, terminating in a lower adapter board free end 110. The lower tool bit attachment portion 108 defines a length along the lateral direction. A plurality of tool bits 200 are provided that are configured to be attached to the adapter board 102. While FIG. 2 shows the tool bits 200 already attached to the adapter board 102 via mounting hardware (not shown), it is to be understood that the tool bits 200 may be supplied with the adapter board 102 or separately from the adapter board 102, without being attached to the adapter board 102.

Figure 3:
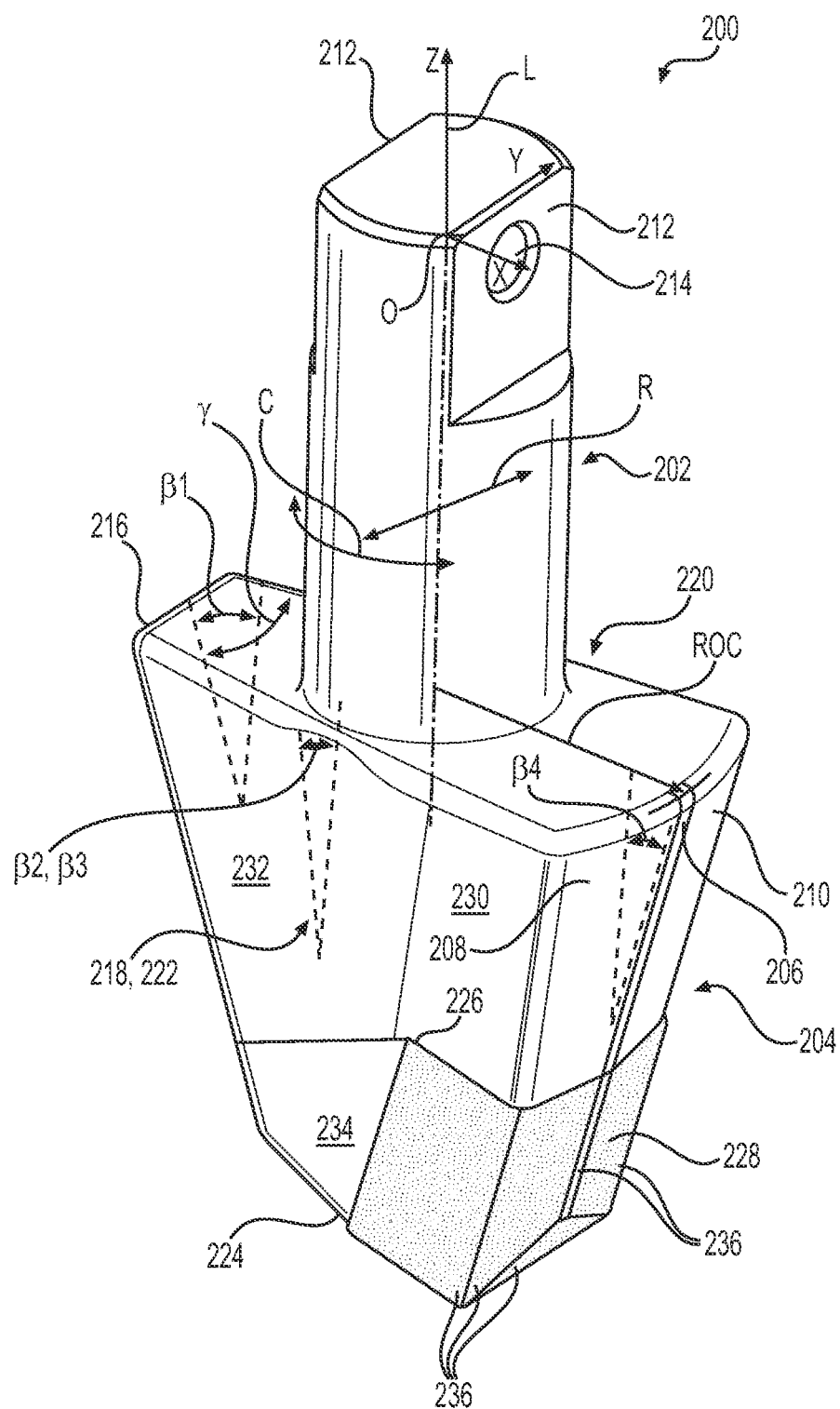
FIG. 3 is a perspective view of a first embodiment of the present disclosure showing a tool bit utilizing an arcuate bit surface that may be used in conjunction with the blade assembly of FIG. 2.

Looking now at FIGS. 2 and 3, each tool bit 200 may include a shank portion 202 defining a longitudinal axis L, and a working portion 204. The working portion 204 may include at least a first arcuate surface 206 disposed longitudinally adjacent the shank portion 202, and the at least first arcuate surface 206 may define a radius of curvature ROC (measured in a plane perpendicular to the longitudinal axis L) that is equal to or greater than half of the width W of the lower tool bit attachment portion 108 of the adapter board 102. Examples of arcuate surfaces include radial, elliptical, polynomial surfaces, etc.

As best seen in FIGS. 2, and 7 thru 10, the lower tool bit attachment portion 108 of the adapter board 102 may define a plurality of cylindrical thru-bores 112. As shown in FIG. 3, the shank portion 202 of the tool bit 200 may include a cylindrical configuration defining a circumferential direction C and a radial direction R. The shank portion 202 may be configured to fit snugly within one of the plurality of cylindrical thru-bores 112.

Focusing on FIG. 3, the working portion 204 of the tool bit 200 includes a second arcuate surface 208 disposed adjacent the first arcuate surface 206 circumferentially on one side of the first arcuate surface 206 and a third arcuate surface 210 disposed adjacent the first arcuate surface 206 on the other side of the first arcuate surface 206. The shank portion 202 defines two flat surfaces 212 circumferentially aligned with the first arcuate surface 206, the two flat surfaces 212 partially defining a cross-hole 214 extending radially thru the shank portion 202. Mounting hardware (not shown) may be used in conjunction with the cross-hole 214 of the shank portion 202 for retaining the tool bit 200 to the adapter board 102. As best seen in FIGS. 7 thru 10, the flat surfaces 212 may be used with an orientation plate 114 that sits on top of the lower tool bit attachment portion 108 to control the angle of inclination a of the tool bits 200 relative to the centerline CL of the blade assembly 100.

Returning to FIG. 3, the first arcuate surface 206, second arcuate surface 208 and/or third arcuate surface 210 may define a radius of curvature ROC ranging from 50 mm to 65 mm. As alluded to earlier herein, the radius of curvature ROC may be adjusted based on the width W of the lower tool bit attachment portion 108 of the adapter board 102 and is measured in a plane perpendicular to the longitudinal axis L. As used herein, the width W is often the minimum dimension of the lower tool bit attachment portion 108 measured along a direction perpendicular to the longitudinal axis L of the shank portion 202 (parallel to CL in FIG. 7). The tool bit 200 may further comprising a rear face 216, a first side region 218 extending from the second arcuate surface 208 to the rear face 216, and a second side region 220 extending from the third arcuate surface 210 to the rear face 216. The first side region 218 may be divided into a first set of multiple side surfaces 222 and the second side region 220 may be divided into a second set of multiple side surfaces (not shown). The working portion 204 defines a free axial end 224 and a notch 226 disposed proximate the free axial end 224. An insert 228 or tile may be disposed in the notch 226. The insert 228 may be made from a carbide material such as Tungsten Carbide with a binding agent (such as Cobalt). The tool bit 200 itself or the adapter board 102 may be forged or cast using iron, grey cast-iron, steel or any other suitable material.

Various surfaces of the working portion 204 of the tool bit 200 may be drafted relative to the longitudinal axis L of the shank portion 202, allowing the tool bit 200 to enter and exit the ground or other work surface more easily. The draft angle would be the angle formed between the longitudinal axis L and the surface in a cross-section defined by a plane containing the radial direction R and the longitudinal axis L. The draft angle may be negative, resulting in the width of the cross-section of the working portion, in a plane perpendicular to the longitudinal axis L, decreasing as one progresses upwardly along the longitudinal axis L toward the shank portion (this may be the case in FIG. 4). Alternatively, the draft angle may be positive, resulting in the width of the cross-section of the working portion increasing as one progresses upwardly along the longitudinal axis L toward the shank portion (this may be the case in FIGS. 3, 5 and 6).

As seen in FIG. 3, the rear face 216 may define a first draft angle $\beta 1$ with the longitudinal axis L ranging from 0 to 30 degrees. Similarly, the first side region 218 may define a second draft angle $\beta 2$ with the longitudinal axis ranging from 0 to 30 degrees. Likewise, the second side region 220 may define a third draft angle $\beta 3$ (same as $\beta 2$ since the tool bit is usually symmetrical) with the longitudinal axis L ranging from 0 to 30 degrees. Also, the first arcuate surface 206, second arcuate surface 208 and/or third arcuate surface 210 define a fourth draft angle $\beta 4$ with the longitudinal axis L ranging from 0 to 30 degrees. Other draft angles or no draft angle may be provided for any of these surfaces in other embodiments.

For the embodiment shown in FIG. 3, a Cartesian coordinate system X, Y, Z may be placed with its origin O at the longitudinal axis L of the shank portion 202 and its X-axis oriented parallel to the cross-hole 214 of the shank portion 202. The tool bit 200 may be symmetrical about the X-Z plane. This may not the case in other embodiments.

Other configurations of the tool bit are possible and considered to be within the scope of the present disclosure. For example, FIG. 4 discloses another embodiment for a tool bit 300 of the present disclosure similarly configured to that of FIG. 3 except for the following differences. This tool bit 300 includes a first arcuate surface 306, a second arcuate surface 308 and a third arcuate surface 310. The tool bit 300 further comprises a fourth arcuate surface 330 extending circumferentially from the third arcuate surface 310, a fifth arcuate surface 332 extending circumferentially from the fourth arcuate surface 330, and a sixth arcuate surface 334 extending circumferentially from the fifth arcuate surface 332. The angle of extension γ of the tool bit 300 formed in a plane perpendicular to the longitudinal axis L is greater than the angle of extension γ of the tool bit 300 in FIG. 3.

The fourth draft angle $\beta 4$ of the first, second, third, fourth, fifth, and sixth arcuate surfaces 306, 308, 310, 330, 332, 334 varies more than the fourth draft angle $\beta 4$ of first, second, and third arcuate surfaces 206, 208, 210 of the embodiments shown in FIG. 3. This forms a depression 336 at the X-Z plane as the arcuate surfaces 306, 308, 310, 330, 332, 334 extend downwardly along the longitudinal axis L. The first draft angle $\beta 1$ of the rear face 316 may range from 0 to 30 degrees. Similarly, the second draft angle $\beta 2$ of the first side region 318 and the third draft angle $\beta 3$ of the second side region 320 may range from 0 to 30 degrees. The radius of curvature ROC of the first, second, third, fourth, fifth and sixth arcuate surfaces 306, 308, 310, 330, 332, 334 may range from 50 mm to 65 mm for the embodiment shown in FIG. 4. Again, the tool bit 300 is symmetrical about the X-Z plane. This may not be the case in other embodiments of the present disclosure.

A tool bit 200, 300, 400, 500 for use with a blade assembly 100 of a grading machine 10 will now be described with reference to FIGS. 3 thru 6 that may be provided separately from the blade assembly 100. The tool bit 200, 300, 400, 500 may comprise a shank portion 202, 302, 402, 502 defining a longitudinal axis L, and a working portion 204, 304, 404, 504. The working portion 204, 304, 404, 504 includes at least a first arcuate surface 206, 306, 406, 506 disposed longitudinally adjacent the shank portion 202, 302, 402, 502. The shank portion 202, 302, 402, 502 includes a cylindrical configuration defining a circumferential direction C and a radial direction R.

The working portion 204, 304, 404, 504 may include a second arcuate surface 208, 308, 408, 508 disposed adjacent the first arcuate surface 206, 306, 406, 506 circumferentially on one side of the first arcuate surface 206, 306, 406, 506 and a third arcuate surface 210, 310, 410, 510 disposed adjacent the first arcuate surface 206, 306, 406, 506 on the other side of the first arcuate surface 206, 306, 406, 506.

The shank portion 202, 302, 402, 502 may define two flat surfaces 212, 312, 412, 512 circumferentially aligned with the first arcuate surface 206, 306, 406, 506. The two flat surfaces 212, 312, 412, 512 partially defining a cross-hole 214, 314, 414, 514 extending radially thru the shank portion 202, 302, 402, 502. The shank portions 202, 302, 402, 502 may be similarly configured so that they will work with the same adapter board 102 of the blade assembly 100.

The working portion 204, 304, 404, 504 may include a first arcuate surface 206, 306, 406, 506, a second arcuate surface 208, 308, 408, 508 or a third arcuate surface 210, 310, 410, 510 that defines a radius of curvature ROC ranging from 50 mm to 65 mm.

Figure 4:
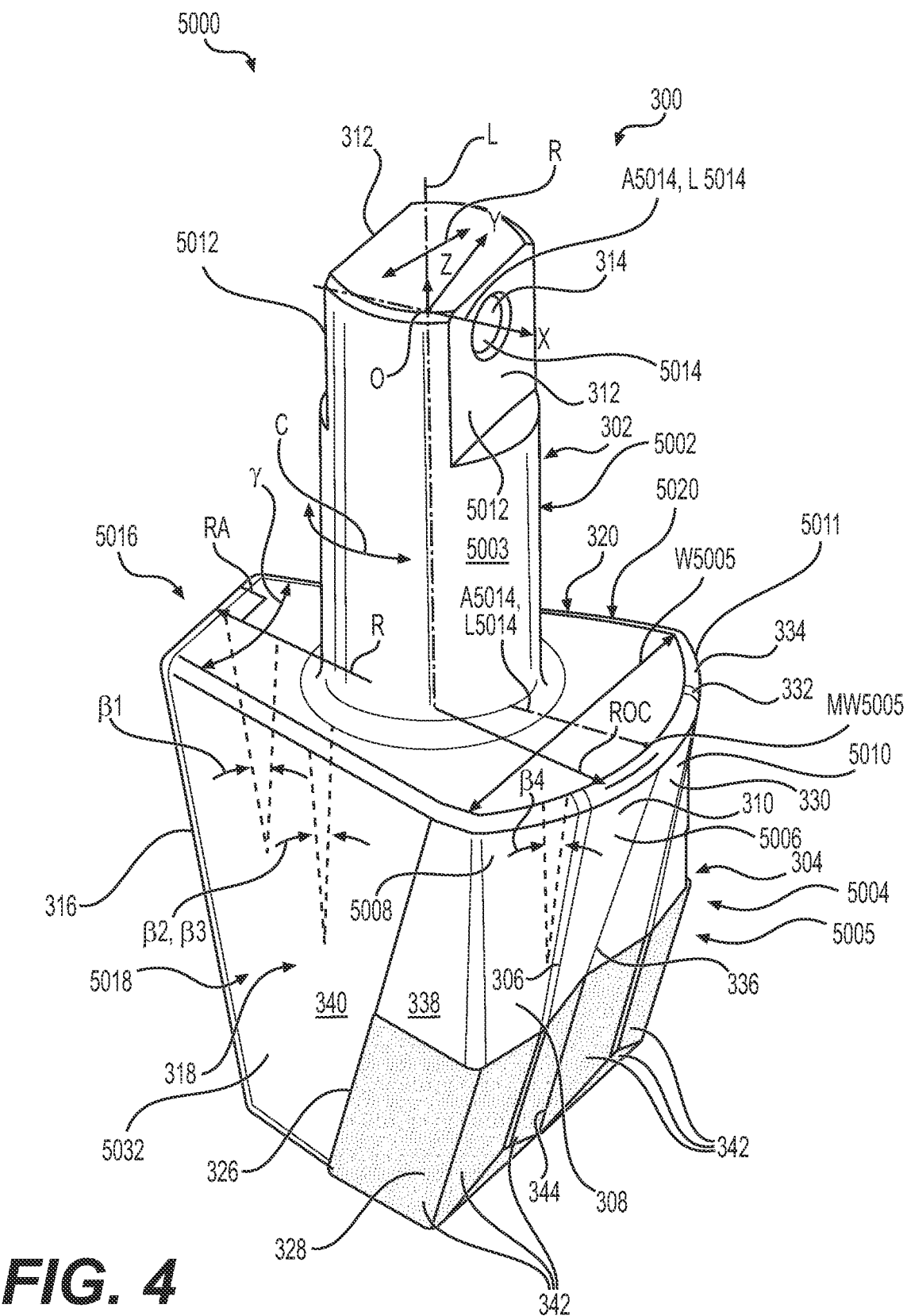
FIG. 4 is a perspective view of a second embodiment of the present disclosure showing a tool bit utilizing a longer arcuate bit surface than the first embodiment of FIG. 3 that may be used in conjunction with the blade assembly of FIG. 2.

The tool bit 200, 300, 400, 500 further comprising a rear face 216, 316, 416, 516, a first side region 218, 318, 418, 518 extending from the second arcuate surface 208, 308, 408, 508 to the rear face 216, 316, 416, 516, and a second side region 220, 320, 420, 520 extending from the third arcuate surface 210, 310, 410, 510 to the rear face 216, 316, 416, 516. As shown in FIG. 4, the tool bit 300 may further comprising a fourth arcuate surface 330 extending circumferentially from the third arcuate surface 310, a fifth arcuate surface 332 extending circumferentially from the fourth arcuate surface 330, and a sixth arcuate surface 334 extending circumferentially from the fifth arcuate surface 332.

Referring again to FIGS. 3 thru 6, the working portion 204, 304, 404, 504 may define a free axial end 224, 324, 424, 524 and a notch 226, 326, 426, 526 disposed proximate the free axial end 224, 324, 424, 524. An insert 228, 328, 428, 528 disposed in the notch 226, 326, 426, 526.

The rear face 216, 316, 416, 516 defines a first draft angle $\beta 1$ with the longitudinal axis L ranging from 0 to 40 degrees, the first side region 218, 318, 418, 518 defines a second draft angle $\beta 2$ with the longitudinal axis L ranging from 0 to 40 degrees, the second side region 220, 320, 420, 520 defines a third draft angle $\beta 3$ with the longitudinal axis L ranging from 0 to 40 degrees, and the first arcuate surface 206, 306, 406, 506, second arcuate surface 208, 308, 408, 508 and third arcuate surface 210, 310, 410, 510 define a fourth draft angle $\beta 4$ with the longitudinal axis L ranging from 0 to 30 degrees. Each of the tool bits 200, 300, 400, 500 are symmetrical about the X-Z plane. Tool bit 400 has greater draft angles $\beta 1, \beta 2, \beta 3, \beta 4$ than tool bit 300. Tool bit 500 has greater drafter angles $\beta 1, \beta 2, \beta 3, \beta 4$ than tool bit 400.

The differences between the various tool bits 200, 300, 400, 500 of FIGS. 3 thru 6 will now be discussed. As mentioned previously the tool bit 300 of FIG. 4 has a greater angle of extension $\gamma$ as compared to the tool bit 200 of FIG. 3. Also, the side regions 218, 220 of the tool bit 200 of FIG. 3 are slightly different configured than those of FIG. 4. The tool bit of FIG. 3 includes a top side transitional surface 230 connecting the second arcuate surface 208 to the top rear side surface 232. Both these surfaces 230, 232 transition downwardly along the negative Z axis to a bottom side surface 234. The tool bit 300 of FIG. 4 omits the bottom side surface but includes a top side transitional surface 338 and a top rear side surface 340. The differences may be at least partially attributed to providing suitable back support for the inserts 228, 328, which have predominantly angled flat surfaces 236, 342. The insert 328 in FIG. 4 has a depression 344, matching the depression 336 of the tool bit 300. Thus, the tool bit 200, 300 helps provide proper support to the insert 228, 328, thereby helping to prolong its useful life.

Figure 5:
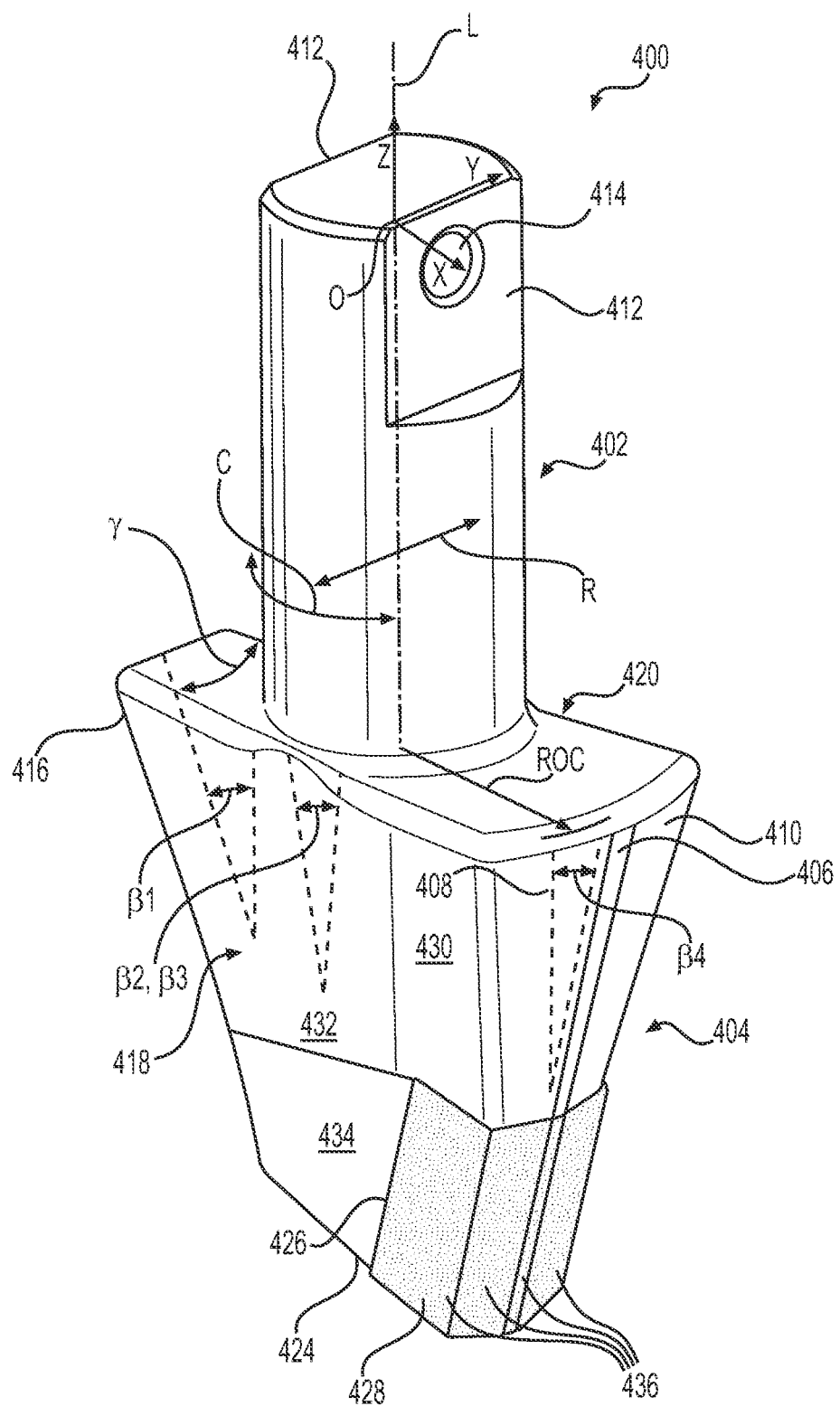
FIG. 5 is a perspective view of a third embodiment of the present disclosure showing a tool bit utilizing an arcuate bit face with more draft than the first embodiment of FIG. 3 that may be used in conjunction with the blade assembly of FIG. 2.
Figure 6:
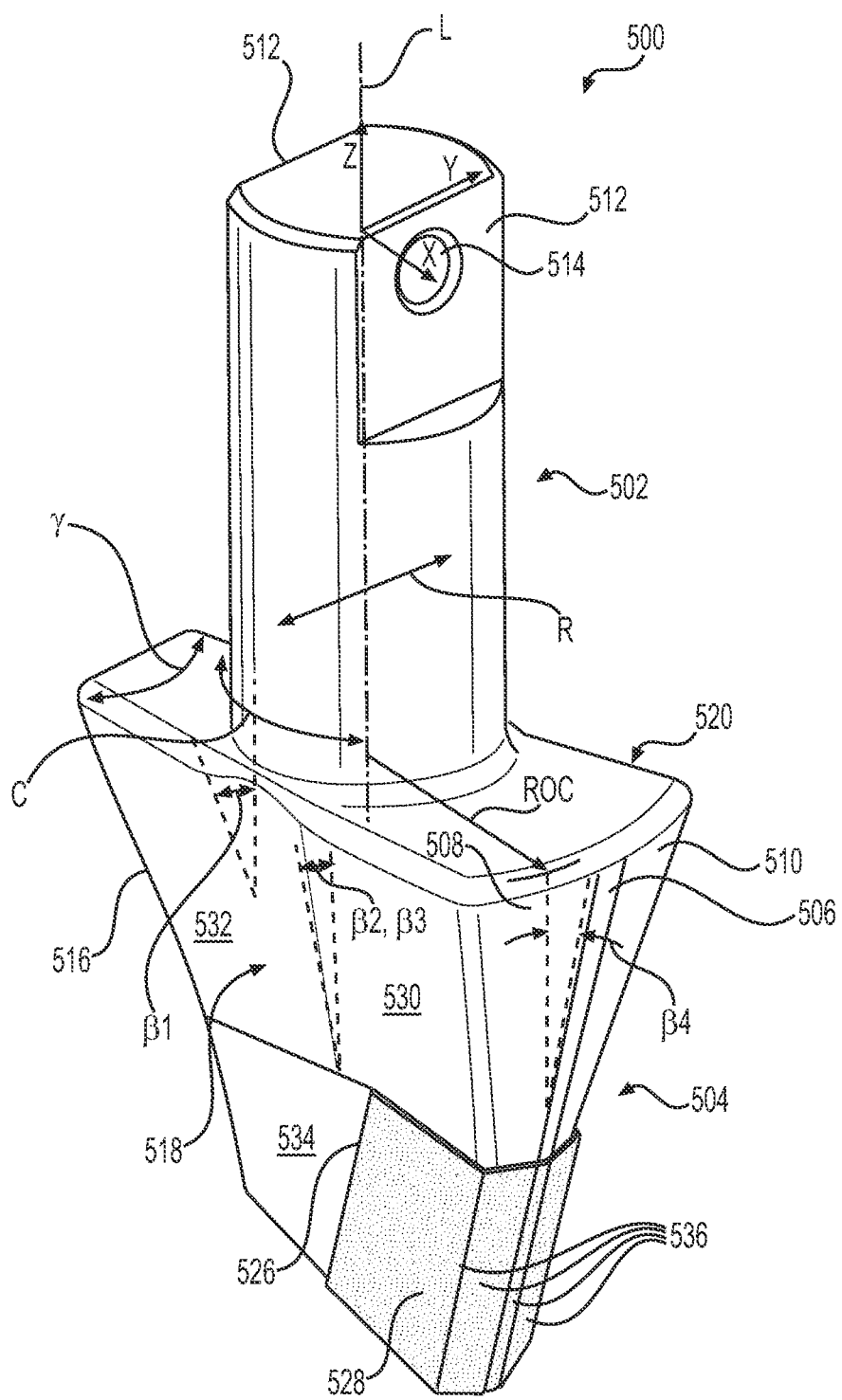
FIG. 6 is a perspective view of a fourth embodiment of the present disclosure showing a tool bit utilizing an arcuate bit face with more draft than the third embodiment of FIG. 5.

The tool bit 400 of FIG. 5 and the tool bit 500 of FIG. 6 have heavier draft angles $\beta 1, \beta 2, \beta 3, \beta 4$ than those of the tool bit 200 of FIG. 3, allowing the these tool bits 400, 500 to penetrate the ground or other work surface more easily than the tool bit 200 of FIG. 3. The tool bit 500 of FIG. 6 has a heavier draft angle $\beta 1, \beta 2, \beta 3, \beta 4$ than the tool bit 400 of FIG. 5 for similar reasons. The side regions 418, 420, 518, 520 of these tool bits 400, 500 also have a top side transitional surface 430, 530 a top rear side surface 432, 532 and a bottom side surface 434, 534 for the same reasons just discussed. Also, the inserts 428, 528 comprise predominately angled flat surfaces 436, 536. This may not the case for other embodiments of the present disclosure. The inserts for any embodiment may be symmetrical about the X-Z plane.

Additional drafted tool bits will now be described with reference to FIGS. 11 thru 46. It is to be understood that various features of the tool bits of FIGS. 11 thru 16 may have arcuate surfaces such as disclosed in FIGS. 3 thru 6. Likewise, the tool bits of FIGS. 3 thru 6, may have the features such as the drafted surfaces, dimensions, angles, etc. as will now be described with reference to FIGS. 11 thru 46.

Figure 11:
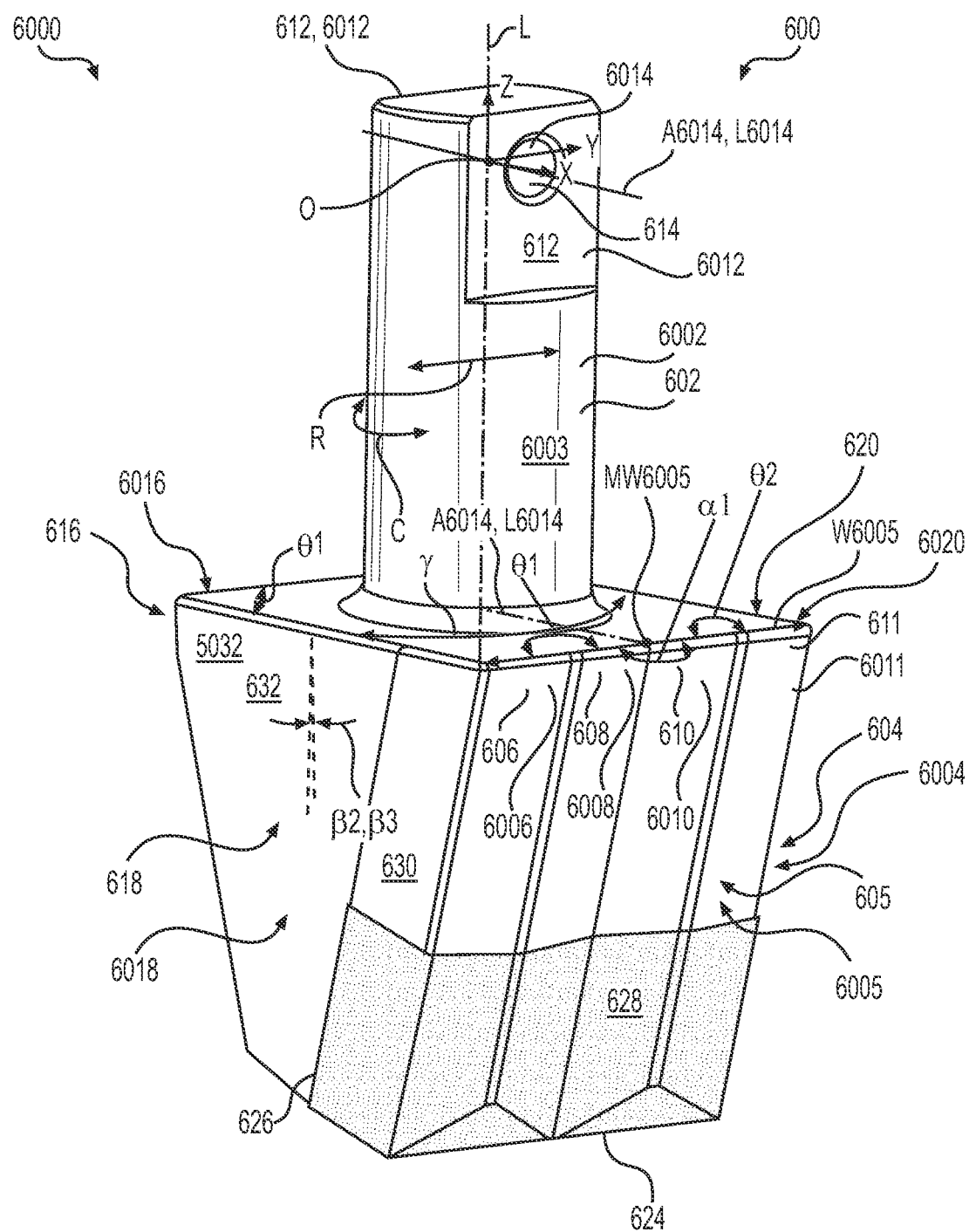
FIG. 11 is a perspective view of a wide grader tool bit that is drafted for reduced drag as the tool bit passes through the ground or other work surface, lacking arcuate surfaces.
Figure 12:
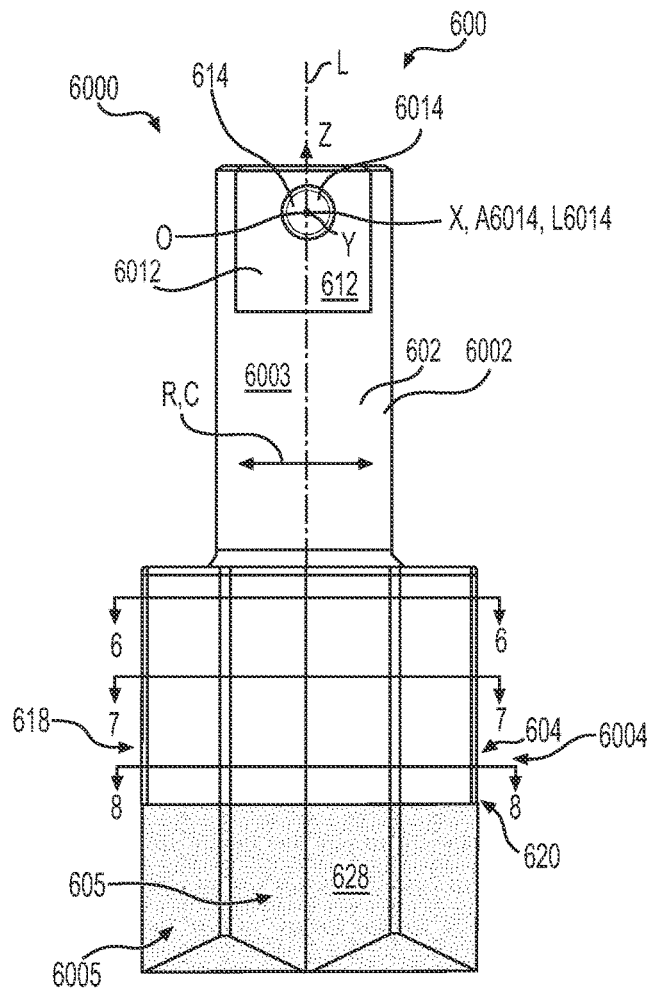
FIG. 12 is a front view of the wide grader tool bit of FIG. 11.
Figure 17:
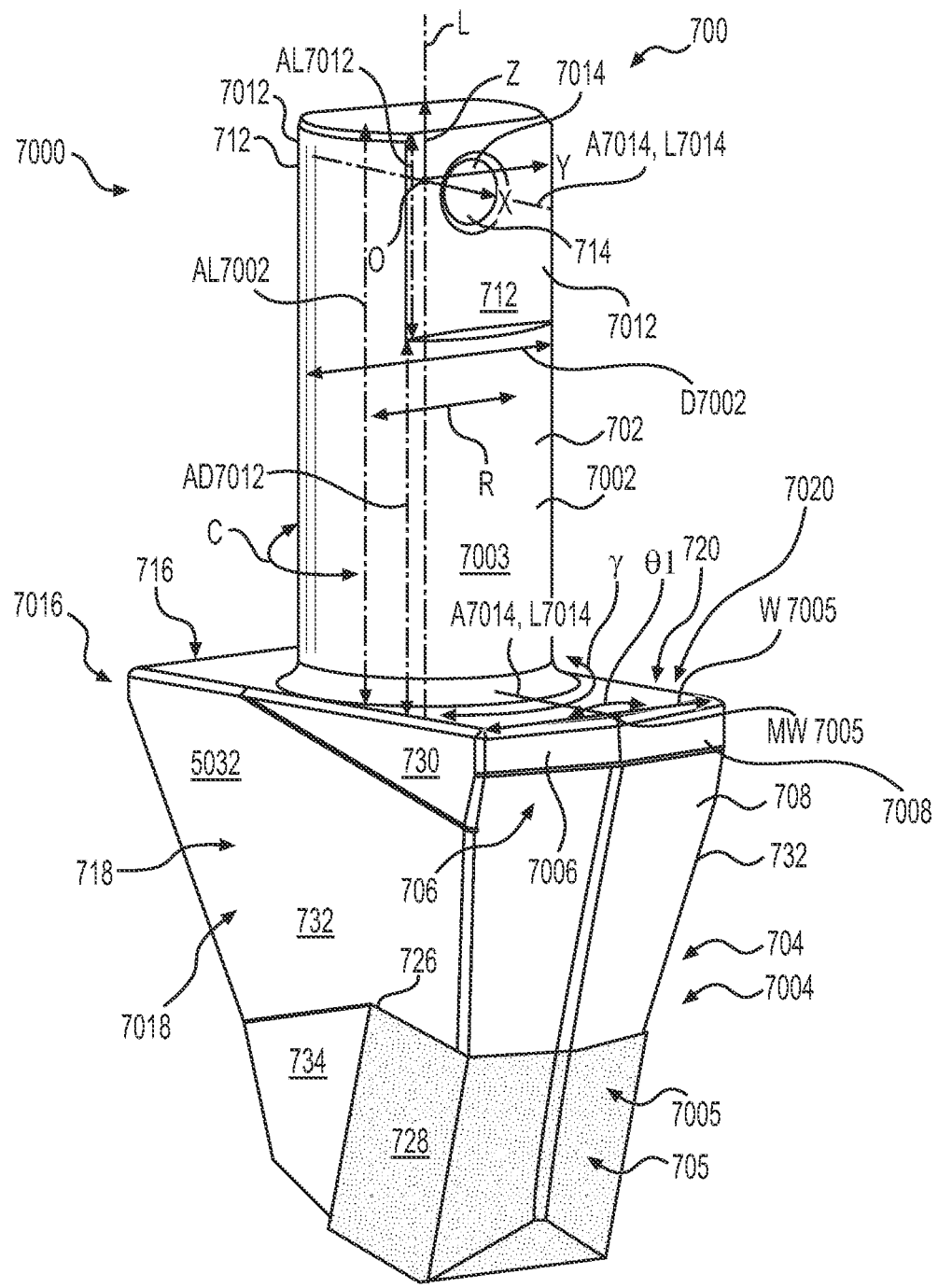
FIG. 17 is a perspective view of a standard grader tool bit that is more heavily drafted than the tool bit of FIG. 11, helping to penetrate the ground or other work surface, and also lacking arcuate surfaces.
Figure 23:
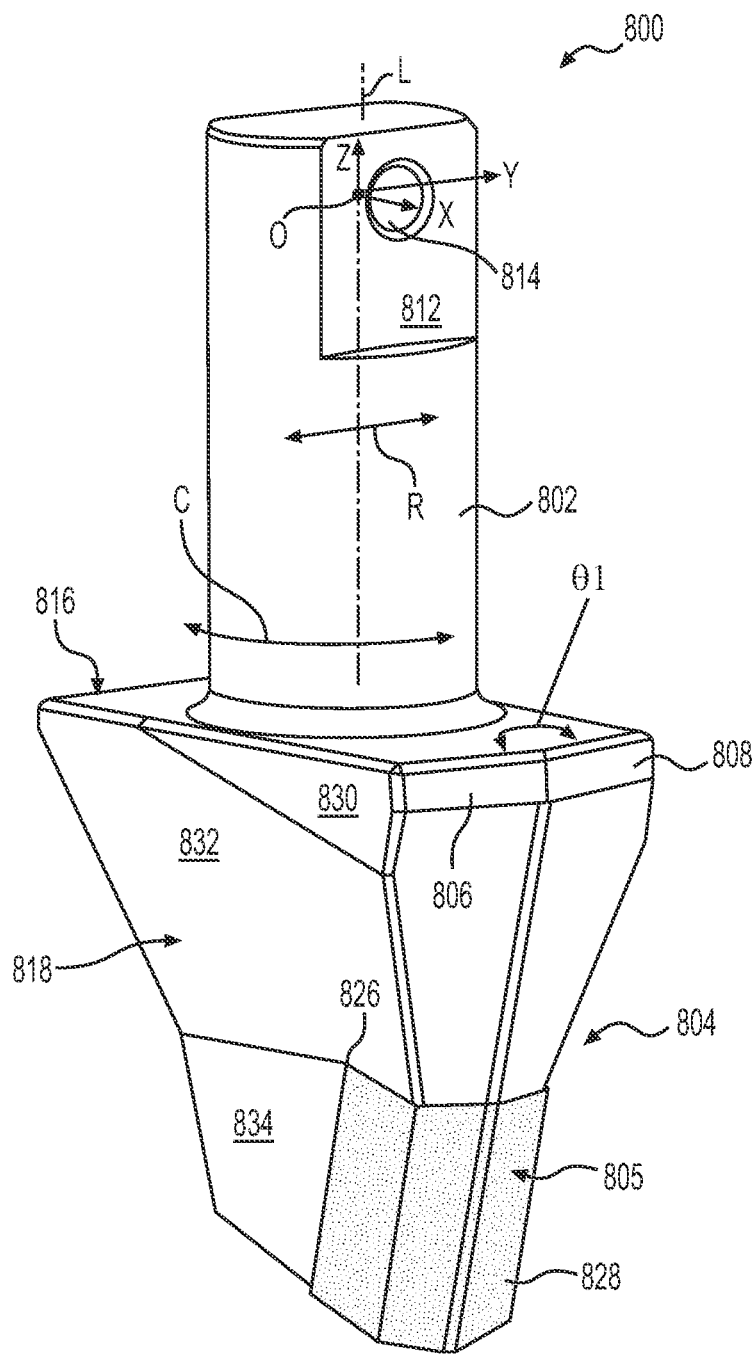
FIG. 23 is a perspective view of a sharp grader tool bit that is more heavily drafted than the tool bit of FIG. 17, helping to penetrate the ground or other work surface, and also lacking arcuate surfaces.
Figure 29:
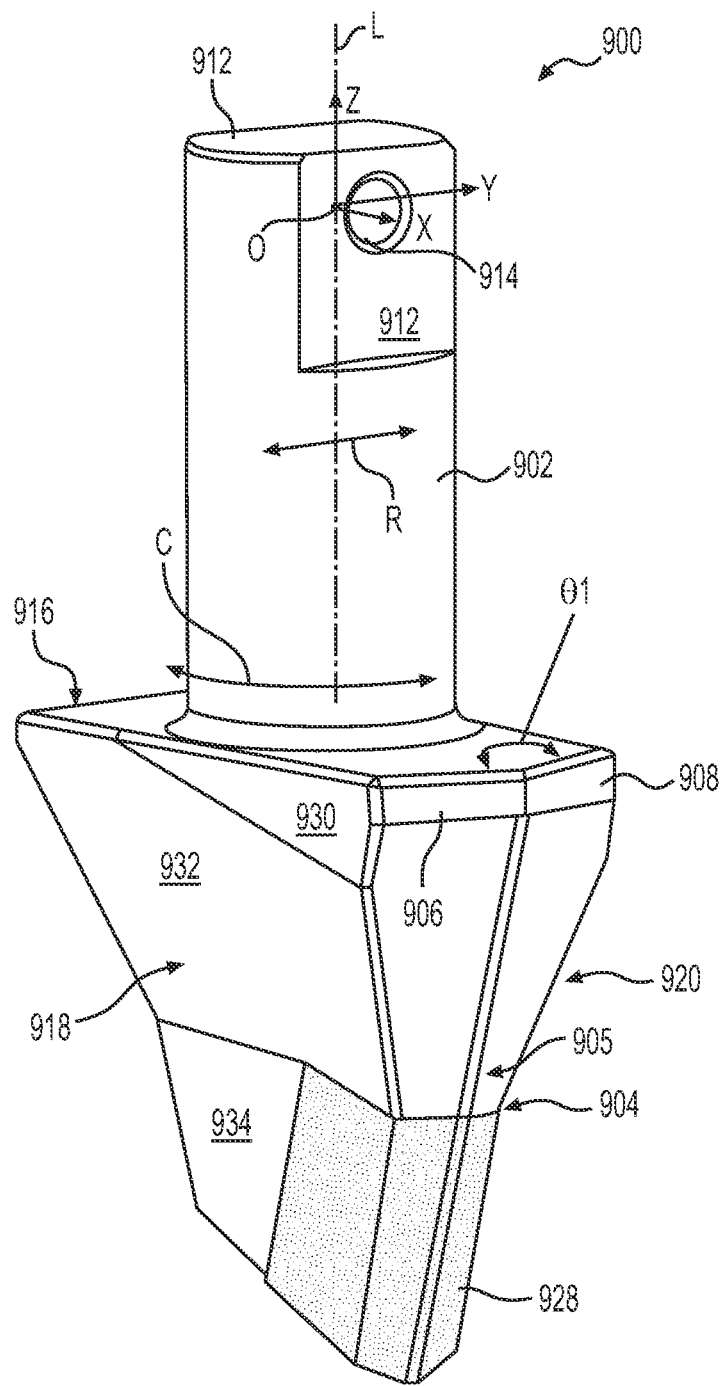
FIG. 29 is a perspective view of a penetration grader tool bit that is more heavily drafted than the tool bit of FIG. 23, helping to penetrate the ground or other work surface, and also lacking arcuate surfaces.

Specifically, in FIGS. 3 and 17, surface 230 may be similarly constructed as surface 730, surface 232 may be similarly constructed as surface 732, and surface 234 may be similarly constructed as surface 734. In FIGS. 4 and 11, surface 338 may be similarly constructed as surface 630, and surface 340 may be similarly constructed as surface 632, etc. In FIGS. 5 and 23, surface 430 and surface 830 may be similarly constructed. Surface 432 and surface 832 may be similarly constructed and surface 434 and surface 734 may be similarly constructed, etc. In FIGS. 6 and 29, surface 530 and surface 930, surface 532 and surface 932, and surface 534 and surface 934 may be similarly, constructed, etc.

Looking at FIGS. 11 thru 16, a tool bit 600 (e.g. a wide grading tool bit) for use with a blade assembly 100 of a grading machine 10 is illustrated. The tool bit 600 comprises a shank portion 602 defining a longitudinal axis L, and a working portion 604. The working portion 604 includes a rear region 616, a front working region 605, a first side region 618 and a second side region 620, and the first side region 618 and the second side region 620 may define an angle of extension $\gamma$ measured in a plane perpendicular to the longitudinal axis L, forming a wider front working region 605 than the rear region 616 in a plane perpendicular to the longitudinal axis L. The angle of extension $\gamma$ may range from 0 to 20 degrees. The front working region 605 is so called since this region that predominantly performs the work when contacting or penetrating the ground or other work surface.

The shank portion 602 may include a cylindrical configuration defining a circumferential direction C and a radial direction R. The rear region 616 may at least partially form a right angle RA with the radial direction R in a plane perpendicular to the longitudinal axis L (best seen in FIGS. 14 thru 16).

The front working region 605 may include a first angled surface 606 and a second angled surface 608 forming a first included angle ϴ1 with the first angled surface 606 projected along the longitudinal axis L onto a plane perpendicular to the longitudinal axis L ranging from 150 to 180 degrees. Similarly, the front working region 605 may further comprise a third angled surface 610 forming a first external angle α1 with the second angled surface 608 projected along the longitudinal axis L onto a plane perpendicular to the longitudinal axis L ranging from 150 to 180 degrees. Likewise, the front working region 605 further comprises a fourth angled surface 611 forming a second included angle θ2 with the third angled surface 610 projected along the longitudinal axis L onto a plane perpendicular to the longitudinal axis L ranging from 150 to 180 degrees.

The first side region 618 or second side region 620 may include a first drafted side surface 632 configured to reduce drag of the tool bit 600 along the longitudinal axis L in use. For the embodiment shown in FIGS. 11 and 16, this surface may have little to no draft (e.g. 0 to 5 degrees). In many embodiments such as that shown in FIGS. 11 thru 16, the tool bit 600 is symmetrical about an X-Z plane of a Cartesian coordinate system with its origin O on the longitudinal axis L and its X-axis aligned with the cross-hole 614 passing through the flat surfaces 612 of the shank portion 602.

Figure 13:
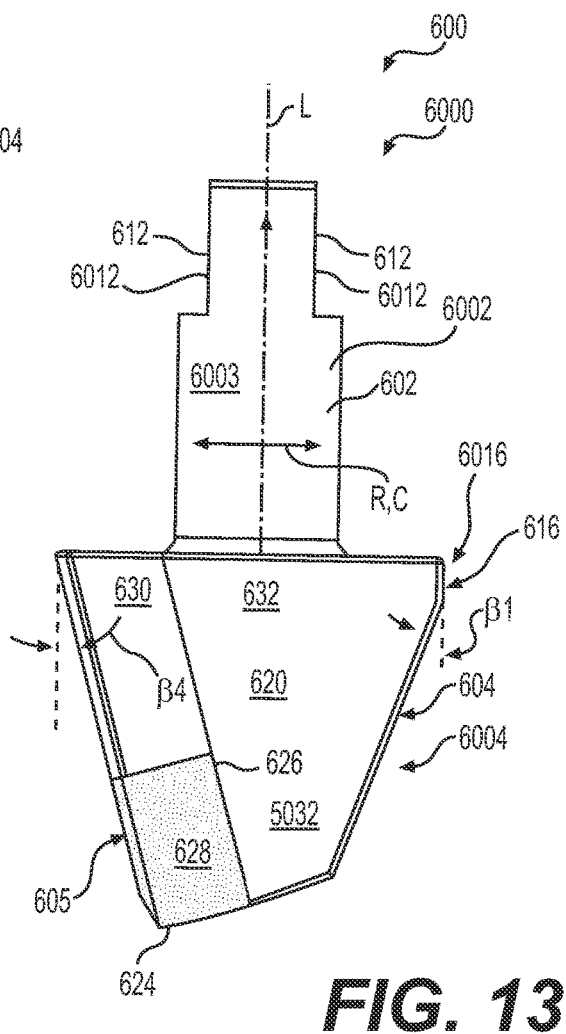
FIG. 13 is a side view of the wide grader tool bit of FIG. 11.

Referring to FIGS. 11 and 13, the rear region 616 may form a first draft angle β1 with the longitudinal axis L measured in a plane containing the radial direction R and the longitudinal axis L, the first draft angle β1 ranging from 0 to 20 degrees. The first side region 618 may form a second draft angle β2 with the longitudinal axis L measured in a plane containing the radial direction R and the longitudinal axis L, ranging from 0 to 30 degrees. The second side region 620 may form a third draft angle β3 with the longitudinal axis L measured in a plane containing the radial direction R and the longitudinal axis L, ranging from 0 to 30 degrees. The front working region 605 may form a fourth draft angle β4 with the longitudinal axis L measured in a plane containing the radial direction R and the longitudinal axis L, ranging from 0 to 30 degrees. β2 and β3 are negative draft angles as seen in FIGS. 14 thru 15 since the width of the cross-section of the working portion 604 is decreasing as one progresses upwardly along the longitudinal axis L.

This tool bit 600 may be further describe as follows with reference to FIGS. 11 thru 16. A tool bit 600 for use with a blade assembly 100 of a grading machine 10 may comprise a shank portion 602 defining a longitudinal axis L, and a working portion 604. The working portion 604 includes a rear region 616, a front working region 605, a first side region 618 and a second side region 620, and the first side region 618 or the second side region 620 include a first vertical surface 630 disposed longitudinally adjacent the shank portion 602, and a first drafted side surface 632 configured to reduce drag of the tool bit 600 through the ground or other work surface extending from the first vertical surface 630.

The first drafted side surface 632 may extend downwardly longitudinally from or past the first vertical surface 630 and the working portion 605 and terminate at the free axial end 624 of the tool bit 600. The first drafted surface 632 forms at least partially a first obtuse included angle φ1 with the rear region 616 projected along the longitudinal axis L onto a plane perpendicular to the longitudinal axis L, ranging from 90 to 120 degrees. The first drafted side surface 632 and the first vertical surface 630 may at least partially border a notch 626 configured to receive an insert 628.

Figure 16:
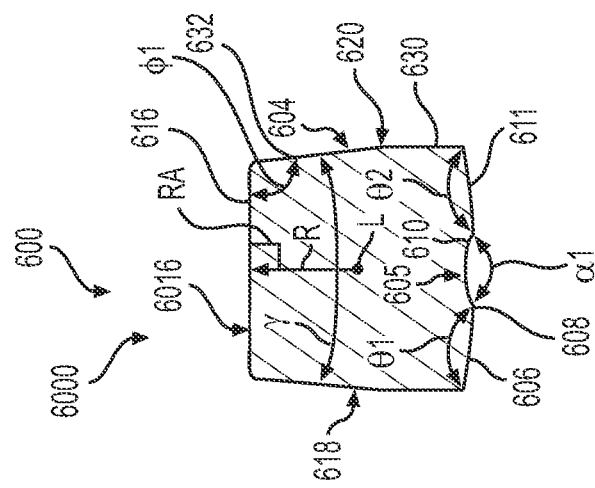
FIG. 16 is a cross-section of the wide grader tool bit of FIG. 12 taken along lines 16-16 thereof.
Figure 15:
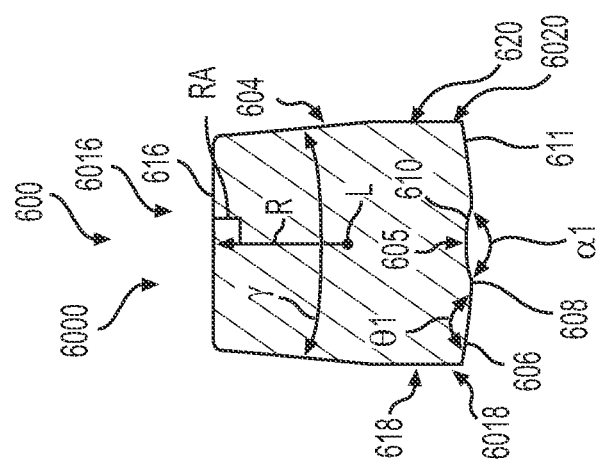
FIG. 15 is a cross-section of the wide grader tool bit of FIG. 12 taken along lines 15-15 thereof.
Figure 14:
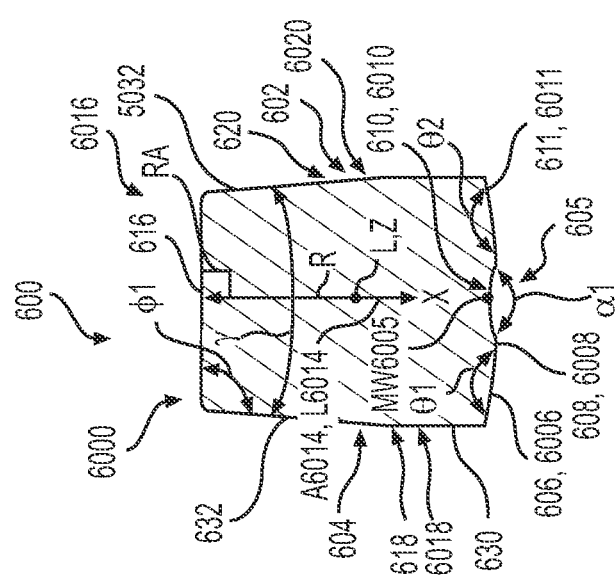
FIG. 14 is a cross-section of the wide grader tool bit of FIG. 12 taken along lines 14-14 thereof.

FIGS. 14 thru 16 show how the cross-section of the tool bit 600 changes over time as the tool bit wears. FIG. 16 shows a first state of initial wear. FIG. 15 shows an intermediate state of wear while FIG. 14 shows an advanced state of wear. Polygonal cross-sections, such nearly trapezoidal cross-sections, are formed.

FIGS. 17 thru 22 depict a standard grading tool bit. This tool bit is similarly configured as the tool bit of FIGS. 11 thru 16. The tool bit 700 comprises a shank portion 702 defining a longitudinal axis L, and a working portion 704 extending downwardly axially from the shank portion 702. The working portion 704 includes a rear region 716, a front working region 705, a first side region 718 and a second side region 720, and the first side region 718 and the second side region 720 may define an angle of extension γ measured in a plane perpendicular to the longitudinal axis L, forming a wider front working region 705 than the rear region 716 in a plane perpendicular to the longitudinal axis. The angle of extension γ may range from 0 to 40 degrees.

The shank portion 702 may include a cylindrical configuration defining a circumferential direction C and a radial direction R and the rear region 716 may at least partially form a right angle RA with the radial direction R in a plane perpendicular to the longitudinal axis L (best seen in FIGS. 20 thru 22).

The front working region 705 may include a first angled surface 706 and a second angled surface 708 forming a first included angle ϴ1 with the first angled surface 706 projected along the longitudinal axis L onto a plane perpendicular to the longitudinal axis, ranging from 130 to 180 degrees. The first side region 718 or second side region 720 may include a first drafted side surface 732 configured to improve penetration of the tool bit 700 in use. In many embodiments such as that shown in FIGS. 17 thru 22, the tool bit 700 is symmetrical about an X-Z plane about a Cartesian coordinate system with its origin O on the longitudinal axis L and its X-axis aligned with the cross-hole 714 passing through the flat surfaces 712.

Figure 18:
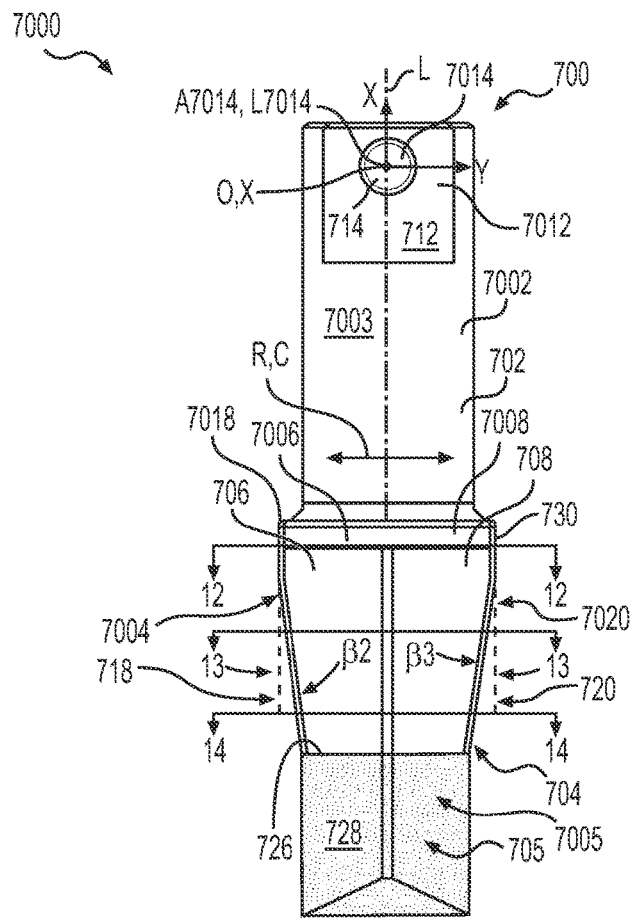
FIG. 18 is a front view of the standard grader tool bit of FIG. 17.
Figure 19:
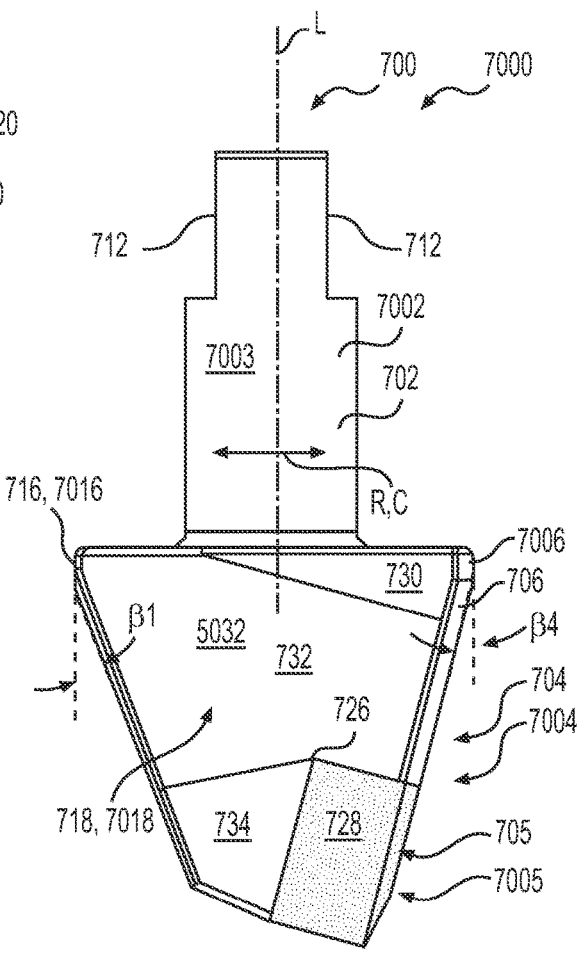
FIG. 19 is a side view of the standard grader tool bit of FIG. 17.

As shown in FIG. 19, the rear region 716 may form a first draft angle β1 with the longitudinal axis L measured in a plane containing the radial direction R and longitudinal axis L, the first draft angle β1 ranging from 0 to 35 degrees. Similarly, as shown in FIG. 18, the first side region may form a second draft angle β1 with the longitudinal axis L measured in a plane containing the radial direction R and longitudinal axis L, forming a second draft angle β2, ranging from 0 to 40 degrees. The second side region 720 may form a third draft angle β3 with the longitudinal axis L measured in a plane containing the radial direction R and the longitudinal axis L, ranging from 0 to 40 degrees. Returning to FIG. 19, the front working region 705 may form a fourth draft angle β4 with the longitudinal axis L measured in a plane containing the radial direction R and the longitudinal axis L, ranging from 0 to 30 degrees. β2 and β3 are positive draft angles as seen in FIGS. 20 thru 15 since the width of the cross-section of the working portion 704 is increasing as one progresses upwardly along the longitudinal axis L.

This tool bit 700 may be further describe as follows with reference to FIGS. 17 thru 22. A tool bit 700 for use with a blade assembly 100 of a grading machine 10 may comprise a shank portion 702 defining a longitudinal axis L, and a working portion 704. The working portion 704 includes a rear region 716, a front working region 705, a first side region 718 and a second side region 720, and the first side region 718 or the second side region 720 includes a first vertical surface 730 disposed longitudinally adjacent the shank portion 702, and a first drafted side surface 732 configured to improve penetration of the tool bit 700 extending from the first vertical surface 730.

The first drafted side surface 732 may extend downwardly longitudinally from the first vertical surface 730 and the working portion 705 may include a second vertical surface 734 extending downwardly longitudinally from the first drafted side surface 732. The first drafted side surface 732 forms at least partially a first included obtuse angle φ1 with the rear region 716 projected along the longitudinal axis L onto a plane perpendicular to the longitudinal axis L. The first drafted side surface 732 and the second vertical surface 734 may at least partially border a notch 726 configured to receive an insert 728.

FIGS. 20 thru 22 show how the cross-section of the tool bit 700 changes over time as the tool bit 700 wears. FIG. 22 shows a first state of initial wear. FIG. 21 shows an intermediate state of wear while FIG. 20 shows an advanced state of wear. Polygonal cross-sections, such nearly trapezoidal cross-sections, are formed.

FIGS. 23 thru 28 depict a sharp grader tool bit. This tool bit is similarly configured as the tool bit of FIGS. 17 thru 22, but with more draft, etc. The tool bit 800 comprises a shank portion 802 defining a longitudinal axis L, and a working portion 804 extending downwardly axially from the shank portion 802. The working portion 804 includes a rear region 816, a front working region 805, a first side region 818 and a second side region 820, and the first side region 818 and the second side region 820 may define an angle of extension γ measured in a plane perpendicular to the longitudinal axis L, forming a wider front working region 805 than the rear region 816 in a plane perpendicular to the longitudinal axis. The angle of extension γ may range from 0 to 50 degrees.

The shank portion 802 may include a cylindrical configuration defining a circumferential direction C and a radial direction R and the rear region 816 may at least partially form a right angle RA with the radial direction R in a plane perpendicular to the longitudinal axis L (best seen in FIG. 20).

The front working region 805 may include a first angled surface 806 and a second angled surface 808 forming a first included angle ⊖1 with the first angled surface 806 projected along the longitudinal axis L onto a plane perpendicular to the longitudinal axis, ranging from 140 to 180 degrees. The first side region 818 or second side region 820 may include a first drafted side surface 832 configured to improve penetration of the tool bit 800 in use. In many embodiments such as that shown in FIGS. 23 thru 28, the tool bit 800 is symmetrical about an X-Z plane about a Cartesian coordinate system with its origin O on the longitudinal axis L and its X-axis aligned with the cross-hole 814 passing through the flat surfaces 812.

Figure 24:
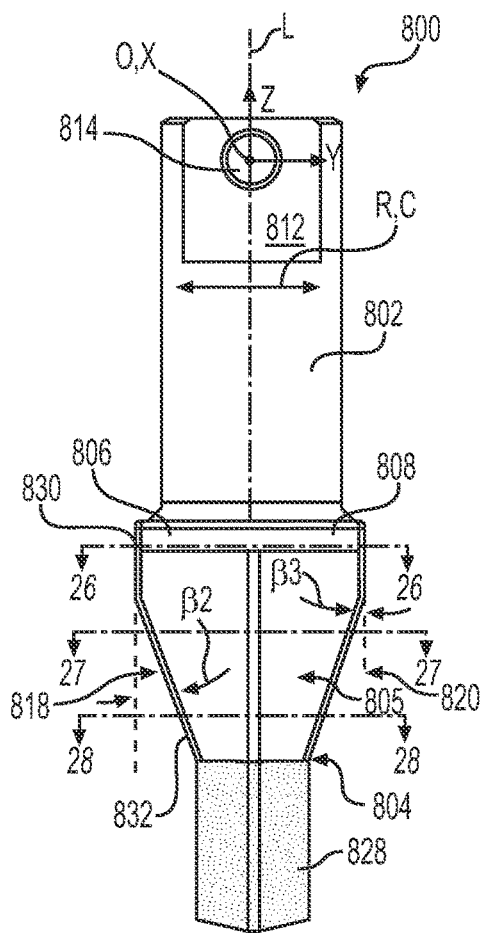
FIG. 24 is a front view of the sharp grader tool bit of FIG. 23.
Figure 25:
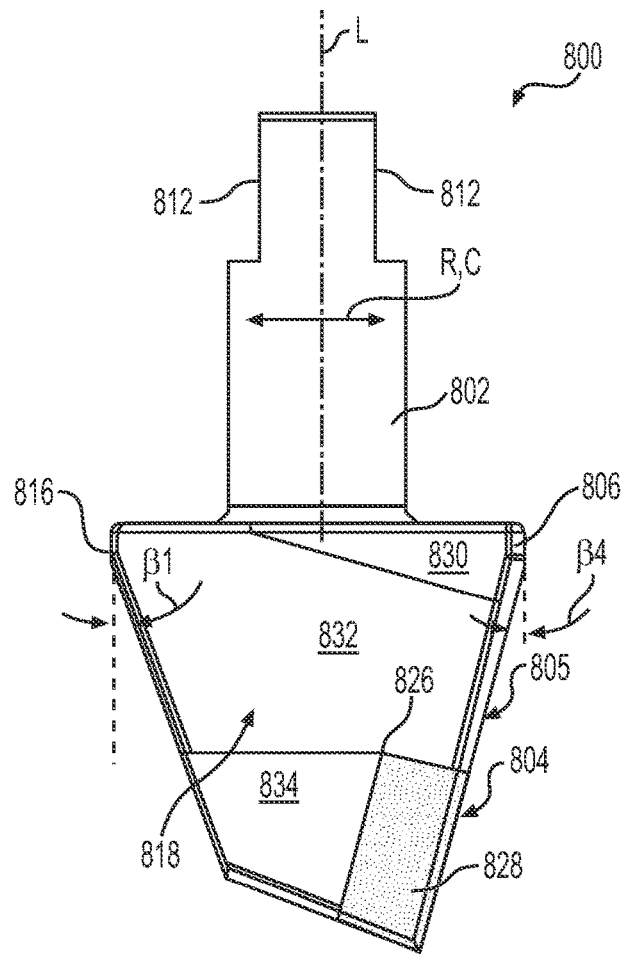
FIG. 25 is a side view of the sharp grader tool bit of FIG. 23.

As shown in FIG. 25, the rear region 816 may form a first draft angle β1 with the longitudinal axis L measured in a plane containing the radial direction R and longitudinal axis L, the first draft angle β1 ranging from 0 to 30 degrees. Similarly, as shown in FIG. 24, the first side region 818 may form a second draft angle β2 with the longitudinal axis L measured in a plane containing the radial direction R and longitudinal axis L, ranging from 0 to 40 degrees. The second side region 820 may form a third draft angle β3 with the longitudinal axis L measured in a plane containing the radial direction R and the longitudinal axis L, ranging from 0 to 40 degrees. Returning to FIG. 25, the front working region 805 may form a fourth draft angle β4 with the longitudinal axis L measured in a plane containing the radial direction R and the longitudinal axis L, ranging from 0 to 30 degrees. β2 and β3 are positive draft angles as seen in FIGS. 26 thru 28 since the width of the cross-section of the working portion 804 is increasing as one progresses upwardly along the longitudinal axis L.

This tool bit 800 may be further describe as follows with reference to FIGS. 23 thru 28. A tool bit 800 for use with a blade assembly 100 of a grading machine 10 may comprise a shank portion 802 defining a longitudinal axis L, and a working portion 804. The working portion 804 includes a rear region 816, a front working region 805, a first side region 818 and a second side region 820, and the first side region 818 or the second side region 820 includes a first vertical surface 830 disposed longitudinally adjacent the shank portion 802, and a first drafted side surface 832 configured to improve penetration of the tool bit 800 extending from the first vertical surface 830.

The first drafted side surface 832 may extend downwardly longitudinally from the first vertical surface 830. The working portion 805 may include a second vertical surface 834 extending downwardly longitudinally from the first drafted side surface 832. The first drafted side surface 832 forms at least partially a first included obtuse angle φ1 with the rear region 816 projected along the longitudinal axis L onto a plane perpendicular to the longitudinal axis L. The first drafted side surface 832 and the second vertical surface 834 may at least partially border a notch 826 configured to receive an insert 828.

FIGS. 26 thru 28 show how the cross-section of the tool bit 800 changes over time as the tool bit 800 wears. FIG. 28 shows a first state of initial wear. FIG. 27 shows an intermediate state of wear while FIG. 26 shows an advanced state of wear. Polygonal cross-sections, such nearly trapezoidal cross-sections, are formed.

FIGS. 29 thru 34 depict a penetration grader tool bit. This tool bit is similarly configured as the tool bit of FIGS. 17 thru 22, but with more draft, etc. The tool bit 900 comprises a shank portion 902 defining a longitudinal axis L, and a working portion 904 extending downwardly axially from the shank portion 902. The working portion 904 includes a rear region 916, a front working region 905, a first side region 918 and a second side region 920, and the first side region 918 and the second side region 920 may define an angle of extension γ measured in a plane perpendicular to the longitudinal axis L, forming a wider front working region 905 than the rear region 916 in a plane perpendicular to the longitudinal axis L. The angle of extension γ may range from 0 to 40 degrees.

Figure 32:
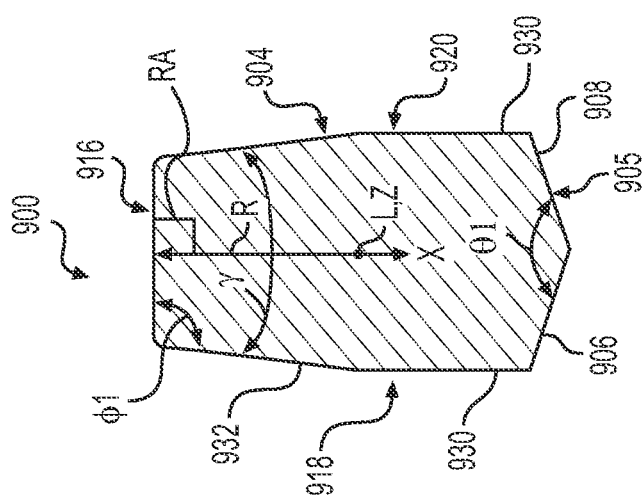
FIG. 32 is a cross-section of the penetration grader tool bit of FIG. 30 taken along lines 32-32 thereof.

The shank portion 902 may include a cylindrical configuration defining a circumferential direction C and a radial direction R and the rear region 916 may at least partially form a right angle RA with the radial direction R in a plane perpendicular to the longitudinal axis L (best seen in FIG. 32).

The front working region 905 may include a first angled surface 906 and a second angled surface 908 forming a first included angle ⊖1 with the first angled surface 906 projected along the longitudinal axis L onto a plane perpendicular to the longitudinal axis L, ranging from 130 to 180 degrees. The first side region 918 or second side region 920 may include a first drafted side surface 932 configured to improve penetration of the tool bit 900 in use. In many embodiments such as that shown in FIGS. 29 thru 34, the tool bit 900 is symmetrical about an X-Z plane about a Cartesian coordinate system with its origin O on the longitudinal axis L and its X-axis aligned with the cross-hole 914 passing through the flat surfaces 912.

Figure 30:
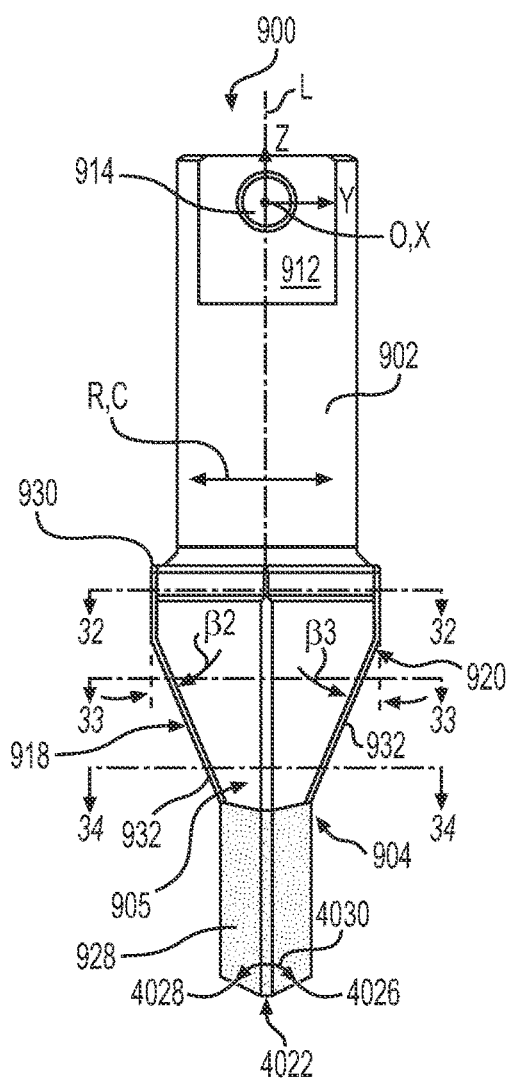
FIG. 30 is a front view of the penetration grader tool bit of FIG. 29.
Figure 31:
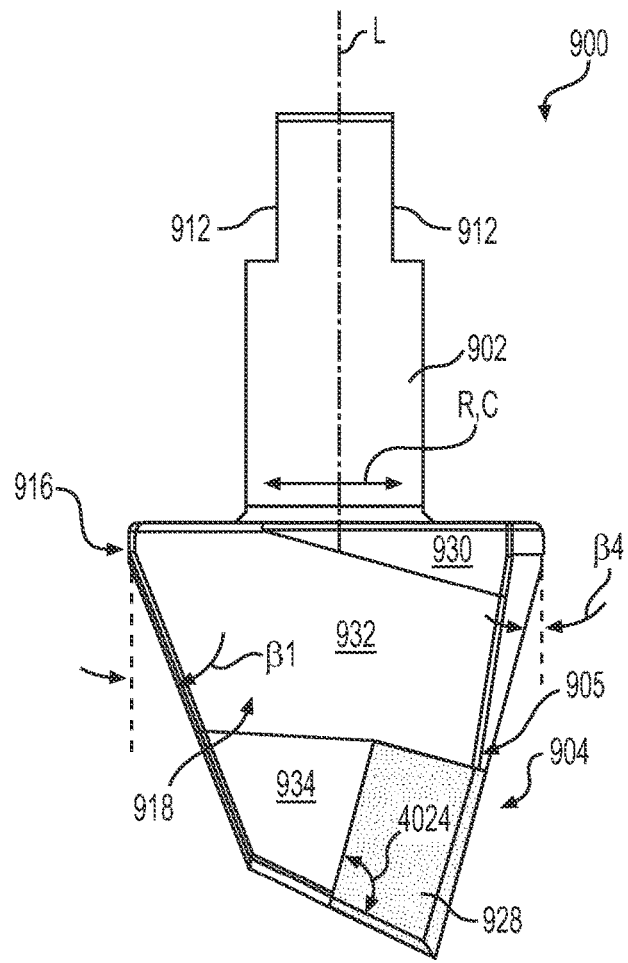
FIG. 31 is a side view of the penetration grader tool bit of FIG. 29.

As shown in FIG. 31, the rear region 916 may form a first draft angle (31 with the longitudinal axis L measured in a plane containing the radial direction R and longitudinal axis L, the first draft angle β1 ranging from 0 to 30 degrees. Similarly, as shown in FIG. 30, the first side region 918 may form a second draft angle β2 with the longitudinal axis L measured in a plane containing the radial direction R and longitudinal axis L, ranging from 0 to 45 degrees. The second side region 920 may form a third draft angle β3 with the longitudinal axis L measured in a plane containing the radial direction R and the longitudinal axis L, ranging from 0 to 45 degrees. Returning to FIG. 31, the front working region 905 may form a fourth draft angle β4 with the longitudinal axis L measured in a plane containing the radial direction R and the longitudinal axis L, ranging from 0 to 30 degrees. β2 and β3 are positive draft angles as seen in FIGS. 32 thru 34 since the width of the cross-section of the working portion 904 is increasing as one progresses upwardly along the longitudinal axis L.

This tool bit 900 may be further describe as follows with reference to FIGS. 29 thru 34. A tool bit 900 for use with a blade assembly 100 of a grading machine 10 may comprise a shank portion 902 defining a longitudinal axis L, and a working portion 904. The working portion 904 includes a rear region 916, a front working region 905, a first side region 918 and a second side region 920, and the first side region 918 or the second side region 920 includes a first vertical surface 930 disposed longitudinally adjacent the shank portion 902, and a first drafted side surface 932 configured to improve penetration of the tool bit 900 extending from the first vertical surface 930.

The first drafted side surface 932 may extend downwardly longitudinally from the first vertical surface 930. The working portion 905 may include a second vertical surface 934 extending downwardly longitudinally from the first drafted side surface 932. The first drafted side surface 932 forms at least partially a first included obtuse angle φ1 with the rear region 916 projected along the longitudinal axis L onto a plane perpendicular to the longitudinal axis L (best seen in FIG. 32). The first drafted side surface 932 and the second vertical surface 934 may at least partially border a notch 926 configured to receive an insert 928.

Figure 34:
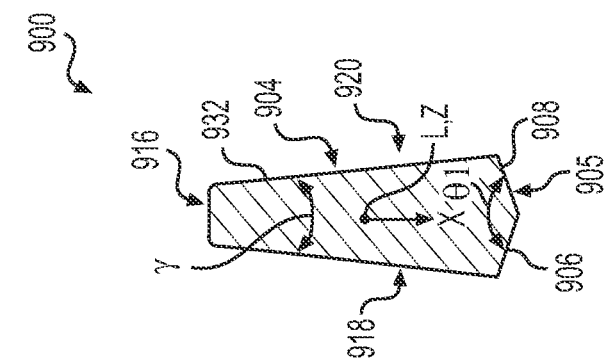
FIG. 34 is a cross-section of the penetration grader tool bit of FIG. 30 taken along lines 34-34 thereof.
Figure 33:
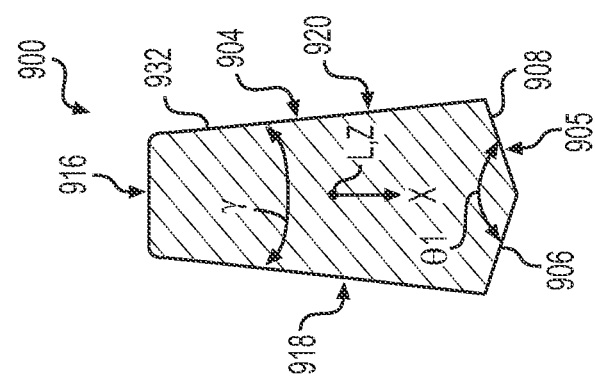
FIG. 33 is a cross-section of the penetration grader tool bit of FIG. 30 taken along lines 33-33 thereof.

FIGS. 32 thru 34 show how the cross-section of the tool bit 900 changes over time as the tool bit 900 wears. FIG. 34 shows a first state of initial wear. FIG. 33 shows an intermediate state of wear while FIG. 32 shows an advanced state of wear. Polygonal cross-sections, such nearly trapezoidal cross-sections, are formed.

Looking at FIGS. 35 thru 40, a tool bit 1000 (e.g. a wide mining tool bit, similarly configured as the wide grading bit except that the working portion is longer axially and includes an extra insert, etc.) for use with a blade assembly 100 of a grading machine 10 is illustrated. The tool bit 1000 comprises a shank portion 1002 defining a longitudinal axis L, and a working portion 1004. The working portion 1004 includes a rear region 1016, a front working region 1005, a first side region 1018 and a second side region 1020, and the first side region 1018 and the second side region 1020 may define an angle of extension γ measured in a plane perpendicular to the longitudinal axis L, forming a wider front working region 1005 than the rear region 1016 in a plane perpendicular to the longitudinal axis L. The angle of extension γ may range from 0 to 40 degrees. The front working region 1005 is so called since this region that predominantly performs the work when contacting or penetrating the ground or other work surface.

The shank portion 1002 may include a cylindrical configuration defining a circumferential direction C and a radial direction R. The rear region 1016 may at least partially form a right angle RA with the radial direction R in a plane perpendicular to the longitudinal axis L (best seen in FIGS. 38 thru 40).

The front working region 1005 may include a first angled surface 1006 and a second angled surface 1008 forming a first included angle ⊖1 with the first angled surface 1006 projected along the longitudinal axis L onto a plane perpendicular to the longitudinal axis L ranging from 150 to 180 degrees. Similarly, the front working region 1005 may further comprise a third angled surface 1010 forming a first external angle α1 with the second angled surface 1008 projected along the longitudinal axis L onto a plane perpendicular to the longitudinal axis L ranging from 150 to 180 degrees. Likewise, the front working region 1005 further comprises a fourth angled surface 1011 forming a second included angle θ2 with the third angled surface 1010 projected along the longitudinal axis L onto a plane perpendicular to the longitudinal axis L ranging from 150 to 180 degrees.

The first side region 1018 or second side region 1020 may include a first drafted side surface 1032 configured to reduce drag of the tool bit 1000 along the longitudinal axis L in use. For the embodiment shown in FIGS. 35 and 40, this surface may have little to no draft (e.g. 0 to 5 degrees). In many embodiments such as that shown in FIGS. 36 thru 40, the tool bit 1000 is symmetrical about an X-Z plane of a Cartesian coordinate system with its origin O on the longitudinal axis L and its X-axis aligned with the cross-hole 1014 passing through the flat surfaces 1012 of the shank portion 1002.

Figure 35:
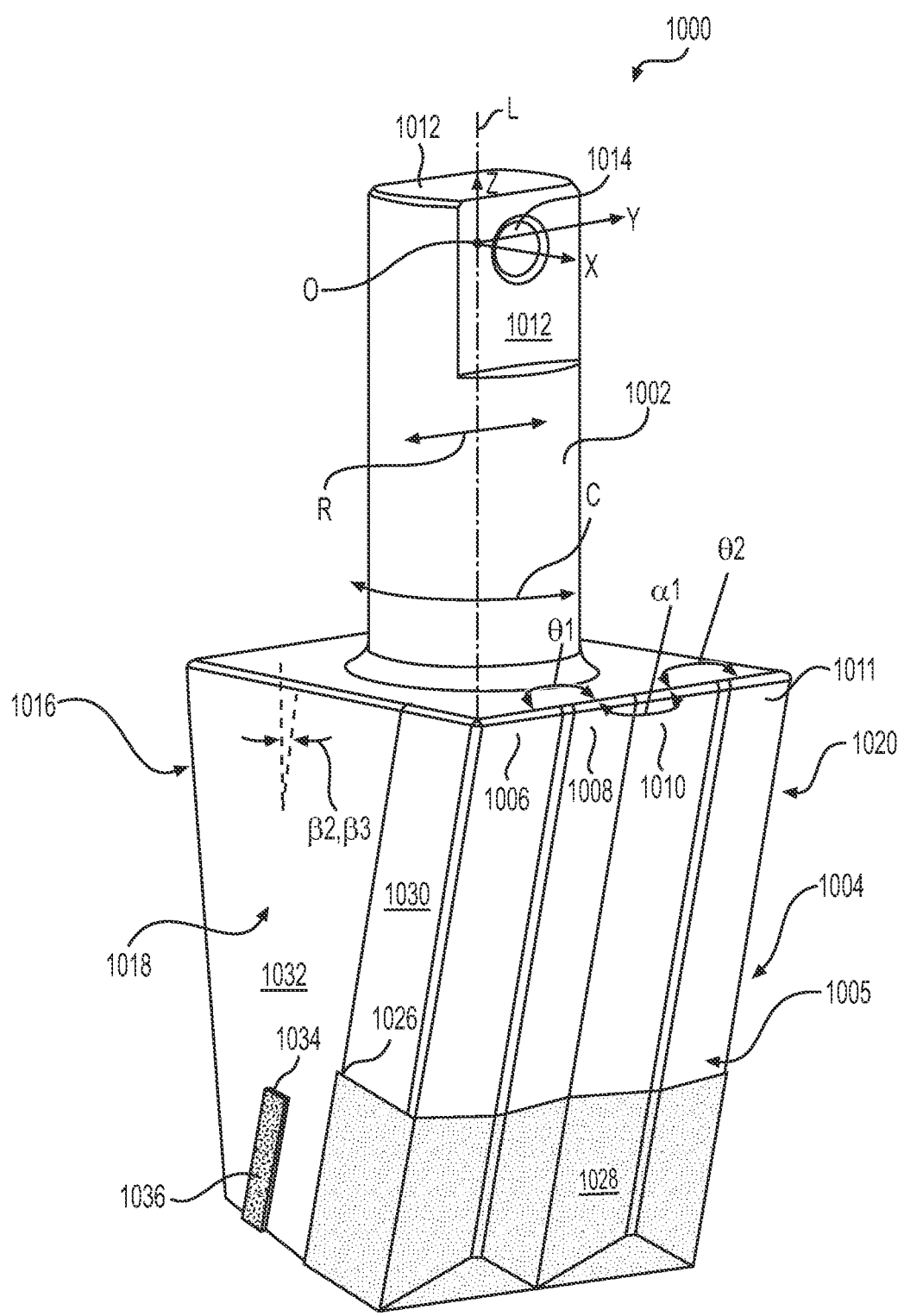
FIG. 35 is a perspective view of a wide mining tool bit with an additional insert, helping to prolong the useful life of the tool bit, and also lacking arcuate surfaces.
Figure 36:
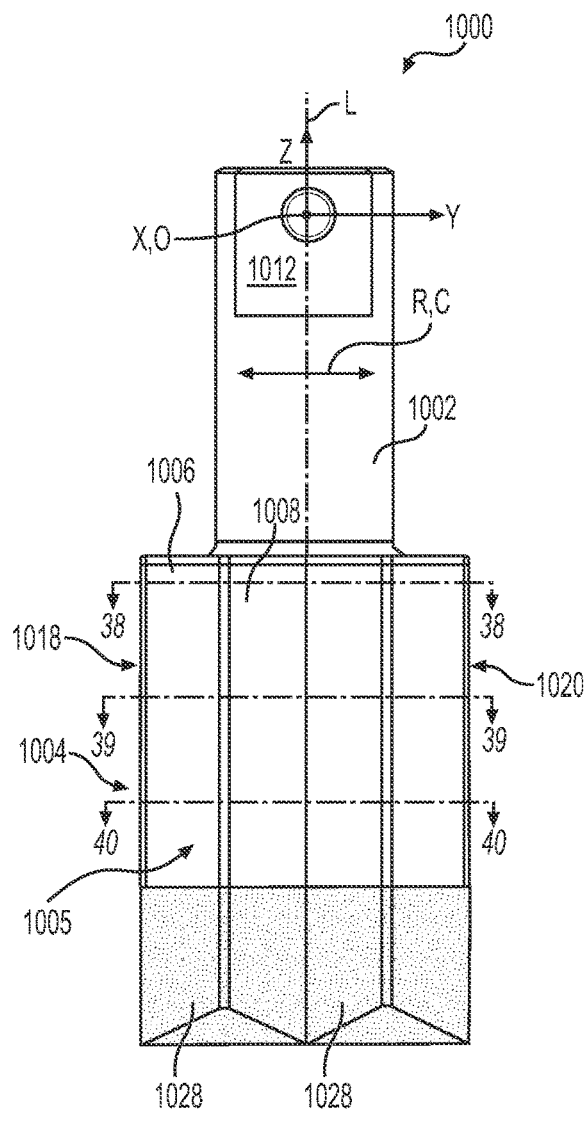
FIG. 36 is a front view of the wide mining tool bit of FIG. 35.
Figure 37:
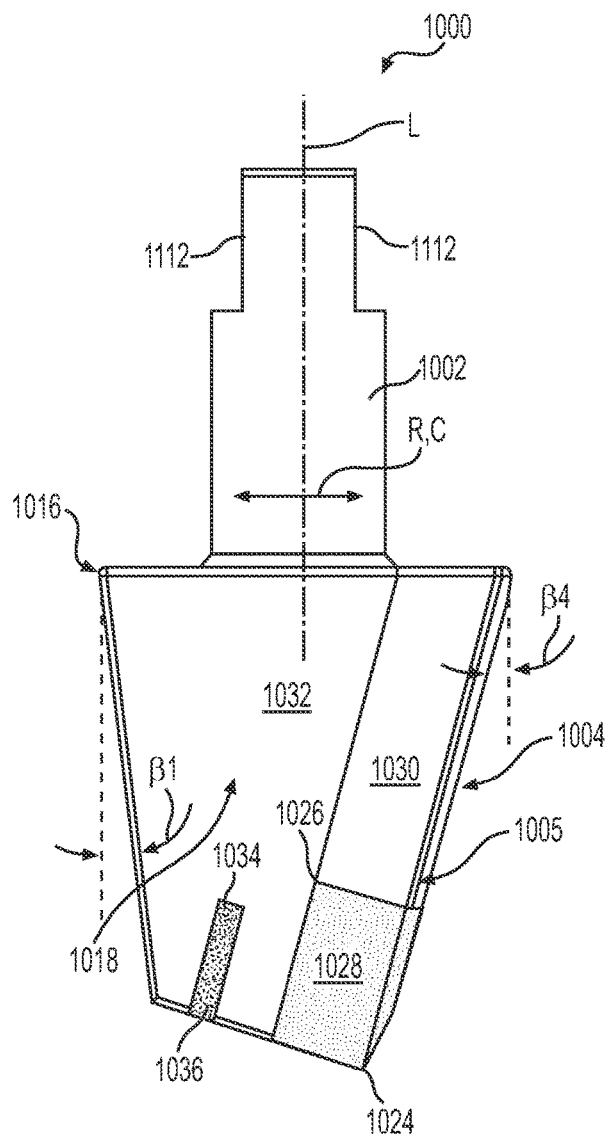
FIG. 37 is a side view of the wide mining tool bit of FIG. 35.
Figure 41:
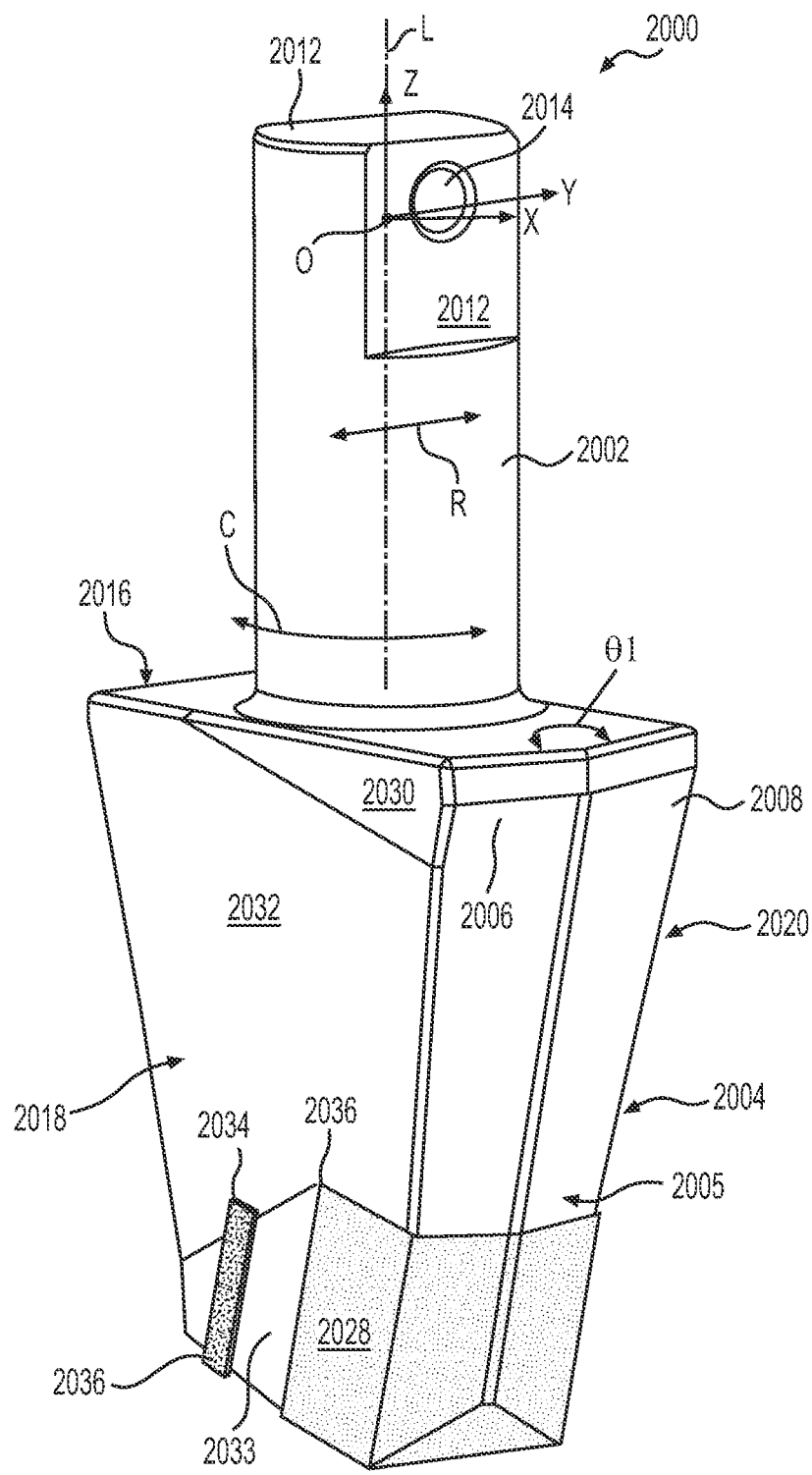
FIG. 41 is a perspective view of a standard mining tool bit with an additional insert, helping to prolong the useful life of the tool bit, and also lacking arcuate surfaces.

Referring to FIGS. 35 and 37, the rear region 1016 may form a first draft angle β1 with the longitudinal axis L measured in a plane containing the radial direction R and the longitudinal axis L, the first draft angle β1 ranging from 0 to 30 degrees. The first side region 1018 may form a second draft angle β2 with the longitudinal axis L measured in a plane containing the radial direction R and the longitudinal axis L, ranging from 0 to 30 degrees. The second side region 1020 may form a third draft angle β3 with the longitudinal axis L measured in a plane containing the radial direction R and the longitudinal axis L, ranging from 0 to 30 degrees. The front working region 1005 may form a fourth draft angle β4 with the longitudinal axis L measured in a plane containing the radial direction R and the longitudinal axis L, ranging from 0 to 30 degrees. β2 and β3 are negative draft angles as seen in FIGS. 38 thru 40 since the width of the cross-section of the working portion 1004 is decreasing as one progresses upwardly along the longitudinal axis L.

This tool bit 1000 may be further describe as follows with reference to FIGS. 35 thru 40. A tool bit 1000 for use with a blade assembly 100 of a grading machine 10 may comprise a shank portion 1002 defining a longitudinal axis L, and a working portion 1004. The working portion 1004 includes a rear region 1016, a front working region 1005, a first side region 1018 and a second side region 1020, and the first side region 1018 or the second side region 1020 include a first vertical surface 1030 disposed longitudinally adjacent the shank portion 1002, and a first drafted side surface 1032 configured to reduce draft of the tool bit 1000 through the ground or other work surface extending from the first vertical surface 1030.

The first drafted side surface 1032 may extend downwardly longitudinally from or past the first vertical surface 1030 and the working portion 1005 and terminate at the free axial end 1024 of the tool bit 1000. The first drafted surface 1032 forms at least partially a first obtuse included angle φ1 with the rear region 1016 projected along the longitudinal axis L onto a plane perpendicular to the longitudinal axis L, ranging from 90 to 120 degrees. The first drafted side surface 1032 and the first vertical surface 1030 may at least partially border a notch 1026 configured to receive an insert 1028.

FIGS. 38 thru 40 show how the cross-section of the tool bit 1000 changes over time as the tool bit wears. FIG. 40 shows a first state of initial wear. FIG. 39 shows an intermediate state of wear while FIG. 38 shows an advanced state of wear. Polygonal cross-sections, such nearly trapezoidal cross-sections, are formed.

The working portion 1004 of this tool bit 1000 further defines a slot 1034 extending along a direction parallel to the Y-axis, from one drafted side surface 1032 of the first side region 1018 to the other drafted side surface 1032 of second side region 1020. An extra reinforcement insert 1036 may be disposed therein made of a similar material and/or having similar properties as the other insert 1028.

Looking at FIGS. 41 thru 46, a tool bit 2000 (e.g. a standard mining tool bit, similarly configured as the wide mining bit except that the working portion is more narrow, etc.) for use with a blade assembly 100 of a grading machine 10 is illustrated. The tool bit 2000 comprises a shank portion 2002 defining a longitudinal axis L, and a working portion 2004. The working portion 2004 includes a rear region 2016, a front working region 2005, a first side region 2018 and a second side region 2020, and the first side region 2018 and the second side region 2020 may define an angle of extension γ measured in a plane perpendicular to the longitudinal axis L, forming a wider front working region 2005 than the rear region 2016 in a plane perpendicular to the longitudinal axis L. The angle of extension γ may range from 0 to 40 degrees. The front working region 2005 is so called since this region that predominantly performs the work when contacting or penetrating the ground or other work surface.

The shank portion 2002 may include a cylindrical configuration defining a circumferential direction C and a radial direction R. The rear region 2016 may at least partially form a right angle RA with the radial direction R in a plane perpendicular to the longitudinal axis L (best seen in FIG. 44).

The front working region 2005 may include a first angled surface 2006 and a second angled surface 2008 forming a first included angle θ1 with the first angled surface 2006 projected along the longitudinal axis L onto a plane perpendicular to the longitudinal axis L ranging from 140 to 180 degrees. The first side region 2018 or second side region 2020 may include a first drafted side surface 2032 configured to improve penetration of the tool bit 2000 along the longitudinal axis L in use. In many embodiments such as that shown in FIGS. 41 thru 46, the tool bit 2000 is symmetrical about an X-Z plane of a Cartesian coordinate system with its origin O on the longitudinal axis L and its X-axis aligned with the cross-hole 2014 passing through the flat surfaces 2012 of the shank portion 2002.

Referring to FIGS. 42 and 43, the rear region 2016 may form a first draft angle β1 with the longitudinal axis L measured in a plane containing the radial direction R and the longitudinal axis L, the first draft angle β1 ranging from 0 to 30 degrees. The first side region 2018 may form a second draft angle β2 with the longitudinal axis L measured in a plane containing the radial direction R and the longitudinal axis L, ranging from 0 to 40 degrees. The second side region 2020 may form a third draft angle β3 with the longitudinal axis L measured in a plane containing the radial direction R and the longitudinal axis L, ranging from 0 to 40 degrees. The front working region 2005 may form a fourth draft angle β4 with the longitudinal axis L measured in a plane containing the radial direction R and the longitudinal axis L, ranging from 0 to 30 degrees. β2 and β3 are positive draft angles as seen in FIGS. 38 thru 40 since the width of the cross-section of the working portion 2004 is increasing as one progresses upwardly along the longitudinal axis L.

This tool bit 2000 may be further describe as follows with reference to FIGS. 41 thru 46. A tool bit 2000 for use with a blade assembly 100 of a grading machine 10 may comprise a shank portion 2002 defining a longitudinal axis L, and a working portion 2004. The working portion 2004 includes a rear region 2016, a front working region 2005, a first side region 2018 and a second side region 2020, and the first side region 2018 or the second side region 2020 include a first vertical surface 2030 disposed longitudinally adjacent the shank portion 2002, and a first drafted side surface 2032 configured to improve penetration of the tool bit 2000 into the ground or other work surface extending from the first vertical surface 2030.

The first drafted side surface 2032 may extend downwardly longitudinally from or past the first vertical surface 2030 and the working portion 2005 and terminate at the free axial end 2024 of the tool bit 2000. The first drafted surface 2032 forms at least partially a first obtuse included angle φ1 with the rear region 2016 projected along the longitudinal axis L onto a plane perpendicular to the longitudinal axis L, ranging from 90 to 120 degrees. A second vertical surface 2033 may extend downwardly from the first drafted side surface 2032, both of which may at least partially border a notch 2026 configured to receive an insert 2028.

FIGS. 44 thru 46 show how the cross-section of the tool bit 2000 changes over time as the tool bit wears. FIG. 46 shows a first state of initial wear. FIG. 45 shows an intermediate state of wear while FIG. 44 shows an advanced state of wear. Polygonal cross-sections, such nearly trapezoidal cross-sections, are formed.

The working portion 2004 of this tool bit 2000 further defines a slot 2034 extending along a direction parallel to the Y-axis, from one drafted side surface 2032 of the first side region 2018 to the other drafted side surface 2032 of second side region 2020. An extra reinforcement insert 2036 may be disposed therein made of a similar material and/or having similar properties as the other insert 1028.

Figure 47:
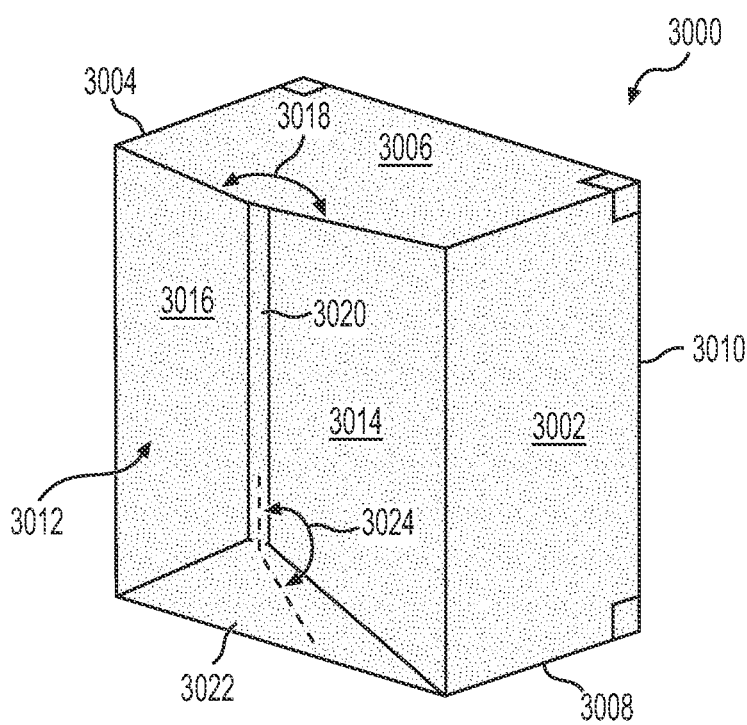
FIG. 47 is a perspective view of an insert according to a first embodiment of the present disclosure.

FIG. 47 illustrates an insert (may also be referred to as a tile) that may be similarly or identically configured as the insert used in FIGS. 3, 4, 11, 17, 35, and 42. It should be noted that the geometry of the insert may be doubled in a single insert or two similar inserts may be used side by side such as shown in FIG. 11, etc. Accordingly, the insert 3000 is configured to be attached to the notch of a tool bit for use with a grading machine as previously described. The insert 3000 may comprise a first side face 3002, a second side face 3004, a top face 3006, a bottom face 3008, a rear face 3010, and a front region 3012 including a first flat face 3014, and a second flat face 3016 forming an obtuse included angle 3018 with the first flat face 3014 on the top face 3006 ranging from 130 to 180 degrees.

The first side face 3002 may be perpendicular to the rear face 3010 and to the top face 3006 and may be parallel to the second side face 3004. The insert 300 may further comprise a blend 3020 transitioning from the first flat surface 3014 to the second flat surface 3016 and a bottom face 3008 that forms right angles with the rear face 3010, the first side face 3002, and the second side face 3004. The insert 3000 further comprises a chamfered surface 3022 connecting the first flat face 3014, second flat face 3016, blend 3020 and the bottom face 3008. The chamfered surface 3022 may from a chamfer angle 3024 with bottom face ranging from 120 to 180 degrees. It should be noted that the first side face 3002 and second side face 3004, and the associated obtuse included angle 3018 may be designed to match to the corresponding surfaces of a tool bit and vice versa. Any of the angles may be varied as needed or desired in any embodiment.

Figure 48:
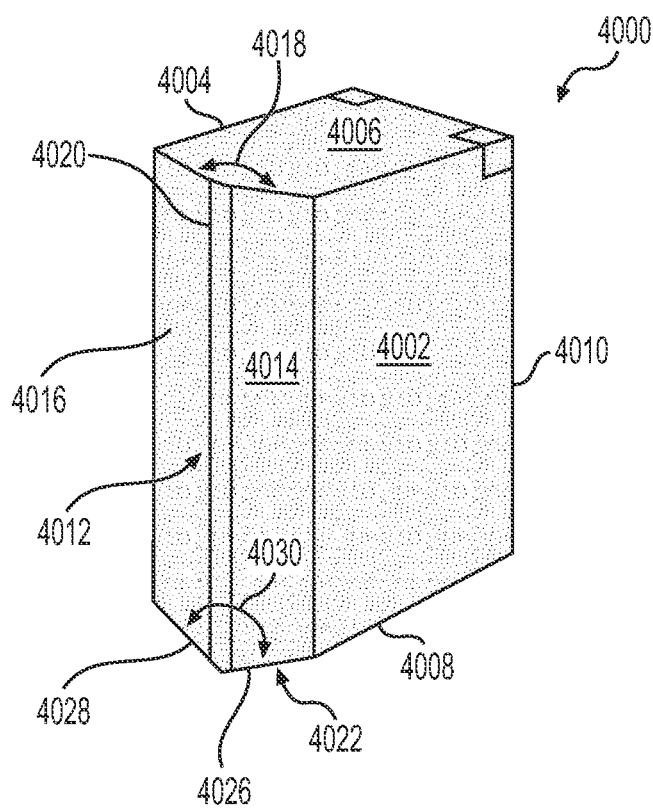
FIG. 48 is a perspective view of an insert according to a second embodiment of the present disclosure.

FIG. 48 illustrates an insert (may also be referred to as a tile) that may be similarly or identically configured as the insert used in FIGS. 5, 6, 23 and 29. The insert 4000 is configured to be attached to the notch of a tool bit for use with a grading machine as previously described. The insert 4000 may comprise a first side face 4002, a second side face 4004, a top face 4006, a bottom face 4008, a rear face 4010, and a front region 4012 including a first flat face 4014, and a second flat face 4016 forming an obtuse included angle 4018 with the first flat face 4014 on the top face 4006 ranging from 120 to 180 degrees.

The first side face 4002 may be perpendicular to the rear face 4010 and to the top face 4006 and may be parallel to the second side face 4004. The insert 4000 may further comprise a blend 4020 transitioning from the first flat surface 4014 to the second flat surface 4016 and a bottom face 4008 that forms right angles with the rear face 4010, the first side face 4002, and the second side face 4004. The insert 4000 may further comprise a bottom region 4022, similarly configured to the front region 4012, allowing the geometry to wrap around the bottom of the insert 4000. The bottom region 4022 may form a bottom obtuse angle 4024 with the rear face 4010 ranging from 90 to 140 degrees (see FIGS. 30 and 31). The bottom region 4002 includes a third flat face 4026 and a fourth flat face 4028 that form a bottom included angle 4030 with each other that may match the obtuse included angle 4018.

The bottom and rear regions of a tool bit using such inserts 3000, 4000 may have faceted features that allow the included angle of the front region to extend from the top of the front region about the bottom of the tool bit up to the top portion of the rear region of the tool bit. For examples, see FIGS. 13 and 31.

Various embodiments of a tool bit that allows greater versatility of its orientation with respect to the centerline of an adapter board will now be discussed. For brevity, only specific embodiments of the tool bits shown in FIGS. 4, 11 and 17 will be described in detail. It is to be understood that the same features are present and the same description applies to the embodiments shown in the tool bits of FIGS. 3, 5, 6, 23, 29, 35, and 41, etc.

Looking at FIGS. 4, and 11 thru 22, a tool bit 5000, 6000, 7000 for use with a blade assembly 100 of a grading machine 10 as just mentioned is shown. The tool bit 5000, 6000, 7000 may comprise a shank portion 5002, 6002, 7002 defining a longitudinal axis L and a perimeter 5003, 6003, 7003. A pair of parallel flat surfaces 5012, 6012, 7012 may be disposed on the perimeter 5003, 6003, 7003 and the shank portion 5002, 6002, 7002 may define a cross-hole 5014, 6014, 7014 defining a cross-hole axis A5014, A6014, A7014 along which the cross-hole 5014, 6014, 7014 extends through the flat surfaces 5012, 6012, 7012 perpendicularly. The tool bit 5000, 6000, 7000 may also include a working portion 5004, 6004, 7004 extending downwardly axially from the shank portion 5002, 6002, 7002. The working portion 5004, 6004, 7004 may include a rear region 5016, 6016, 7016, a front working region 5005, 6005, 7005 defining a width W5005, W6005, W7005 with a midpoint MW5005, MW6005, MW7005, a first side region 5018, 6018, 7018 and a second side region 5020, 6020, 7020. The first side region 5018, 6018, 7018 and the second side region 5020, 6020, 7020 define an angle of extension γ measured in a plane perpendicular to the longitudinal axis L. The cross-hole axis A5014, A6014, A7014 may pass through the width W5005, W6005, W7005 of the front working region 5005, 6005, 7005 when projected onto a plane perpendicular to the longitudinal axis L.

In the embodiments shown in FIGS. 4, and 11 thru 22, the angle of extension γ forms a wider front working region 5005, 6005, 7005 than the rear region 5016, 6016, 7016 in a plane perpendicular to the longitudinal axis L. The angle of extension γ may range from 0 to 30 degrees. The shank portion 5002, 6002, 7002 includes a cylindrical configuration defining a circumferential direction C and a radial direction R, and the rear region 5016, 6016, 7016 at least partially forms a right angle RA with the radial direction in a plane perpendicular to the longitudinal axis L. The cross-hole 5014, 6014, 7014 having a cylindrical configuration defining a cylindrical axis L5014, L6014, L7014 passing perpendicularly through the longitudinal axis L of the shank portion 5002, 6002, 7002, and the cross-hole axis A5014, A6014, A7014 passes through the midpoint MW5005, MW6005, MW7005 of the width W5005, W6005, W7005 of the front working region 5005, 6005, 7005 when projected onto a plane perpendicular to the longitudinal axis L. These features may be differently configured or omitted in other embodiments.

For the tool bits 6000, 7000 in FIGS. 11 thru 22, the front working region 6005, 7005 includes a first angled surface 6006, 7006 and a second angled surface 6008, 7008 forming a first included angle θ1 with the first angled surface 6006, 7006 projected along the longitudinal axis L onto a plane perpendicular to the longitudinal axis L ranging from 140 to 180 degrees. For the tool bit 6000 shown in FIGS. 11 thru 16, the tool bit 6000 further comprises a third angled surface 6010 forming a first external angle α1 with the second angled surface 6008 projected along the longitudinal axis L onto a plane perpendicular to the longitudinal axis L ranging from 140 to 180 degrees. The front working region 6005 further comprises a fourth angled surface 6011 forming a second included angle θ2 with the third angled surface 6010 projected along the longitudinal axis L onto a plane perpendicular to the longitudinal axis ranging from 140 to 180 degrees.

For the tool bits 5000, 6000, 7000 shown in FIGS. 4, and 11 thru 22, the first side region 5018, 6018, 7018 or second side region 5020, 6020, 7020 may include a first drafted side surface 5032, 6032, 7032 configured to improve penetration of the tool bit 5000, 6000, 7000 or reduce drag in use. Also, the rear region 5016, 6016, 7016 may form a first draft angle β1 with the longitudinal axis measured L in a plane containing the radial direction R and the longitudinal axis L, ranging from 0 to 40 degrees, the first side region 5018, 6018, 7018 may form a second draft angle β2 with the longitudinal axis L measured in a plane containing the radial direction R and the longitudinal axis L, ranging from 0 to 40 degrees, the second side region 5020, 6020, 7020 may form a third draft angle β3 with the longitudinal axis L measured in a plane containing the radial direction R and the longitudinal axis L, ranging from 0 to 40 degrees, and the front working region 5005, 6005, 7005 may form a fourth draft angle β4 with the longitudinal axis L measured in a plane containing the radial direction R and the longitudinal axis L, ranging from 0 to 30 degrees.

For the tool bit 5000 shown in FIG. 4, the working portion 5004 includes at least a first arcuate surface 5006 disposed longitudinally adjacent the shank portion 5002, the at least first arcuate surface 5006 defining a radius of curvature ROC that is equal to or greater than the half of the width W of the lower tool bit attachment portion 108 of the adapter board 102. Returning to FIG. 49 and FIG. 17, and the lower tool bit attachment portion 108 of the adapter board 102 may define a plurality of cylindrical thru-bores 112 and the shank portion 7002 of the tool bit 7000 includes a cylindrical configuration defining a circumferential direction C and a radial direction R. The shank portion 7002 is configured to fit within one of the plurality of cylindrical thru-bores 112 and the cross-hole 7014 may have a cylindrical configuration defining a cylindrical axis L7014 passing perpendicularly through the longitudinal axis L of the shank portion 7002. The cross-hole axis A7014 passes through the midpoint MW7005 of the width W7005 of the front working region 7005 when projected onto a plane perpendicular to the longitudinal axis L.

Still Referring to FIG. 4, the working portion 5004 includes a second arcuate surface 5008 disposed adjacent the first arcuate surface 5006 circumferentially on one side of the first arcuate surface 5006 and a third arcuate surface 5010 disposed adjacent the first arcuate surface 5006 on the other side of the first arcuate surface 5006. Referring now to FIG. 17, the front working region 7005 includes a first angled surface 7006 and a second angled surface 7008 forming a first included angle ⊖1 with the first angled surface 7006 projected along the longitudinal axis L onto a plane perpendicular to the longitudinal axis L ranging from 140 to 180 degrees.

The first arcuate surface 5006, the second arcuate surface 5008 or third arcuate surface 5010 may define a radius of curvature ROC as previously described herein. The tool bit 5000 may further comprise a rear face 5016, a first side region 5018 extending from the second arcuate surface 5008 to the rear region 5016, and a second side region 5020 extending from the third arcuate surface 5006 to the rear region 5016. The tool bit 5000 may further comprise a fourth arcuate surface 5011 extending circumferentially from the third arcuate surface 5010.

For the tool bits 5000, 6000, 7000 shown in FIGS. 4, and 11 thru 22, each tool bit 5000, 6000, 7000 defines a first draft angle (31 with the longitudinal axis L ranging from 0 to 40 degrees, the first side region 5018, 6018, 7018 defines a second draft angle β2 with the longitudinal axis L ranging from 0 to 40 degrees, the second side region 5020, 6020, 7020 defines a third draft angle (33 with the longitudinal axis L ranging from 0 to 40 degrees, and (see FIG. 4) the first arcuate surface 5006, the second arcuate surface 5008 and third arcuate surface 5010 define a fourth draft angle β4 with the longitudinal axis L ranging from 0 to 30 degrees.

Now, an embodiment of a blade assembly 8000 that may use tool bits 5000, 6000, 7000 having a greater versatility of orientations relative the centerline CL of the adapter board will be discussed with reference to FIGS. 49 thru 54. A blade assembly 8000 for use with a grading machine 10 may comprise an adapter board 102 defining an upper adapter board attachment portion 104, terminating in an upper adapter board free end 106, and a lower tool bit attachment portion 108, terminating in a lower adapter board free end 110, the lower tool bit attachment portion 108 defining a width W.

A plurality of tool bits 5000, 6000, 7000 (e.g. see FIGS. 4 and 11 thru 22) may be configured to be attached to the adapter board 102, each tool bit 5000, 6000, 7000 may include a shank portion 5002, 6002, 7002 defining a longitudinal axis L and a perimeter 5003, 6003, 7003, a pair of parallel flat surfaces 5012, 6012, 7012 on the perimeter 5003, 6003, 7003 and a cross-hole 5014, 6014, 7014 defining a cross-hole axis A5014, A6014, A7014 (best seen in FIGS. 4, and 11 thru 22), extending through the flat surfaces 5012, 6012, 7012 perpendicularly. The working portion 5004, 6004, 7004 may include a rear region 5016, 6016, 7016, a front working region 5005, 6005, 7005 defining a width W5005, W6005, W7005 with a midpoint MW5005, MW6005, MW7005, a first side region 5018, 6018, 7018 and a second side region 5020, 6020, 7020. The first side region 5018, 6018, 7018 and the second side region 5020, 6020, 7020 may define an angle of extension γ measured in a plane perpendicular to the longitudinal axis L. The cross-hole axis A5014, A6014, A7014 may pass through the width W5005, W6005, W7005 of the front working region 5005, 6005, 7005 when projected onto a plane perpendicular to the longitudinal axis L.

For the tool bit 500 shown in FIG. 4, the tool bit 5000 may comprise a first arcuate surface 5006 defining a radius of curvature ROC in a plane perpendicular to the longitudinal axis L ranging from 50 to 65 mm. Additional arcuate surfaces may be provided. This radius of curvature ROC may allow the tool bit 5000 to be better supported in a plurality of orientations relative to the CL of the adapter board 102 (see FIGS. 7 thru 10).

Focusing on FIGS. 49 thru 54, an orientation plate 9000 may also be provided that defines a plurality of apertures 9002, each aperture 9002 having an orientation flat 9004 configured to contact a flat surface 7012 of the shank portion 7002 of tool bit 7000. It is to be understood that any of the tool bits discussed herein may be used with the blade assembly 8000 or blade assembly 100.

More specifically, with reference to FIGS. 7 and 51, an orientation plate 9000 configured to orient a tool bit 200, 5000, 6000, 7000 relative to the centerline CL of an adapter board 102 may be described as follows. The orientation plate 9000 may comprise a rectangular body 9001 defining a top surface 9006, a bottom surface 9008, a front surface 9010, a back surface 9012, a first end surface 9014, a second end surface 9016, and a thickness 9018 that is the minimum dimension of the body 9001.

A plurality of apertures 9002 may extend through the thickness 9018 of the body 9001, each aperture 9002 defining a perimeter 9020 having at least one orientation flat 9004. In the embodiments shown in FIGS. 7 and 51, the plurality of apertures 9002 are similarly configured, having two orientation flats 9004 parallel to each other and two circular portions 9022 connecting the two orientation flats 9004. The two orientation flats 9004 of each perimeter 9020 of each aperture 9002 may be similarly configured such that all the orientation flats 9004 are parallel to each other. In many embodiments, the plurality of apertures 9002 are identically configured. The thickness 9018 of the plate 900 may defines a midplane MP and the plate 9000 may be symmetrical about the midplane MP.

Figure 7:
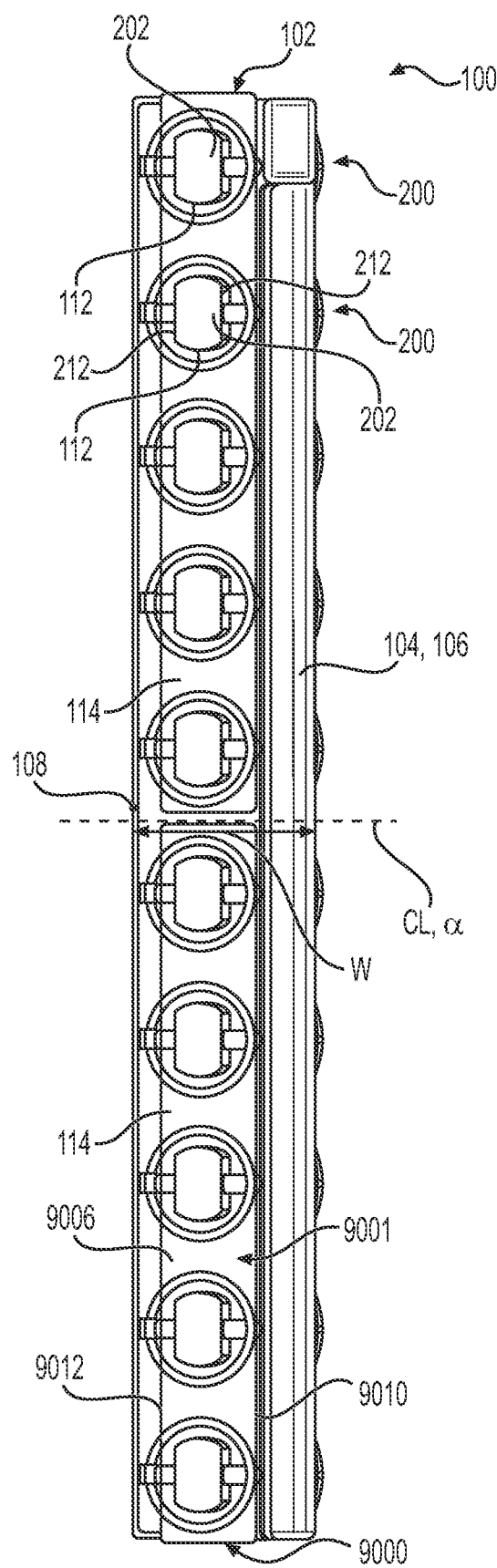
FIG. 7 is a top view of the blade assembly of FIG. 2 showing the tool bits arranged at a zero degree incline with respect to the centerline of the blade assembly.
Figure 8:
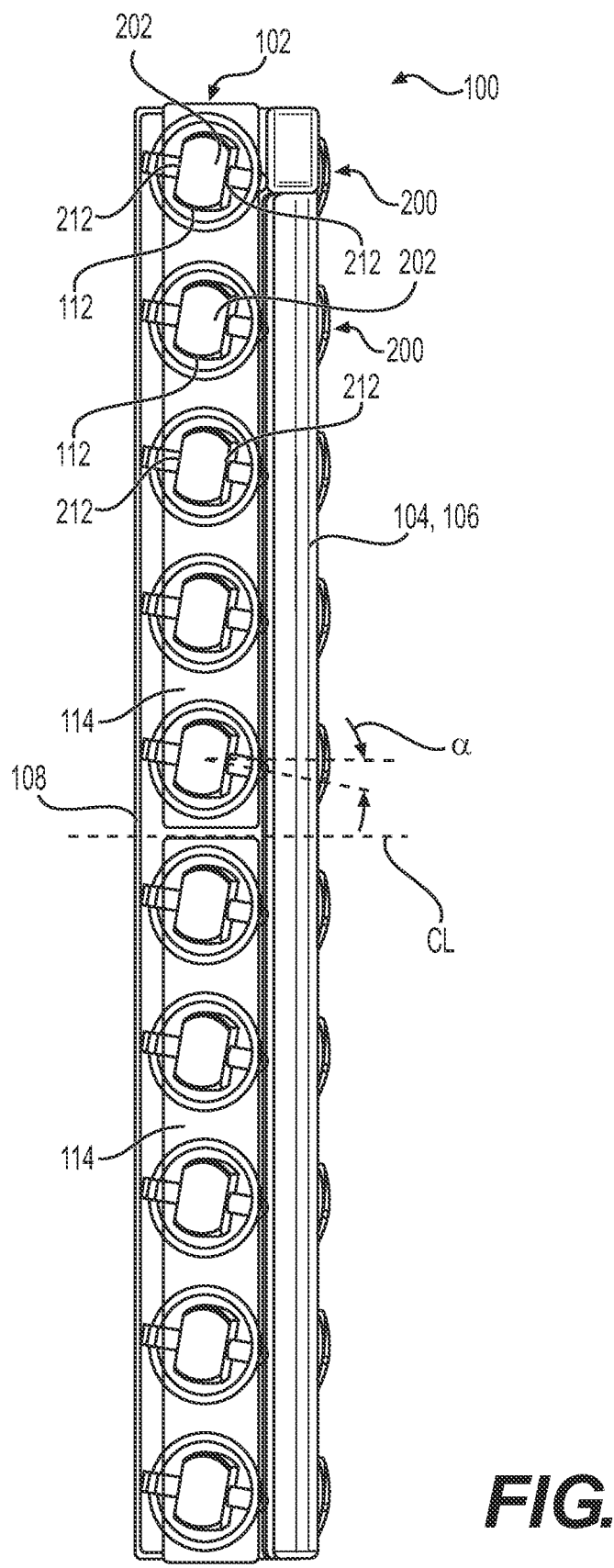
FIG. 8 is a top view of the blade assembly of FIG. 2 showing the tool bits arranged at a ten degree incline with respect to the centerline of the blade assembly.
Figure 9:
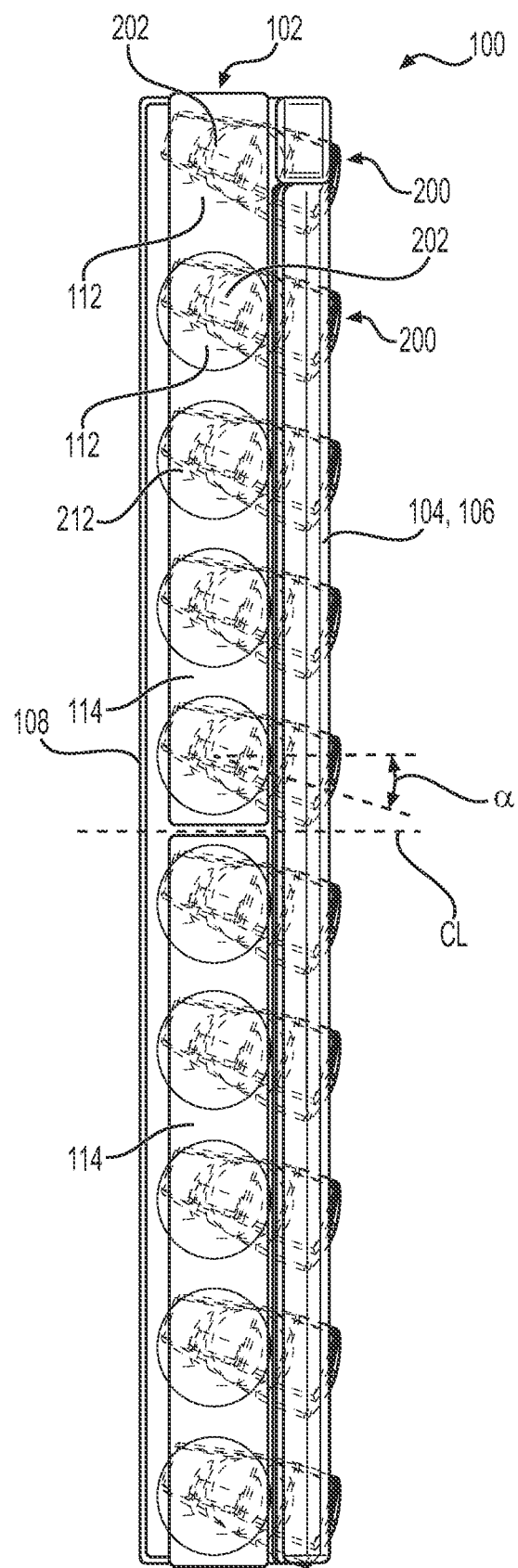
FIG. 9 is a top view of the blade assembly of FIG. 2 showing the tool bits arranged at a twenty degree incline with respect to the centerline of the blade assembly.
Figure 10:
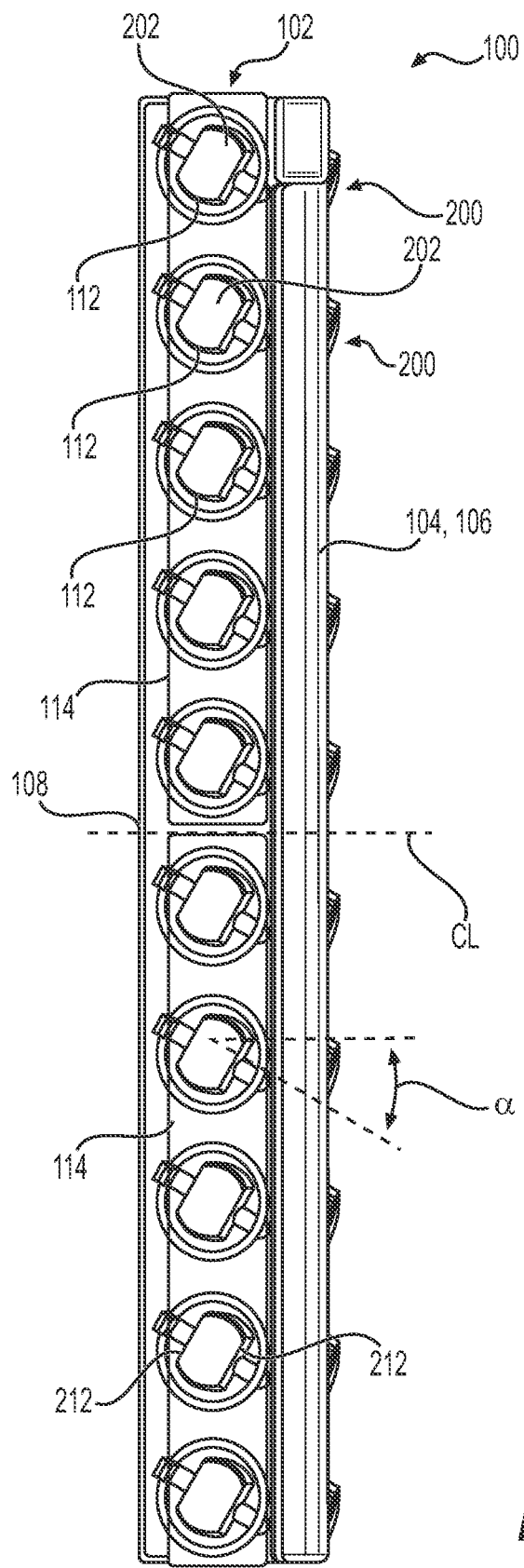
FIG. 10 is a top view of the blade assembly of FIG. 2 showing the tool bits arranged at a thirty degree incline with respect to the centerline of the blade assembly.
Figure 49:
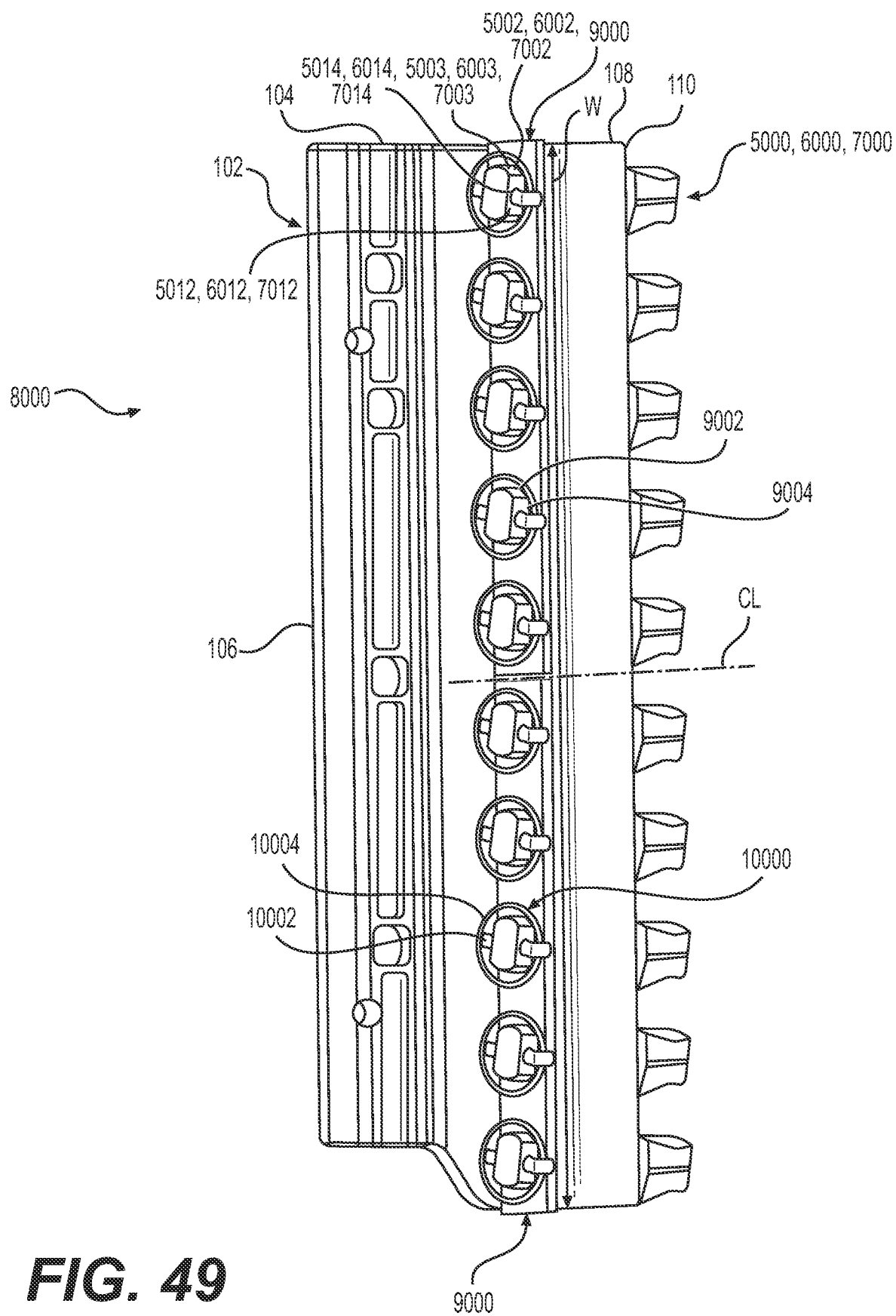
FIG. 49 is a rear oriented perspective view of a blade assembly showing tool bits angled at a ten degree angle with the centerline of the adapter board, configured to move material to the right of the adapter board in use.
Figure 50:
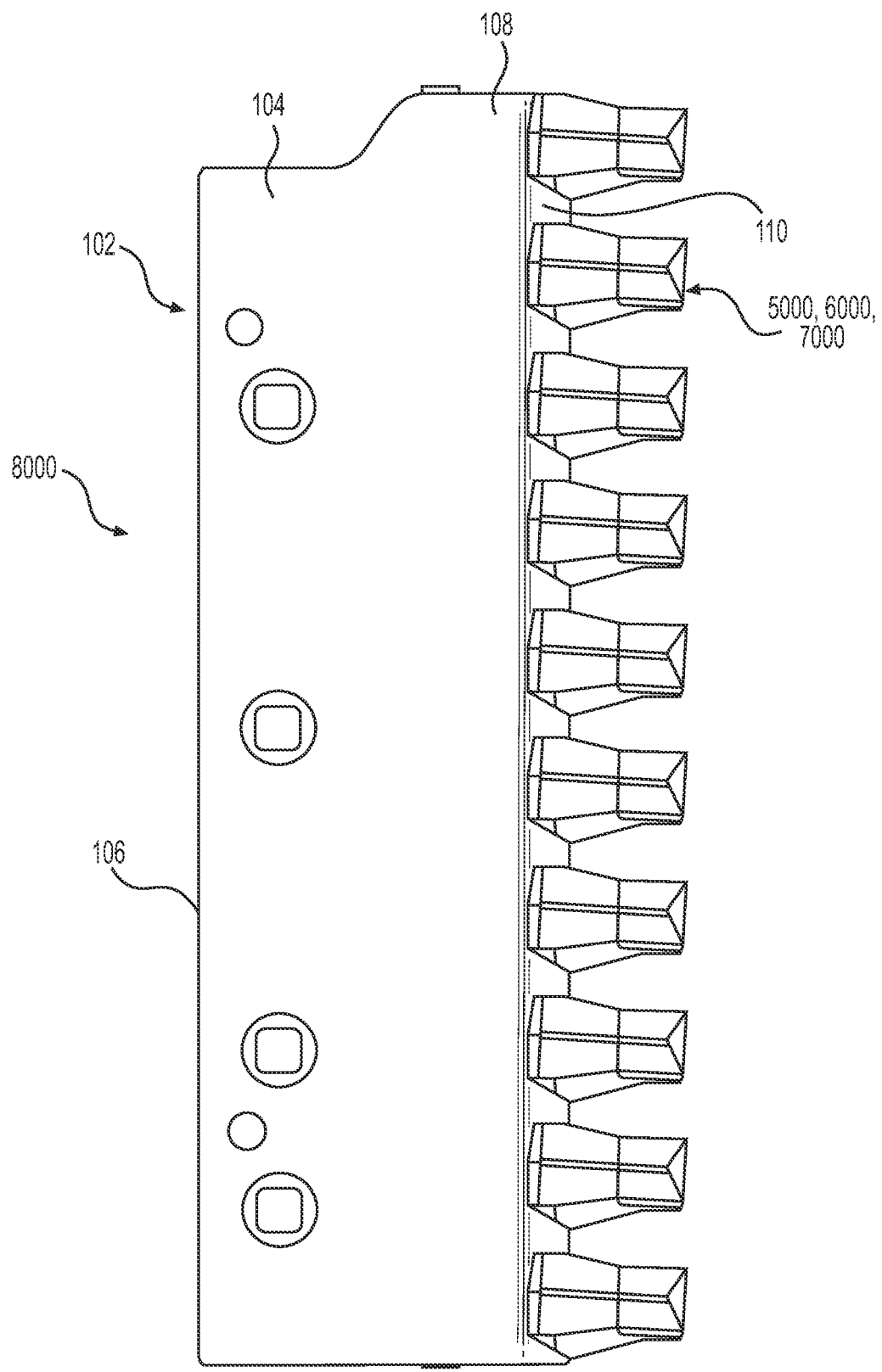
FIG. 50 is a front oriented perspective view of a blade assembly showing tool bits angled at a ten degree angle with the centerline of the adapter board, configured to move material to the left of the adapter board in use.
Figure 51:
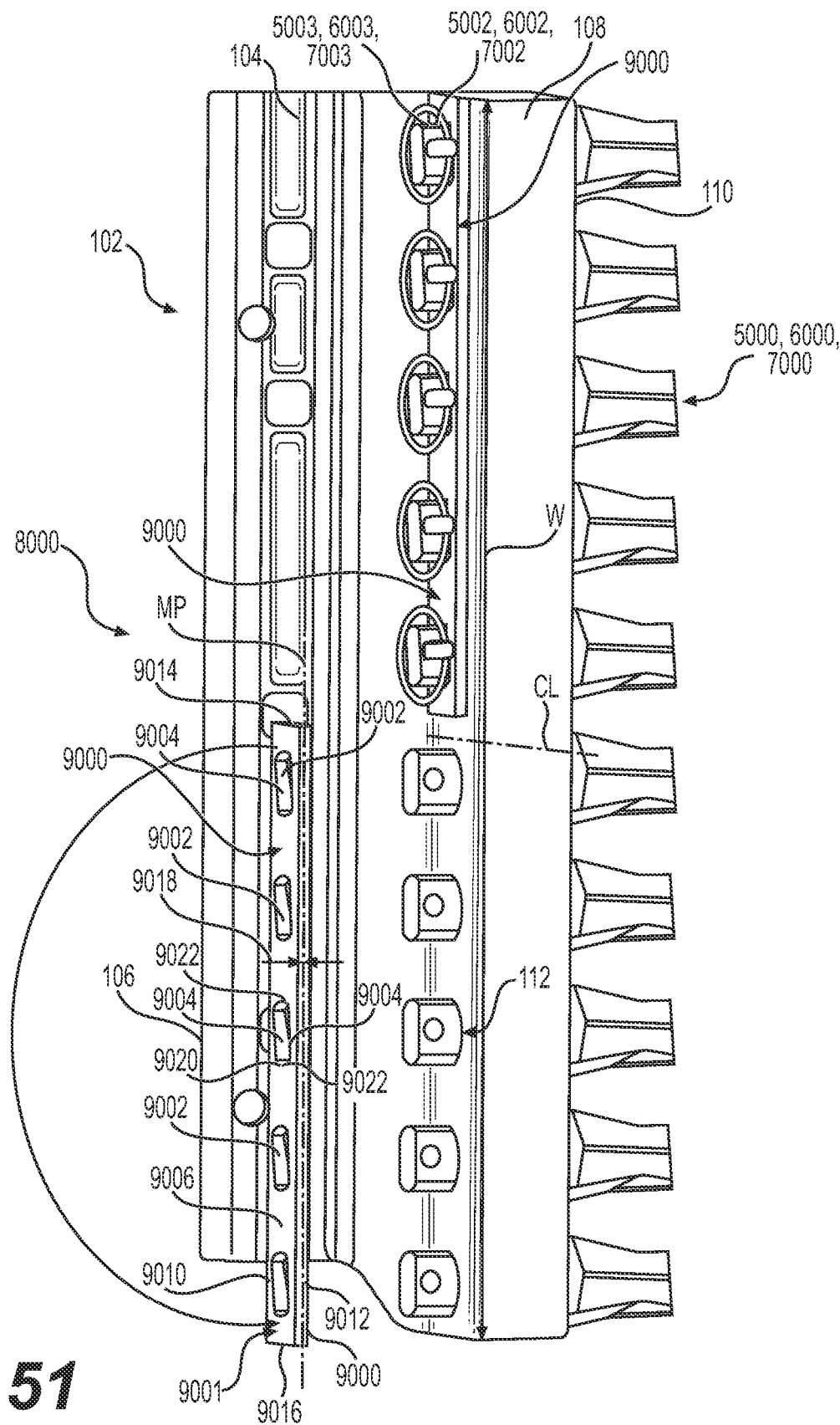
FIG. 51 is a rear oriented partially exploded assembly view of the blade assembly of FIG. 50 showing the flipping of an orientation plate onto the top surface of the lower tool bit attachment portion of the adapter board.
Figure 52:
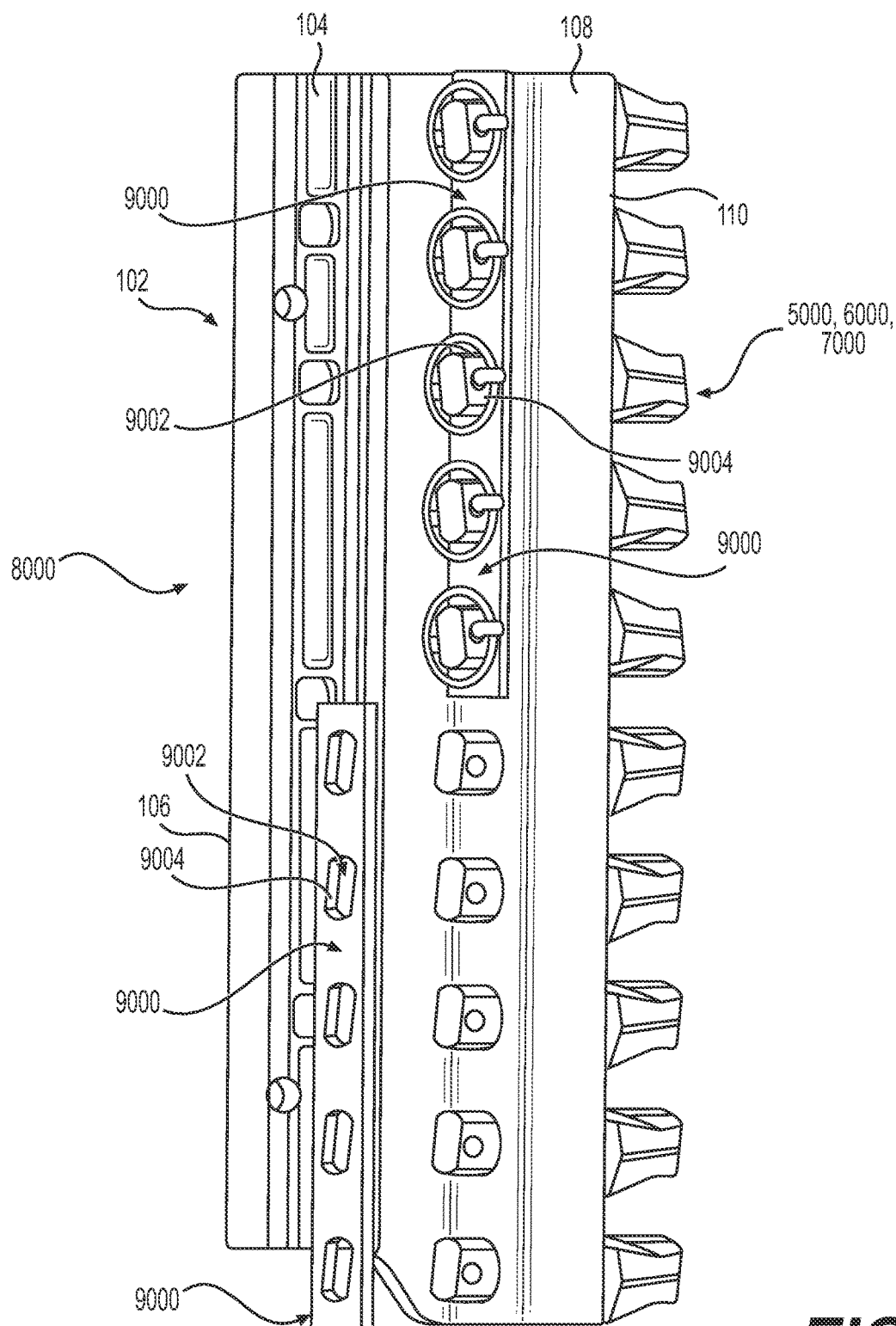
FIG. 52 illustrates the blade assembly of FIG. 51 with the orientation plate flipped, allowing the left set of tool bits to be oriented at an opposite ten degree angle with the centerline as compared to the right set of tool bits.
Figure 53:
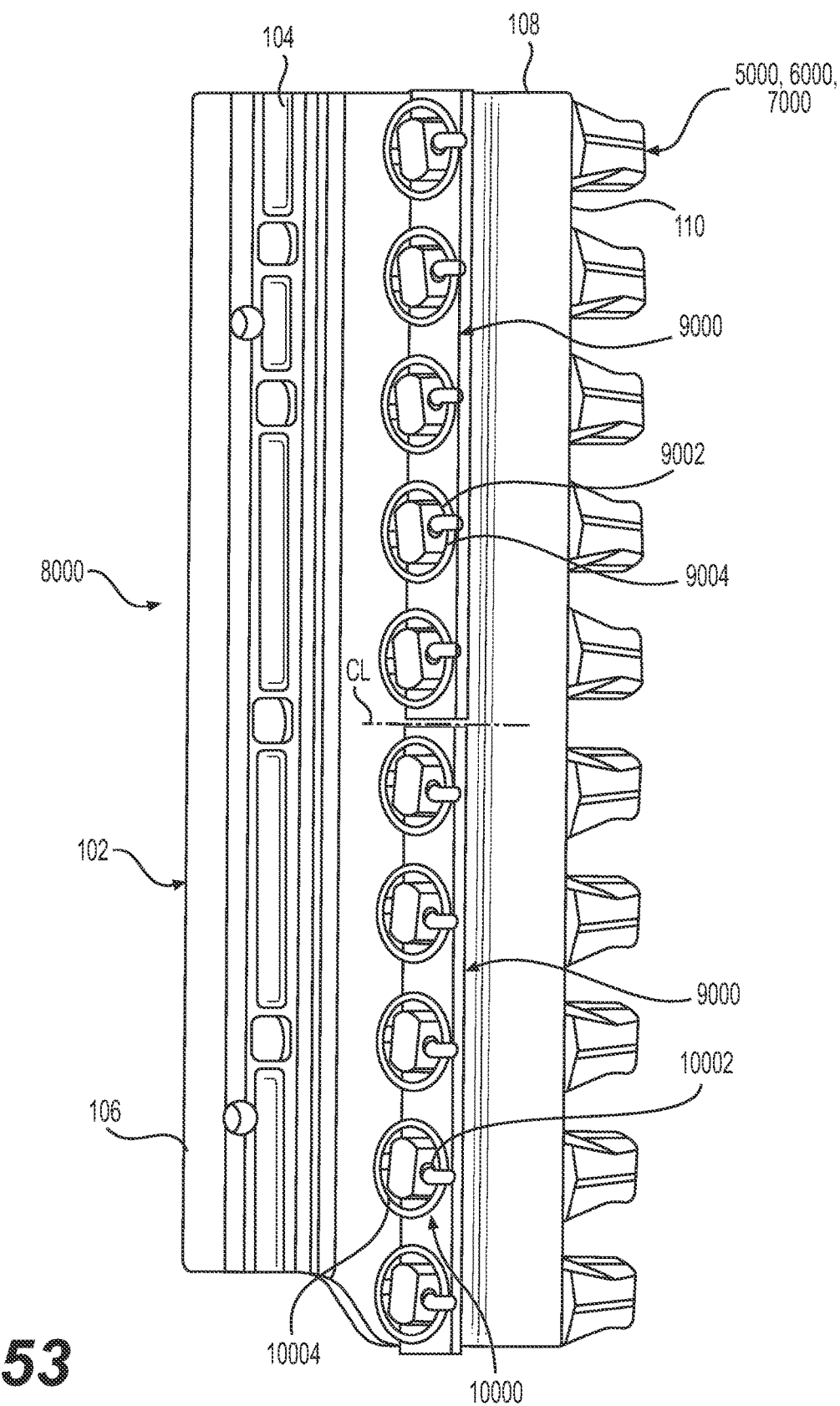
FIG. 53 depicts the blade assembly of FIG. 52 fully assembled.
Figure 54:
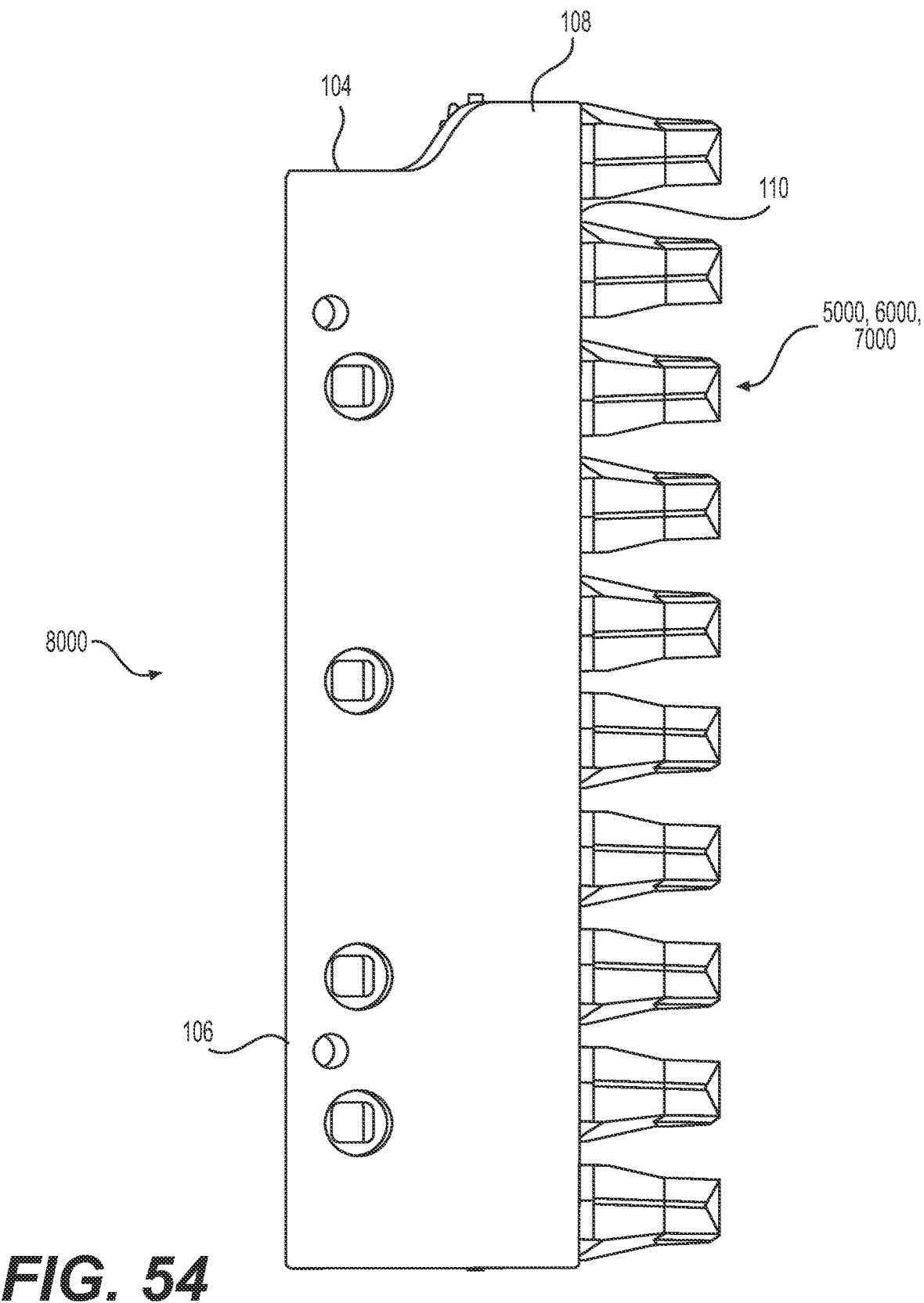
FIG. 54 is a front oriented perspective view of the blade assembly of FIG. 53.

As shown in FIGS. 7, 49 and 51, mounting hardware 10000 may be used to hold the tool bits 200, 5000, 6000, 7000 in place. The mounting hardware 10000 may include the orientation plate 9000 and a lynch pin 10002 with a pull ring 10004. The user simply needs to install the lynch pin 10002 into the cross-hole 314 of the shaft portion 302 of the tool bit 300 to hold the tool bit 300 in place (e.g. see FIG. 4). Pulling on the pull ring 10004 removes the lynch pin 10002 from the cross-hole 314, allowing removal of the tool bit 300.

The relative dimensions of the shaft portion may enable any tool bit discussed herein to mate as desired with the mounting hardware 10000 in order to attach the tool bit to the adapter board, allowing interchangeability. For example, as shown in FIG. 17, the axial length AL7002 (measured along the longitudinal axis L) of the shank portion 7002 may range from 40 to 80 mm. The axial length AL7012 (measured along the longitudinal axis L) of the flats 7012 of the shank portion 7002 may range from 10 to 30 mm. The axial positioning (AD7012) of the flats 7012 to the working portion 7004 may range from 30 to 70 mm. The diameter D7002 of the shaft portion 7002 may range from 20 to 45 mm. The shaft portion of any tool bit discussed herein may be similarly or identically configured as other shaft portions to facilitate the interchangeability of the tool bits with the adapter board.

Various embodiments of a serrated blade assembly using differently configured components to form the serrated configuration as well as a wear member that may be used in such a serrated assembly will now be discussed. For brevity, only specific embodiments of the tool bit shown in FIG. 4, and FIGS. 11 thru 16 will be described in detail. It is to be understood that the embodiments shown of the tool bits of FIGS. 3, 5, 6, 23, 29, 35, and 41, etc. may be used instead in other embodiments of the serrated blade assembly.

Figure 55:
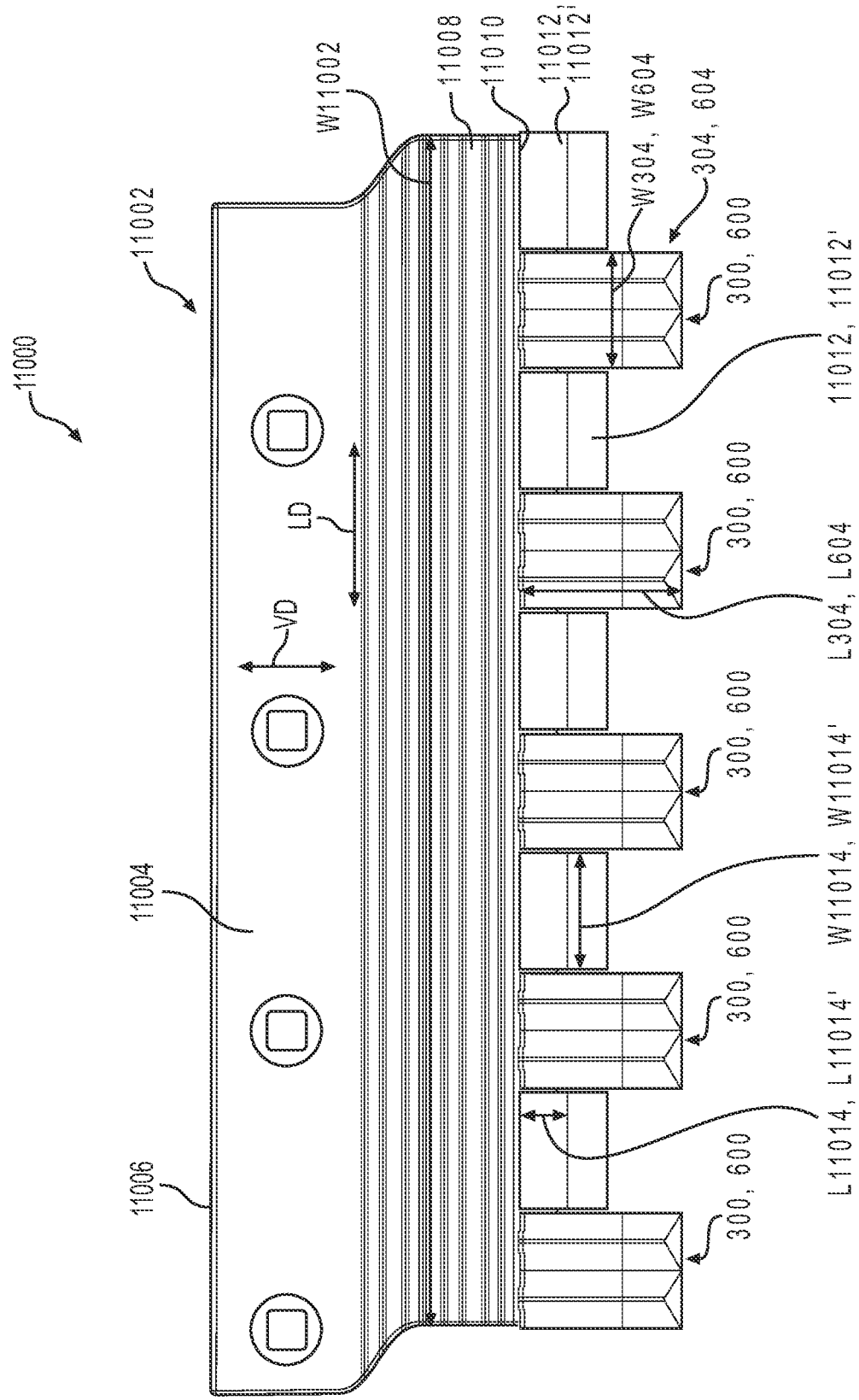
FIG. 55 is a front view of a serrated blade assembly according to an embodiment of the present disclosure using differently configured components such as tool bits and wear members.

A blade assembly (such as a serrated blade assembly) for use with a grading machine is shown in FIG. 55. The blade assembly 11000 may comprise an adapter board 11002 defining an upper adapter board attachment portion 11004, terminating in an upper adapter board free end 11006, and a lower tool bit attachment portion 11008, terminating in a lower adapter board free end 11010, the adapter board 11002 defining a lateral direction LD and a width W11002 measured along the lateral direction LD, and vertical direction VD perpendicular to the lateral direction LD, a plurality of tool bits 300, 600 configured to be attached to the adapter board 11002, each tool bit 300, 600 including a working portion 304, 604 defining a working length L304, L604 measured along the vertical direction VD (parallel to the shaft longitudinal axis) and a working width W304, W604 measured along the lateral direction LD, and a plurality of wear members 11012, 11012' configured to be attached to the adapter board 11002.

Each wear member 11012, 11012' may include a wear portion 11014, 11014' defining a wear length L11014, L11014' measured along the vertical direction VD and a wear width W11014, W11014' measured along the lateral direction LD. The wear length may be less than the working length. In some embodiments, the wear length L11014, L11014' is at least 20% less than the working length L304, L604 and may be as much as 50% less than the working length L304, L604 or more. The wear portion and the working portion may be differently configured from each other in other ways. For example, the perimeter of the working portion may have more intricate features as compared to the wear portion.

Figure 56:
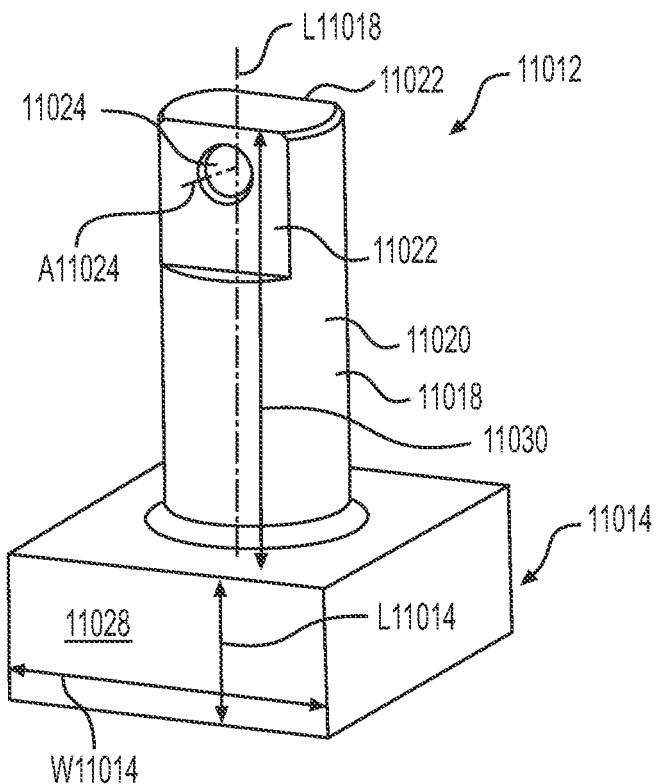
FIG. 56 is a perspective view of a wear member according to an embodiment of the present disclosure that may be used in the serrated blade assembly of FIG. 55.
Figure 57:
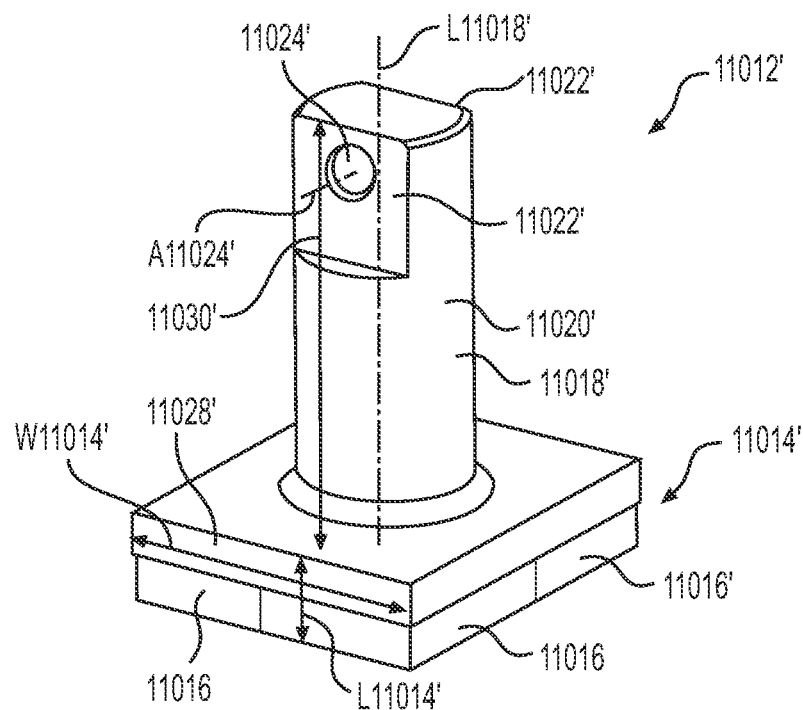
FIG. 57 is a perspective view of a wear member according to another embodiment of the present disclosure.

Looking now at FIGS. 56 and 57, the features of the wear member 11012, 11012' may be seen more clearly. The wear portion 11014, 11014' may include a rectangular configuration. In other embodiments, the wear portion 11014, 11014' includes a square configuration. Looking at FIGS. 56 and 57 along with FIG. 55, the wear width W11014, W11014' may be the same as the working width W304, W604. This may be useful when the distance from tool bit 300, 300 to the wear member 11012, 11012' is consistent as one progresses along the lateral direction LD of the blade assembly 11000. Looking at FIG. 57, the wear member 11012, 11012' may include an insert 11016 (e.g. made from a ceramic material, white iron, wear button) that forms part of the wear portion 11014, 11014'.

Focusing now on FIG. 55, the working portion 304, 604 of the tool bit 300, 600 includes angled surfaces 606, 608 or arcuate surfaces 306, 308 (see FIG. 4 for an example). In some embodiments, the working portion 304 may include both angled surfaces 342 and arcuate surfaces 306, 308 (see FIG. 4).

Referring back to FIG. 55, once the plurality of tool bits 300, 600 are attached to the adapter board 11002 and the plurality of wear members 11012, 11012' are attached to the adapter board 11002, the tool bits 300, 600 and the wear members 11012, 11012' may form an alternating pattern along the lateral direction LD switching from tool bit to wear member. In some embodiments, the tool bit 300, 600 may include an insert 328, 628 that forms part of the working portion 304, 604 and the plurality of tool bits 300, 600 are identically configured to each other. Similarly, the plurality of wear members 11012, 11012' may be identically configured to each other. Also, the plurality of tool bits 300, 600 and the plurality of wear members 11012, 11012' may include identical shank portions 302, 602, allowing the tool bits 300, 600 and the wear members 11012, 11012' to be attached to the adapter board.

Focusing now on FIGS. 56 and 57, various embodiments of the wear member 11012, 11012' may be characterized as follows. The wear member 11012, 11012' may comprise a shank portion 11018, 11018' defining a longitudinal axis L11018, L11018' and a perimeter 11020, 11020' a pair of parallel flat surfaces 11022, 11022' on the perimeter 11020, 11020' and a cross-hole 11024, 11024' defining a cross-hole axis A11024, A11024' along which the cross-hole 11024, 11024' extends through the flat surfaces 11022, 11022' perpendicularly, and a wear portion 11014, 11014' extending downwardly axially from the shank portion 11018, 11018'.

The wear portion 11014, 11014' may include a rectangular configuration and the shank portion 11018, 11018' may include a cylindrical configuration.

In other embodiments, the wear portion 11014, 11014' includes a polygonal configuration other than a rectangular or square configuration. In some embodiments, the wear portion 11014, 11014' may not have a polygonal configuration, etc. (e.g. circular, polynomial, elliptical).

The wear portion 11014, 11014' may define a bottom portion 11026 and may include an insert 11016 attached to the bottom portion 11026.

In embodiments where a polygonal configuration is provided for the wear portion 11014, 11014' of the wear member 11012, the polygonal configuration may include a straight surface 11028, 11028' that is parallel to the flat surfaces 11022, 11022' of the shank portion 11018, 11018'.

A wear member 11012, 11012' according to another embodiment of the present disclosure may be described as follows. The wear member 11012, 11012' may comprise a shank portion 11018, 11018' defining a longitudinal axis L11018, L11018' and a perimeter 11020, 11020', at least one flat surface 11022, 11022' on the perimeter 11020, 11020' and a cross-hole 11024, 11024' defining a cross-hole axis A11024, A11024' along which the cross-hole 11024, 11024' extends through the at least one flat surface 11022, 11022' perpendicularly, and a wear portion 11014, 11014' extending downwardly axially from the shank portion 11018, 11018', the wear portion 11014, 11014' including a polygonal configuration.

The wear portion 11014, 11014' may include a bottom portion 11026 and a plurality of inserts 11016 may be attached to the bottom portion 11026. The shank portion 11018, 11018' may define a shank longitudinal length 11030, 11030' and the wear portion 11014, 11014' may define a wear portion longitudinal length L11014, L11014' that is less than the shank longitudinal length 11030, 11030'.

Figure 58:
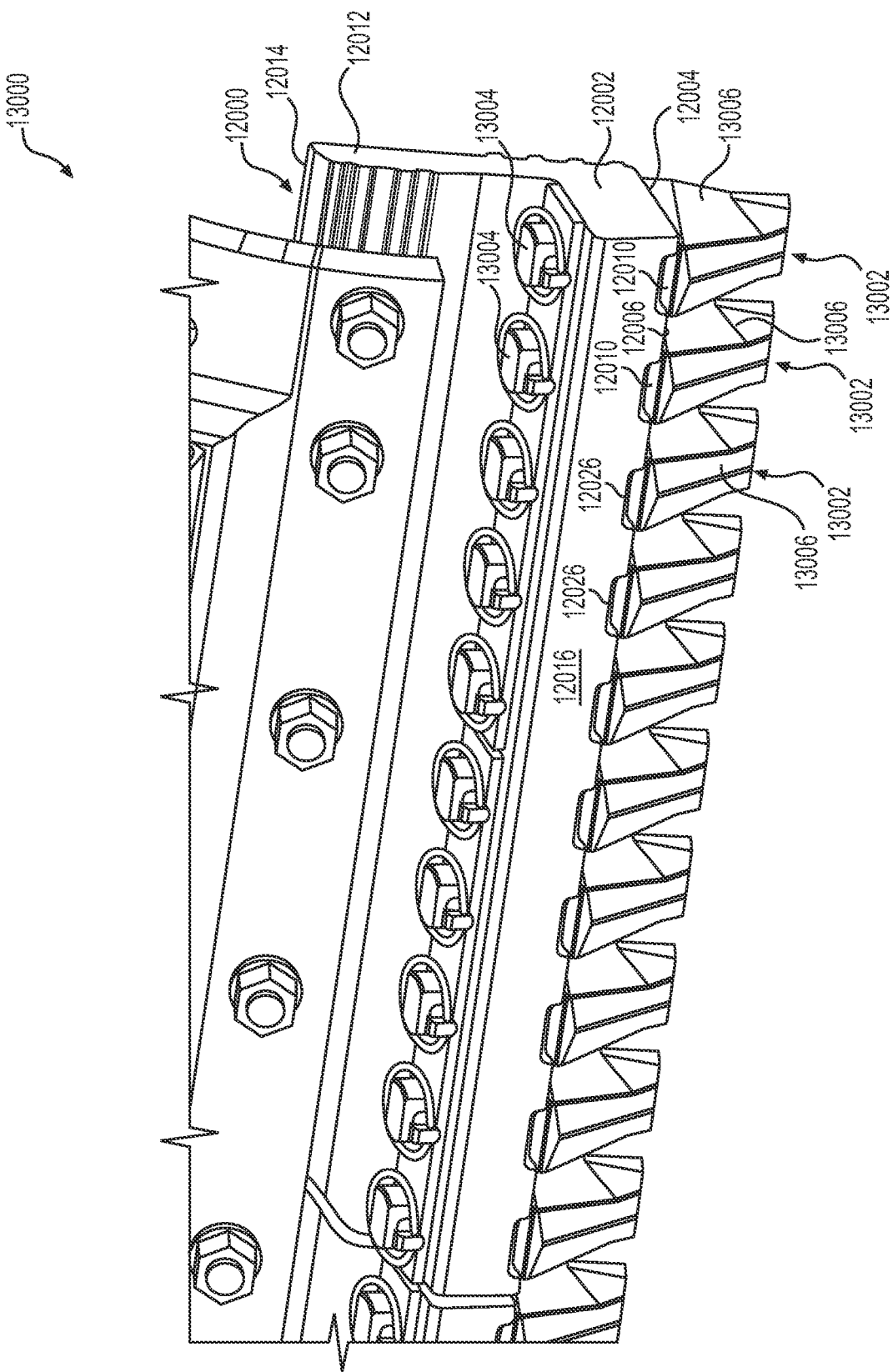
FIG. 58 is a rear oriented perspective view of a blade assembly employing an adapter board with pry points according to an embodiment of the present disclosure.
Figure 59:
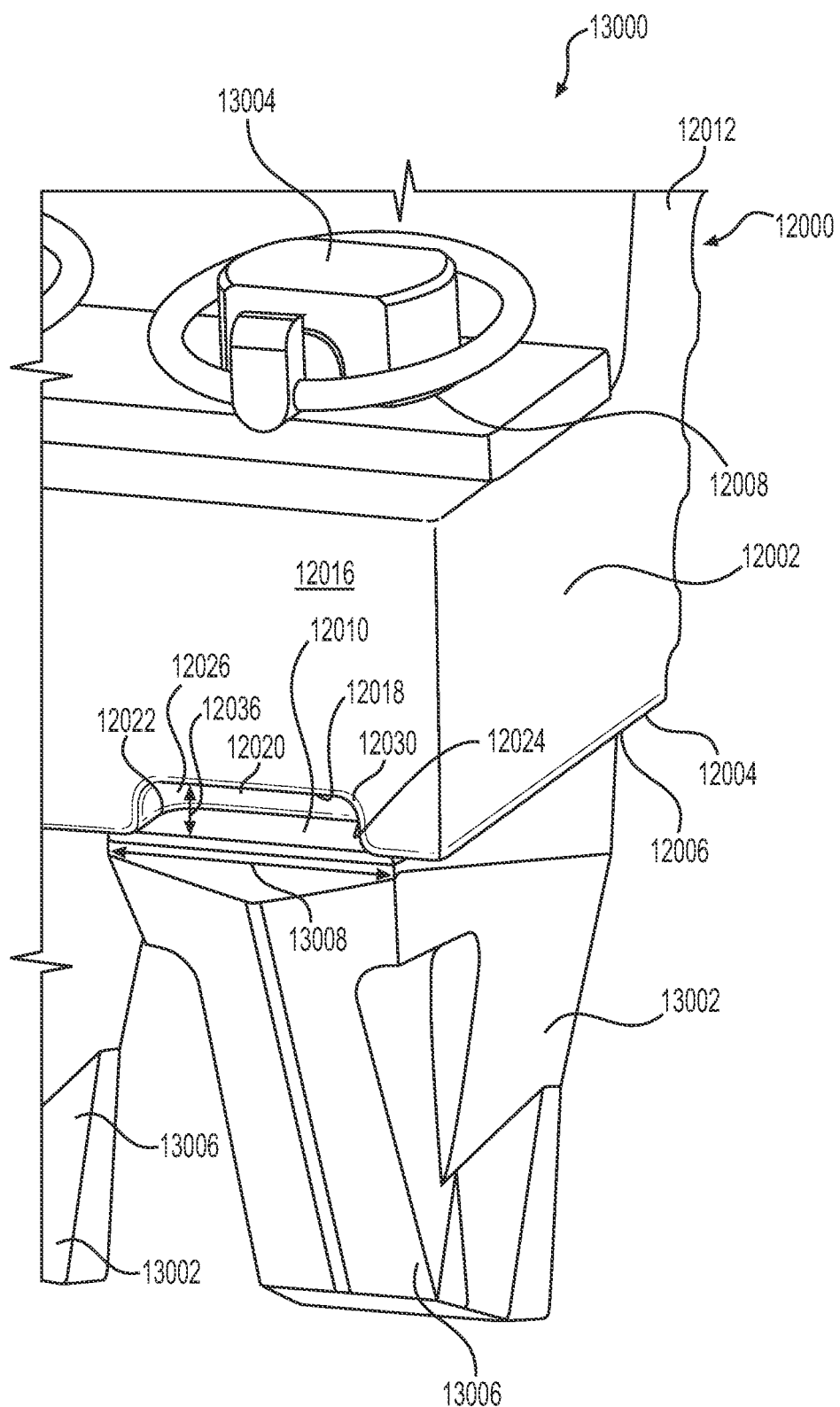
FIG. 59 is an enlarged view of a tool bit and pry point disposed at the end of the adapter board of the blade assembly of FIG. 58.
Figure 60:
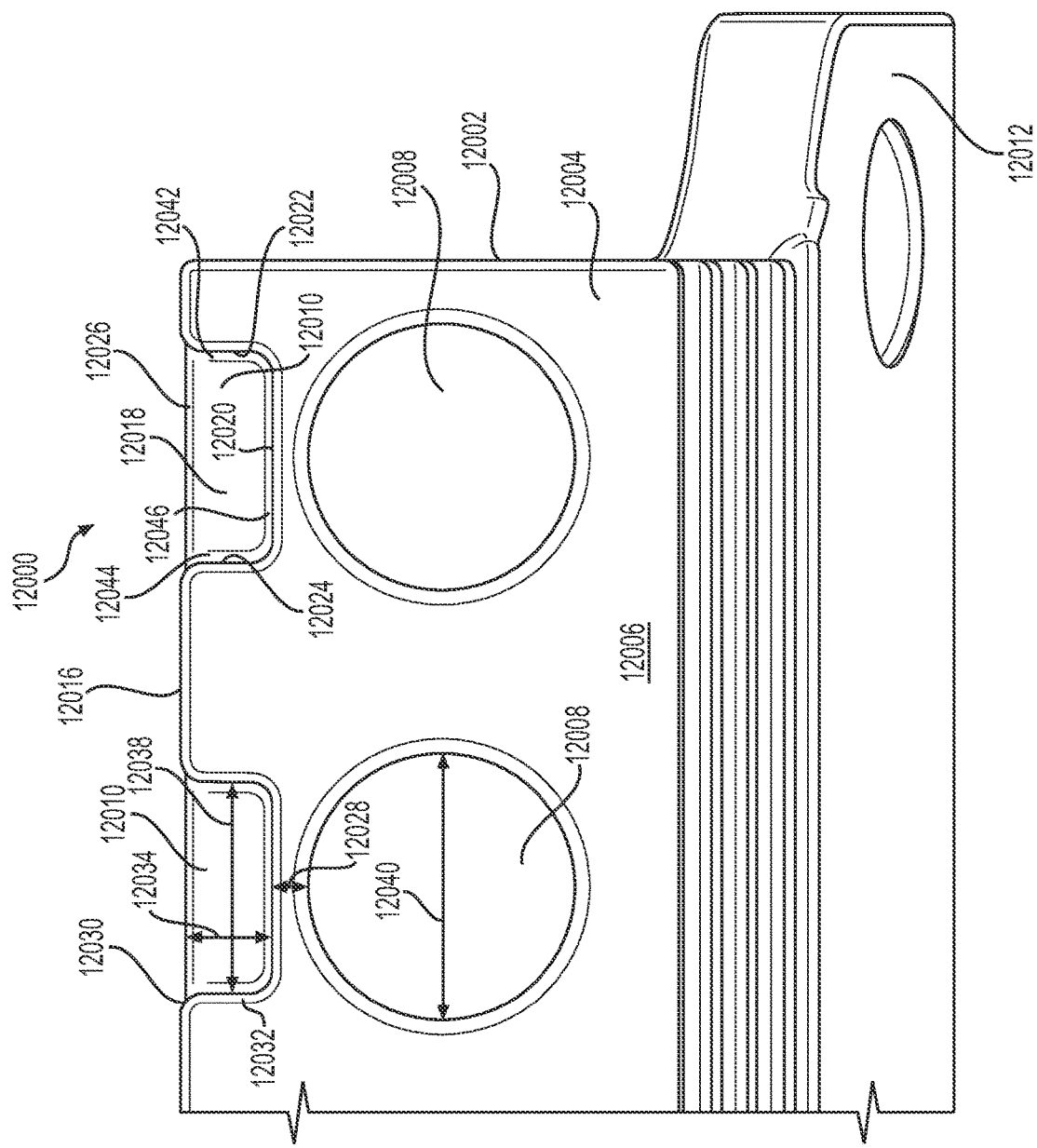
FIG. 60 is an enlarged bottom view of one of the pry points of the adapter board of FIG. 58 with the tool bit removed for enhanced clarity.

FIGS. 58 thru 60 depict a blade assembly and an adapter board with pry points. These pry points may allow tool bits or wear members to be removed from the adapter board after being used.

More specifically, an adapter board 12000 for use with a blade assembly 13000 according to an embodiment of the present disclosure may be described as follows. The adapter board 12000 may comprise a lower tool bit attachment portion 12002, terminating in a lower adapter board free end 12004. The lower adapter board free end 12004 may define a bottom surface 12006 defining a plurality of shank receiving bores 12008 and a plurality of pry slots 12010. Each one of the plurality of pry slots 12010 may be disposed adjacent at least one of the plurality of shank receiving bores 12008.

In some embodiments, the adapter board 12000 may further comprise an upper adapter board attachment portion 12012, terminating in an upper adapter board free end 12014. The upper adapter board attachment portion 12014 may be separate from or unitary with the lower tool bit attachment portion 12002. The lower tool bit attachment portion 12002 of the adapter board 12000 defines a rear surface 12016 disposed adjacent the bottom surface 12006 and the rear surface 12016 defines a plurality of openings 12018 of the plurality of pry slots 12010. This may allow a pry bar or other tool to enter the pry slot 12010 between the adapter board 12000 and the tool bit 13002 or wear member (e.g. see 11012, 11012' in FIG. 55).

Looking at FIGS. 59 and 60, a rear abutment surface 12018 may be provided such that none of the plurality of pry slots 12010 are in communication with the plurality of shank receiving bores 12008. More particularly, each one of the plurality of pry slots 12010 is spaced away from the adjacent one of the plurality of shank receiving bores 12008 a predetermined distance 12028 ranging from 0 to 25 mm. This may not be the case in other embodiments such as when the pry slot 12010 extends completely through the lower tool bit attachment portion 12002. The predetermined distance 12028 is the minimum distance 12028 between the pry slot 12010 and the shank receiving bore 12008 excluding blends (e.g. fillets, chamfers) or other transitional geometry.

In some embodiments, each one of the plurality of pry slots 12010 includes a rectangular configuration having a top pry surface 12018, a rear abutment surface 12020, a first side guide surface 12022, and a second side guide surface 12024. The first and the second guide surfaces 12022, 12024 may aid in guiding a pry bar or other tool to reach the rear abutment surface 12020 or to otherwise stay within the pry slot 12010, focusing the leverage of the pry bar or other tool onto the tool bit 13002 or wear member (e.g. see 11012, 11012' in FIG. 55) to force the tool bit or wear member out of the shank receiving bore 12008.

In still further embodiments, as shown in FIGS. 58 thru 60, the adapter board 12000 may comprise an upper adapter board attachment portion 12012, terminating in an upper adapter board free end 12014, and a lower tool bit attachment portion 12002, terminating in a lower adapter board free end 12004. For example, the adapter board may be manufactured as a unitary component. The lower adapter board free end 12004 may define a bottom surface 12006 defining at least one shank receiving bore 12008 and at least one pry slot 12010 disposed adjacent the at least one shank receiving bore 12008.

The shape of the pry slot 12010 may take various configurations. In some embodiments, the lower tool bit attachment portion 12002 of the adapter board 12000 defines a rear surface 12016 disposed adjacent the bottom surface 12006 and the rear surface 12016 defines an opening 12026 of the pry slot 12010. This may not be the case for other embodiments. In some embodiments, the pry slot 12010 is a blind pocket, meaning that the pry slot 12010 is spaced away from the adjacent one of the plurality of shank receiving bores 12008 a predetermined distance 12028 ranging from 0 to 25 mm.

The pry slot 12010 may include a rectangular configuration having a top pry surface 12018, a rear abutment surface 12020, a first side guide surface 12022, and a second side guide surface 12024, and the rear abutment surface 12020 is positioned closest to the shank receiving bore 12008. This may not be the case in other embodiments.

A blade assembly 13000 for use with a grading machine according to another embodiment of the present disclosure having pry points will now be discussed with reference to FIGS. 58 thru 60. The blade assembly 13000 may comprise an adapter board 12000 defining an upper adapter board attachment portion 12012, terminating in an upper adapter board free end 12014, and a lower tool bit attachment portion 12002, terminating in a lower adapter board free end 12004. The lower adapter board free end 12004 may define a bottom surface 12006 defining a plurality of shank receiving bores 12008 and a plurality of pry slots 12010. Each one of the plurality of pry slots 12010 is disposed adjacent at least one of the plurality of shank receiving bores 12008. A plurality of tool bits 13002 including shank portions 13004 configured to fit within the plurality of shank receiving bores 12008 may be provided. In addition to or in lieu of the plurality of tool bits, a plurality of wear members including shank portions (e.g. see FIGS. 56 and 57) configured to fit within the plurality of shank receiving bores 12008 may be provided. It is to be understood that any tool bit or wear member discussed herein may be used with a blade assembly having pry points.

The lower tool bit attachment portion 12002 of the adapter board 12000 defines a rear surface 12016 disposed adjacent the bottom surface 12006 and the rear surface 12016 defines a plurality of openings 12026 of the plurality of pry slots 12010. As best seen in FIG. 60, none of the plurality of pry slots 12010 are in communication with the plurality of shank receiving bores 12008. Instead, each one of the plurality of pry slots 12010 is spaced away from the adjacent one of the plurality of shank receiving bores 12008 a predetermined distance 12028 ranging from 0 to 25 mm. Again, this distance is the minimum distance from the rear abutment surface 12020 to the shank receiving bore 12008, ignoring any transitional geometry.

Various configurations of the pry slot are possible. For the embodiment shown in FIGS. 58 thru 60, each one of the plurality of pry slots 12010 includes a rectangular configuration having a top pry surface 12018, a rear abutment surface 12020, a first side guide surface 12020, and a second side guide surface 12024.

Focusing on FIGS. 59 and 60, the lower tool bit attachment portion 12002 defines a first plurality of blends 12030 between the rear surface 12016 and each one of the plurality of the plurality of pry slots 12010 and a second plurality of blends 12032 between the bottom surface 12006 and each one of the plurality of pry slots 12010. Each one of the plurality of pry slots 12010 defines a depth 12034 measured from the rear surface 12016 of the lower tool bit attachment portion 12002 of the adapter board 12000 to the rear abutment surface 12020 (minimum distance excluding transitional geometry) ranging from 5 mm to 30 mm. Similarly, each one of the plurality of pry slots 12010 defines a height 12036 measured from the bottom surface 12006 of the lower tool bit attachment portion 12002 of the adapter board 12000 to the top pry surface 12018 (minimum distance excluding transitional geometry) ranging from 5 mm to 20 mm. Likewise, each one of the plurality of pry slots 12010 defines a width 12038 measured from the first side guide surface 12022 to the second side guide surface 12024 (minimum distance excluding transitional geometry) ranging from 5 mm to 50 mm. Any of these dimensions may be varied as needed or desired in other embodiments to have values other than those specifically mentioned herein.

As best seen in FIG. 60, each one of the plurality of shank receiving bores 12008 defines a diameter 12040 and the width 12038 of each one of the plurality of pry slots 12010 is less than the diameter 12040 of the plurality of shank receiving bores 12008. This may not be the case for other embodiments. Also, the lower tool bit attachment portion 12002 defines at least one blend 12042 between the first side guide surface 12022 and the top pry surface 12018, at least one blend 12044 between the second side guide surface 12024 and the top pry surface 12018, and at least one blend 12046 between the rear abutment surface 12020 and the top pry surface 12018. These features may be omitted in other embodiments or may be differently configured.

As best seen in FIGS. 59 and 60, each one of the plurality of pry slots 12010 defines a width 12038 measured from the first side guide surface 12022 to the second side guide surface 12024, and the plurality of tool bits 13002 includes a working portion 13006 or the plurality of wear members includes a wear portion (see FIGS. 55 thru 57), and the shank portions 13006 of either the plurality of tool bits 13000 or the shank portions of the plurality of wear members are installed into the shank receiving bores 13008. That is to say, the blade assembly of FIG. 55 may have pry slots like that disclosed in FIGS. 58 thru 60. It is to be understood that pry slots may be used with any blade assembly, tool bit, and wear member or adapter board discussed herein.

In some embodiments, such as shown in FIGS. 59 and 60, the width 13008 of the working portion 13006 of each one of the plurality of tool bits 1300 or the width of the wear portion of each one of the plurality of wear members (as understood with reference to FIGS. 55 thru 57) is greater than the width 12038 of each one of the plurality of pry slots 12010. This may not be the case for other embodiments.

FIGS. 61 thru 65 disclose a blade assembly 14000 according to an embodiment of the present disclosure may include a bushing and a tool bit with spline features. More particularly, a blade assembly 14000 may comprise an adapter board 14002 including a lower tool bit attachment portion 14004, terminating in a lower adapter board free end 14006. The lower adapter board free end 14006 defining a bottom surface 14008 defining a plurality of shank receiving bores 14010. The blade assembly 14000 may also include a plurality of splined bushings 14012. Each one of the plurality of splined bushings 14012 may be disposed in a corresponding one of the plurality of shank receiving bores 14010.

Each one of the plurality of splined bushings 14012 may be retained in each one of the plurality of shank receiving bores 14010, such as being press fit into each corresponding one of the plurality of shank receiving bores 14010, welded, etc.

Figure 64:
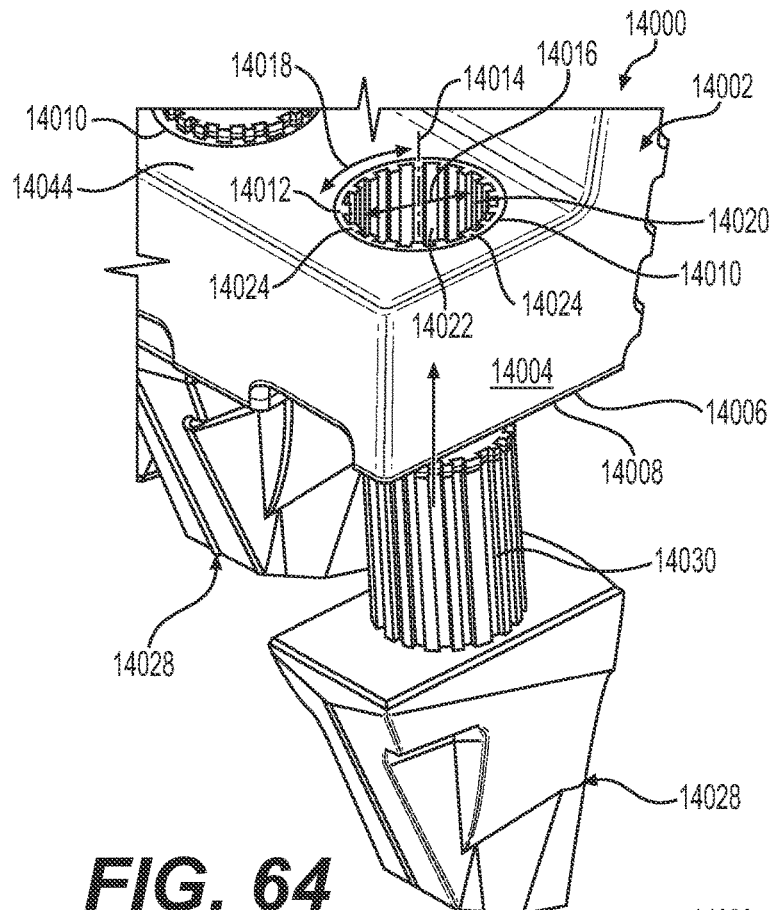
FIG. 64 is an exploded assembly view of the blade assembly of FIG. 61 illustrating the tool bit being inserted into the bushing.

As best seen looking at FIGS. 63 and 64, each one of the plurality of splined bushings 14012 may include a cylindrical annular configuration defining a bushing cylindrical axis 14014, a bushing radial direction 14016, a bushing circumferential direction 14018, and a central hole 14020. The central hole 14020 may define an inside circumferential surface 14022 including a plurality of axially extending splines 14024 forming a circumferential array about the bushing cylindrical axis 14014.

In some embodiments, the central thru-hole 14020 may be a blind hole or as shown in FIGS. 63 and 64, the central hole 14020 may be a thru-hole 14026 extending completely through the splined bushing 14012. When the hole is blind, a central or interior snap ring for the tool bit or wear member may be provided for retaining a tool bit or a wear member to the adapter board. On the other hand, when the hole is a thru-hole, an external snap ring may be provided for retaining a tool bit or a wear member to the adapter board as will be shown and described herein momentarily.

Figure 61:
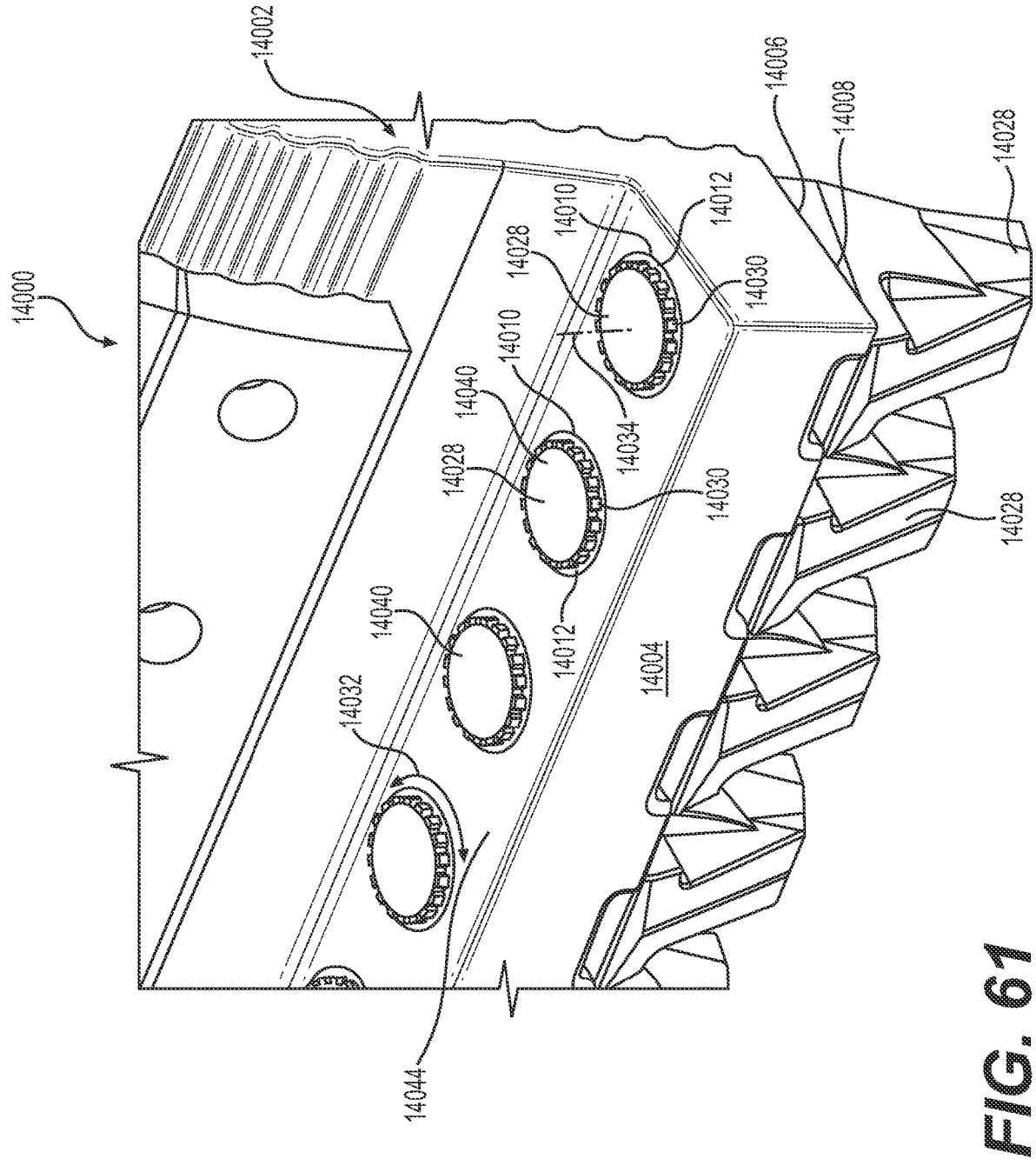
FIG. 61 is a rear oriented perspective view of a blade assembly employing and adapter board utilizing a splined bushing and a tool bit having a splined shank portion mating with the splined bushing according to an embodiment of the present disclosure.
Figure 65:
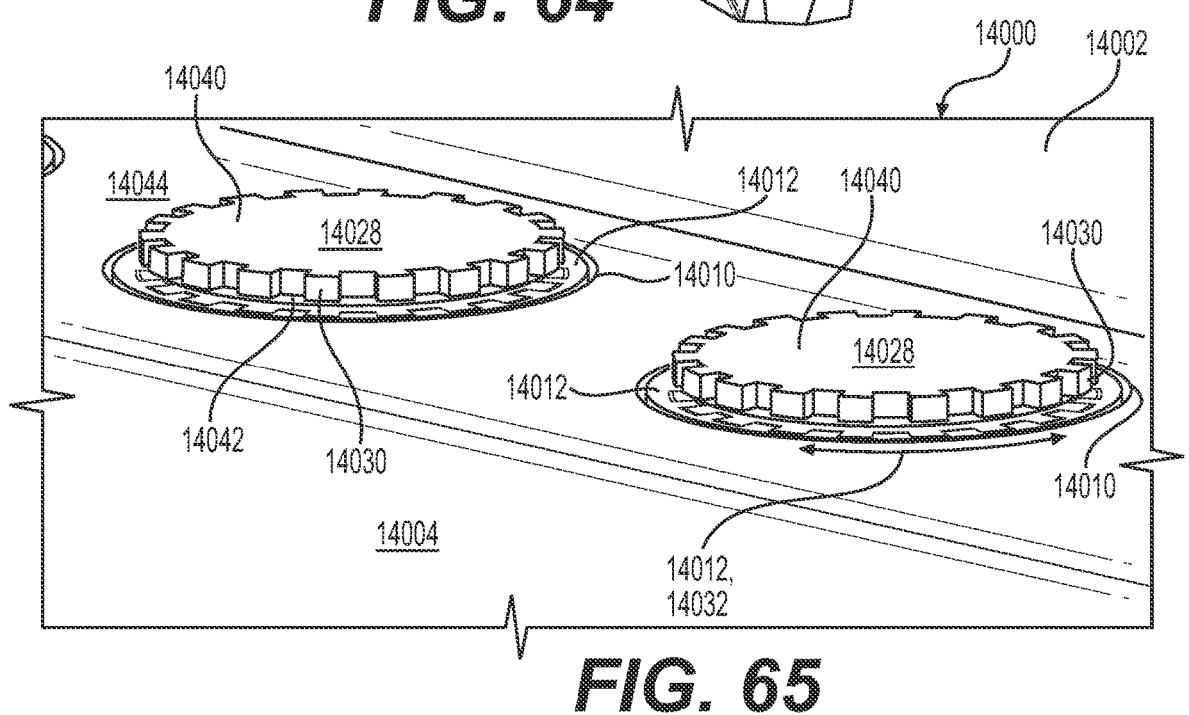
FIG. 65 is an enlarged detail view of the blade assembly of FIG. 61, showing the mating of the splines of the shank portion of the tool bit with the splines of the bushing, and also showing the positioning of the snap ring groove near the end of the shank portion of the tool bit above the adapter board.

Referring to FIGS. 61, 62, 64 and 65, the blade assembly 14000 may further comprise a plurality of splined tool bits 14028 or wear members including those shown in FIGS. 61, 64 and 65 or otherwise shown or described herein. Each one of the plurality of splined tool bits 14028 may include a splined shank portion 14030 configured to mate with a corresponding one of the plurality of splined bushings 14012.

The splined shank portion 14030 may include a splined cylindrical configuration defining a circumferential direction 14032 and a longitudinal axis 14034. The splined shank portion 14030 may further include a circumferential surface 14036 further comprising a series of longitudinally extending splines 14038.

In some embodiments, the splined shank portion 14030 may include a free end 14040 and the series of longitudinally extending splines 14038 may extend to the free end 14040. This may not be the case in other embodiments.

Focusing on FIG. 65, the splined shank portion 14030 may define a circumferential snap ring slot 14042 disposed proximate the free end 14040 of the splined shank portion 14030. More specifically, the lower tool bit attachment portion 14004 of the adapter board 14002 includes a top surface 14044 of the lower tool bit attachment portion 14004 and each of the plurality of shank receiving bores 14010 may extend through the top surface 14044 with each of the plurality of splined bushings 14012 being flush to recessed to the top surface 14044. This may not be the case for other embodiments.

Looking at FIG. 62, the series of longitudinally extending splines 14038 may include 18 identically configured shank portion splines 14046. Likewise, in FIG. 63 it can be seen that the plurality of axially extending splines 14024 may include 18 identically configured bushing splines 14048. In other embodiments, the splines may be differently configured from each other and/or a different number of splines may be provided that are spaced the same distance or a different distance from each other, etc.

Looking at FIG. 62, a splined tool bit 15000 may comprise a working portion 15002, and a splined shank portion 15004 extending from the working portion 15002 to a splined shank portion free end 15006. The splined shank portion 15004 may include a cylindrical configuration defining a circumferential direction 14032, a radial direction 15008, and a shank portion cylindrical axis 15010. The splined shank portion 15004 may further include one or a plurality of shank splines 15012 wherein each one of the plurality of shank splines 15012 may extend axially and radially from the splined shank portion 15004 (e.g. in a radially outer direction) and may be spaced circumferentially away from an adjacent one of the plurality of shank splines 15012.

In some embodiments, each of the plurality of shank splines 15012 extends axially to the splined shank portion free end 15006. Each of the plurality of shank splines 15012 extends axially to the working portion 15002. As alluded to earlier, the splined shank portion 15004 may define a circumferential snap ring groove 15014 disposed axially adjacent to the splined shank portion free end 15006.

Each one of the plurality of shank splines 15012 may be spaced circumferentially away from an adjacent one of the plurality of shank splines 15012 by an angle 15016 having a value of 20 degrees. This angle 15016 may be varied between each pair of splines in other embodiments and/or may have other values in other embodiments.

Turning now to FIG. 63, a splined bushing 16000 may comprise an annular cylindrical body 16002 defining a longitudinal axis 16004, a radial direction 16006, and a circumferential direction 16008. The annular cylindrical body 16002 may include an inner cylindrical surface 16010 defining a thru-hole 16012 that extends axially through the annular cylindrical body 16002. The body 16002 may further include a plurality of bushing splines 16014 wherein each one of the plurality of bushing splines 16014 extends axially and radially from the inner cylindrical surface 16010 and is spaced circumferentially away from an adjacent one of the plurality of bushing splines 16014. Other configurations for the splines such as helical are possible in other embodiments.

More particularly, each one of the plurality of bushing splines 16014 may be spaced circumferentially away from the adjacent one of the plurality of bushing splines 16014 by a predetermined angle 16016. The predetermined angle 16016 may have a value of 20 degrees. Other values for the predetermined angle 16016 are possible in other embodiments, etc. Also, each one of the plurality of bushing splines 16014 may extend axially the entire extent of the splined bushing 16000. This may not be the case for other embodiments.

Figure 66:
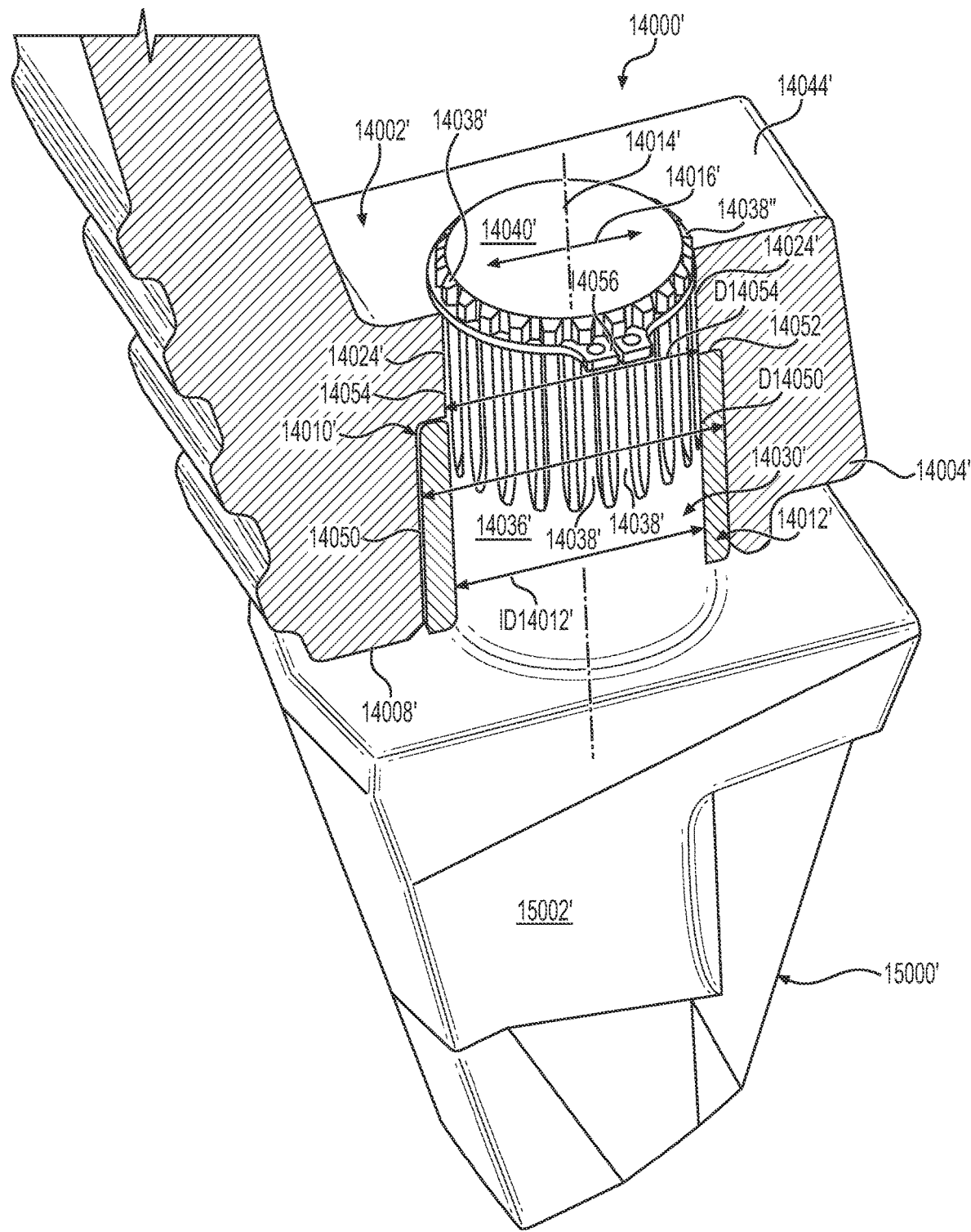
FIG. 66 is a sectional perspective view of a another blade assembly employing another embodiment of splined tool bit, a bushing lacking splines, and an adapter board having splines that mate with those of the tool bit.
Figure 67:
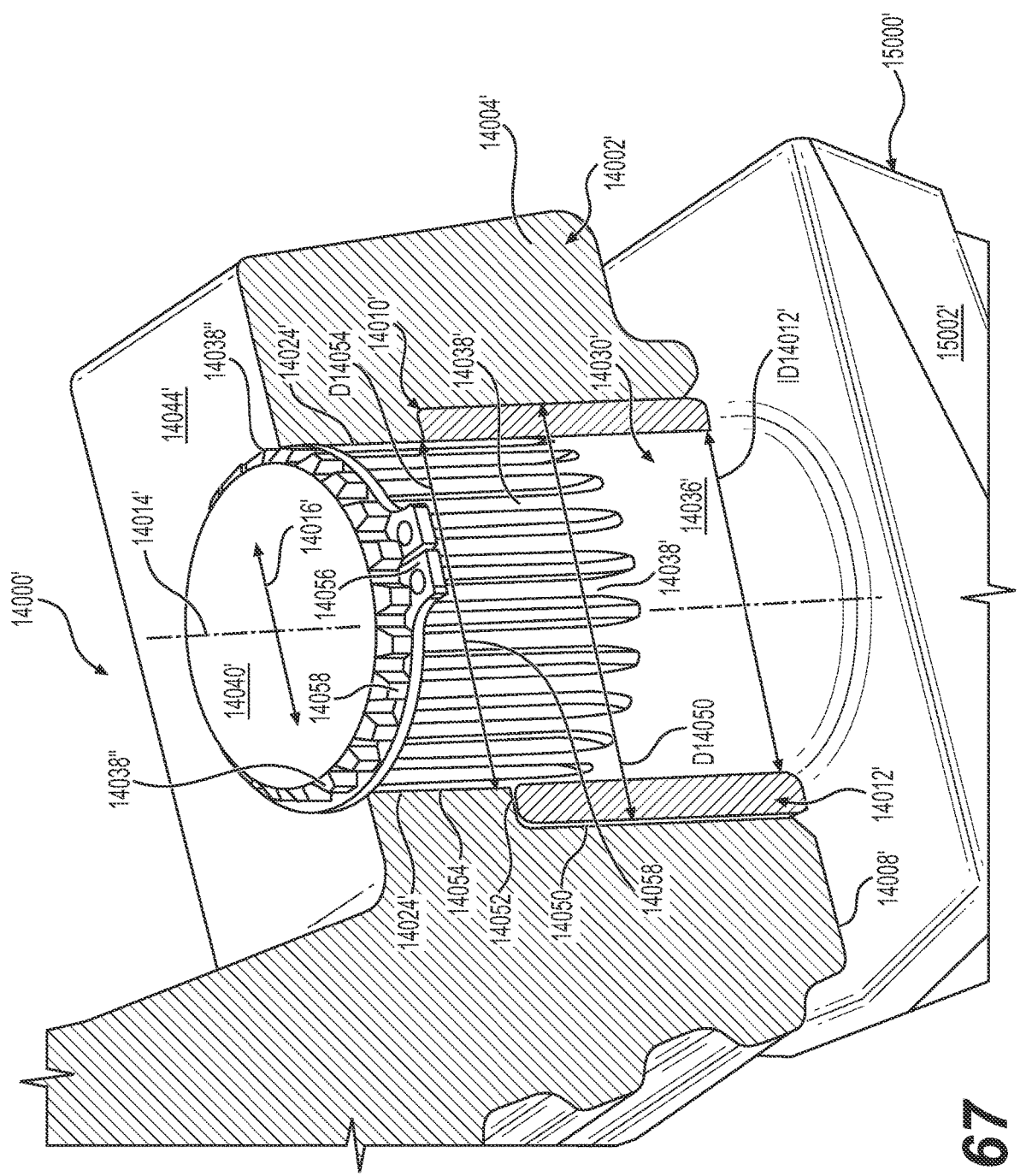
FIG. 67 is an enlarged detail view of FIG. 66 illustrating the splined shank portion of the tool bit and its top ledge holding a snap ring in place more clearly.

Referring now to FIGS. 66 and 67, another embodiment of a blade assembly 14000' that is similarly configured to that of FIGS. 61 thru 65 except for the following differences may be seen.

As shown in FIGS. 66 and 67, the blade assembly 14000', instead of a splined bushing, a bushing 14012' lacking splines may be employed. Moreover, each of the shank receiving bores 14010' may define a longitudinal axis 14014', a radial direction 14016' and may include a counterbore portion 14050 defining a shelf surface 14052. Each of the plurality of bushings 14012' may be disposed in one of the counterbore portions 14050 such that the bushings 14012' contact or nearly contact the shelf surface 14052. The bushings 14012' may be pressed into the shank receiving bores 14010' or may be welded to the adapter board 14002', etc. Each of the counterbore portions 14050 may define a counterbore diameter D14050, while each of the shank receiving bores 14040' may further include a reduced diameter portion 14054 defining a reduced diameter D14054 that is less than the counterbore diameter D14050. The reduced diameter portion 14054 may also extend axially from the counterbore portion 14050 and include a plurality of axially extending splines 14024'. Each of the bushings 14012' may define an inner diameter ID14012' and the reduced diameter D14054 may be greater than the inner diameter ID14012' of the bushing 14012'.

For this particular embodiment, the counterbore portion 14050 extends from the bottom surface 14008' of the lower tool bit attachment portion 14004' of the adapter board 14002'. In other embodiments, the counterbore portion 14050 may extend from the top surface 14044' of the lower tool bit attachment portion 14004' of the adapter board 14002'. Again, for this embodiment, the reduced diameter portion 14054 is a thru-hole extending from the top surface 14044' to the counterbore portion 14050. In other embodiments, the reduced diameter portion may extend from the bottom surface, etc.

Focusing now on the splined tool bit 15000', the series of longitudinally extending splines 14038' are flush with the circumferential surface 14036' of the splined shank portion 14030', extending radially inwardly from the circumferential surface 14036' and axially to the free end 14040' while stopping short of the working portion 15002'.

Assembly of the embodiments shown in FIGS. 66 and 67 may be performed in the following manner. The bushings 14012' are attached to the adapter board 14002' after being inserted in the counterbore portion 14050 of the shank receiving bores 14010'. Then, the splined shank portions 14030' are inserted into the bushings 14012' and the shank receiving bores 14010' and rotated such that the splines 14038' of the shank portions are aligned appropriately relative to the corresponding splines 14024' of the adapter board. Insertion continues as the circumferential surface 14036' of the splined shank portion makes a slip fit with the inner diameter ID14012 of the bushing 14012' and the splines 14038' of the splined shank portion 14030 make a clearance fit radially with the reduced diameter portion 14054 of the shank received bore 14010'. Then, a snap ring 14056 may be used to hold the tool bit 15000' in place.

More particularly, the snap ring 14056 is sandwiched between the ledge 14058 of the splined shank portion 14030' of the tool bit 15000' and the lower tool bit attachment portion of the adapter board. At least one ledge 14058 extends radially from one of the plurality of longitudinally extending splines 14038' that is configured to contact a snap ring 14056. A plurality of ledges 14058 may be provided that each extends from each one of the longitudinally extending splines 14038'.

For the embodiment shown in FIGS. 66 and 67, at least one of the splines 14038" of the splined shank portion 14030' is facing toward the front or the rear of the adapter board 14002', establishing a zero degree orientation of the tool bit 15000' (such as shown in FIG. 7). Once installed, the shank portion of the tool bit conveys any loads to the bushing while the splines of the adapter board contact the splines of the tool bit to help maintain the desired orientation.

Again, it should be noted that any of the dimensions, angles, surface areas and/or configurations of various features may be varied as desired or needed including those not specifically mentioned herein. Although not specifically discussed, blends such as fillets are shown in FIGS. 3 thru 67 to connect the various surfaces. These may be omitted in other embodiments and it is to be understood that their presence may be ignored sometimes when reading the present specification.

INDUSTRIAL APPLICABILITY

In practice, a machine, a blade assembly, a tool bit, a bushing, a wear member, and/or an adapter board may be manufactured, bought, or sold to retrofit a machine, a tool bit, a wear member or blade assembly in the field in an aftermarket context, or alternatively, may be manufactured, bought, sold or otherwise obtained in an OEM (original equipment manufacturer) context.

Referring to FIGS. 61 thru 67, with a bushing within the adapter board, if a bit (or a wear member) were to get seized within the bit shank hole, then both the bit and the bushing can be pressed out and a new bushing can be pressed back in. The bushing may also help with the adapter board's end of life. Instead of scrapping the adapter board, bushings can be replaced to rebuild the adapter board. The bit or wear member can held in place in any suitable manner including using an internal snap ring, an external snap ring, or a lynch pin attached at the top of the shank of the wear member or tool bit. The bushing may be made of any suitable material including steel, etc.

The splined features may be added to any tool bit or wear member discussed or shown herein. Using the splined features, the tool bit or wear member may be angled at a desired angle instead of using an orientation plate or in addition to an orientation plate. The tool bits or wear members may be angled at the same or different angles relative to each other as needed or desired.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A blade assembly comprising:
an adapter board including a lower tool bit attachment portion, terminating in a lower adapter board free end, the lower adapter board free end defining a bottom surface defining a plurality of shank receiving bores; and
a plurality of bushings,
    wherein each one of the plurality of bushings is disposed in a corresponding one of the plurality of shank receiving bores,
    wherein the plurality of shank receiving bores includes counterbore portions, and
    wherein each of the plurality of bushings is disposed in one of the counterbore portions,
        each of the counterbore portions defining a counterbore diameter,
        each of the plurality of shank receiving bores further including a reduced diameter portion defining a reduced diameter that is less than the counterbore diameter, and
        the reduced diameter portion extending from the counterbore portion and including a plurality of axially extending splines.

2. The blade assembly of claim 1,
wherein each one of the plurality of bushings includes a cylindrical annular configuration defining a bushing cylindrical axis, a bushing radial direction, a bushing circumferential direction, and a central hole defining an inside circumferential surface including another plurality of axially extending splines forming a circumferential array about the bushing cylindrical axis, and
wherein each one of the plurality of bushings is press fit into each corresponding one of the plurality of shank receiving bores.

3. The blade assembly of claim 1, wherein the reduced diameter portion is a thru-hole and includes a series of axially extending splines,
the plurality of axially extending splines extending radially from the reduced diameter portion.

4. The blade assembly of claim 1, further comprising:
a plurality of splined tool bits,
    wherein each one of the plurality of splined tool bits includes a working portion and a splined shank portion configured to mate with a corresponding one of the plurality of bushings.

5. The blade assembly of claim 4, wherein the splined shank portion includes a circumferential surface comprising a series of longitudinally extending splines that are flush with the circumferential surface.

6. The blade assembly of claim 5,
wherein the splined shank portion includes a free end, and
wherein the series of longitudinally extending splines extend to the free end and stops short of the working portion.

7. The blade assembly of claim 6, wherein the splined shank portion includes at least one ledge extending from one of the series of longitudinally extending splines.

8. The blade assembly of claim 6,
wherein the series of longitudinally extending splines includes 18 identically configured shank portion splines, and
wherein the plurality of axially extending splines includes 18 identically configured bushing splines.

9. The blade assembly of claim 1,
wherein each of the plurality of bushings define an inner diameter, and
wherein the reduced diameter is greater than the inner diameter.

10. A blade assembly comprising:
a plurality of shank receiving bores;
a plurality of bushings,
  wherein a bushing, of the plurality of bushings, is pressed into a shank receiving bore of the plurality of shank receiving bores,
  wherein the plurality of shank receiving bores includes counterbore portions,
  wherein each of the plurality of bushings is disposed in one of the counterbore portions,
    each of the counterbore portions defining a counterbore diameter,
    each of the plurality of shank receiving further including a reduced diameter portion defining a reduced diameter that is less than the counterbore diameter, and
    the reduced diameter portion extending from the counterbore portion and
  including a plurality of axially extending splines; and
a plurality of tool bits,
  wherein a tool bit, of the plurality of tool bits, is configured to mate with the bushing.

11. The blade assembly of claim 10, wherein the tool bit includes:
a working portion, and
a splined shank portion configured to mate with the bushing.

12. The blade assembly of claim 11,
wherein the splined shank portion includes a series of longitudinally extending splines and a free end, and
wherein the series of longitudinally extending splines extend to the free end and stops short of the working portion.

13. The blade assembly of claim 10, wherein the bushing includes a cylindrical annular configuration defining a bushing cylindrical axis, a bushing radial direction, a bushing circumferential direction, and a central hole defining an inside circumferential surface including another plurality of axially extending splines forming a circumferential array about the bushing cylindrical axis.

14. The blade assembly of claim 10, wherein the reduced diameter portion is a thru-hole and includes a series of axially extending splines.

15. The blade assembly of claim 14, wherein the plurality of axially extending splines extend radially from the reduced diameter portion.

16. The blade assembly of claim 10, wherein the tool bit includes a splined shank portion configured to mate with the bushing.

17. The blade assembly of claim 16, wherein the splined shank portion includes a circumferential surface comprising a series of longitudinally extending splines that are flush with the circumferential surface.

18. The blade assembly of claim 16, wherein the splined shank portion includes:
a series of longitudinally extending splines, and
at least one ledge extending from one of the series of longitudinally extending splines.

19. The blade assembly of claim 10,
wherein each of the plurality of bushings define an inner diameter, and
wherein the reduced diameter is greater than the inner diameter.

20. The blade assembly of claim 10, wherein the tool bit includes 18 shank portion splines.

* * * * *